US008089506B2

(12) United States Patent
Takayama et al.

(10) Patent No.: US 8,089,506 B2
(45) Date of Patent: Jan. 3, 2012

(54) IMAGE DISPLAY APPARATUS AND SIGNAL PROCESSING APPARATUS

(75) Inventors: Haruhisa Takayama, Nagoya (JP); Osamu Sakaue, Inazawa (JP); Yoshihiko Hibino, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1595 days.

(21) Appl. No.: 11/472,253

(22) Filed: Jun. 22, 2006

(65) Prior Publication Data

US 2006/0238613 A1    Oct. 26, 2006

Related U.S. Application Data

(63) Continuation of application No. PCT/JP2004/019055, filed on Dec. 21, 2004.

(30) Foreign Application Priority Data

Dec. 25, 2003 (JP) ................................. 2003-429342
Mar. 18, 2004 (JP) ................................. 2004-077977

(51) Int. Cl.
*H04N 13/00* (2006.01)
*H04N 13/04* (2006.01)
(52) U.S. Cl. ................. 348/42; 348/43; 348/51
(58) Field of Classification Search ............... 348/42–60
See application file for complete search history.

(56) References Cited

U.S. PATENT DOCUMENTS

| 5,502,480 A | 3/1996 | Kuga et al. |
| 5,621,866 A | 4/1997 | Murata et al. |
| 5,801,706 A * | 9/1998 | Fujita et al. ............ 345/519 |
| 6,157,351 A | 12/2000 | Olson |
| 6,441,818 B1 | 8/2002 | Kurose |
| 6,538,625 B2 * | 3/2003 | Tidwell et al. ............ 345/8 |
| 2002/0113752 A1 | 8/2002 | Sullivan et al. |
| 2002/0130820 A1 | 9/2002 | Sullivan |
| 2003/0086062 A1 | 5/2003 | Shevlin |
| 2003/0142086 A1 | 7/2003 | Watanabe et al. |
| 2003/0145336 A1 | 7/2003 | Matsuzaki et al. |

(Continued)

FOREIGN PATENT DOCUMENTS

EP        1 026 636 A2      8/2000

(Continued)

OTHER PUBLICATIONS

Japanese Office Action issued in corresponding Japanese Patent Application No. 2004-077977, mailed Nov. 10, 2009.

(Continued)

*Primary Examiner* — Christopher S Kelley
*Assistant Examiner* — Chikaodili E Anyikire
(74) *Attorney, Agent, or Firm* — Oliff & Berridge, PLC

(57) ABSTRACT

An apparatus is disclosed for displaying to a viewer an image stereoscopically representing a three-dimensional object to be displayed. The apparatus includes: an emitter emitting light, having an intensity modulating section capable of intensity modulation for modulating an intensity of the light emitted from the emitter; a wavefront-curvature modulator capable of wavefront-curvature modulation for modulating a curvature of wavefront of the light emitted from the emitter; and a controller controlling the intensity modulation and the wavefront-curvature modulation, based on a luminance signal indicative of luminance of the image, and a depth signal indicative of depth of the image. The depth signal is a signal corresponding to depth data produced in a rendering process for the object to be displayed.

5 Claims, 26 Drawing Sheets

U.S. PATENT DOCUMENTS

| | | |
|---|---|---|
| 2003/0153835 A1 | 8/2003 | Watanabe et al. |
| 2003/0156253 A1 | 8/2003 | Watanabe et al. |
| 2004/0085310 A1 | 5/2004 | Snuffer |

FOREIGN PATENT DOCUMENTS

| | | |
|---|---|---|
| EP | 1026636 A2 * | 8/2000 |
| EP | 1 187 494 A2 | 3/2002 |
| GB | 2 269 081 A | 1/1994 |
| JP | A 4-289880 | 10/1992 |
| JP | A 6-83955 | 3/1994 |
| JP | A 7-200870 | 8/1995 |
| JP | A 10-222693 | 8/1998 |
| JP | A 11-25289 | 1/1999 |
| JP | B2 2874208 | 1/1999 |
| JP | A 2000-147396 | 5/2000 |
| JP | A 2000-228779 | 8/2000 |
| JP | A 2001-359121 | 12/2001 |
| JP | A-2002-281464 | 9/2002 |
| JP | A 2003-009079 | 1/2003 |
| JP | A 2003-295108 | 10/2003 |
| JP | A 2003-302601 | 10/2003 |
| JP | A 2003-315728 | 11/2003 |

OTHER PUBLICATIONS

European Office Action issued in European Patent Application No. 04 807 412.4 dated Nov. 11, 2010.

* cited by examiner

IMAGE DISPLAY APPARATUS AND SIGNAL PROCESSING APPARATUS

CROSS-REFERENCE TO RELATED APPLICATIONS

This application is based on Japanese Patent Applications No. 2003-429342 filed Dec. 25, 2003, and No. 2004-077977 filed Mar. 18, 2004, and PCT International Application No. PCT/JP2004/019055 filed Dec. 21, 2004, the contents of which are incorporated hereinto by reference.

This application is a continuation of PCT International Application No. PCT/JP2004/019055 filed Dec. 21, 2004, which was published in Japanese under PCT Article 21(2).

BACKGROUND OF THE INVENTION

1. Field of the Invention

The invention relates to techniques of displaying images, and more particularly to techniques of processing signals related to a display operation of images.

2. Description of the Related Art

There are known as techniques of displaying images, image display apparatuses for displaying to a viewer an image stereoscopically representing a three-dimensional object to be displayed.

One example of such image display apparatuses, as disclosed in Japanese Patent No. 2874208, is a type of image display apparatus configured such that there is disposed between a light source (e.g., a laser) for emitting a beam of light, and a scanner for two-dimensionally scanning the beam of light which has been emitted from the light source, a wavefront-curvature modulator for modulating the curvature of wavefront of the beam of light which has been emitted from the light source, to thereby project the beam of light being scanned onto the retina of a viewer's eye. This example is occasionally referred to as a retinal scanning display.

An alternative example of such image display apparatuses is a type of image display apparatus configured such that there is disposed between a screen on which an image is two-dimensionally displayed, and a viewer, a lens array capable of modulating the curvature of wavefront of light which has been emitted from the screen, per each pixel or per each group of pixels. A still alternative example is a type of image display apparatus configured to dispose an optical spatial phase modulator between such a screen and a viewer.

In any case, those examples described above include a wavefront-curvature modulator between an emitter for emitting light and a viewer's eye, allowing stereoscopic representation of a three-dimensional to-be-displayed object.

In this regard, an example of the "three-dimensional to-be-displayed object" is a to-be-displayed object containing at least one object three-dimensionally constituted. An alternative example is a to-be-displayed object containing at least one object and a background (background scene), wherein the object and the background have different distances from a viewer, irrespective of whether or not the object is constituted three-dimensionally. A still alternative example is a to-be-displayed object containing a plurality of objects, wherein these objects have different distances from a viewer, irrespective of whether or not each object is constituted three-dimensionally.

In any case, those image display apparatuses of such a type, for a three-dimensional to-be-displayed object to be represented in a stereoscopic image, employ information relating to the depths of the three-dimensional to-be-displayed object, which is to be reproduced in the image. In these image display apparatuses, the curvature of wavefront of light composing an image is modulable per each of a plurality of sub-areas into which the image is divided. This allows the curvature of wavefront of the light to be modulated in accordance with a corresponding set of depth information, per each of the sub-areas.

Each of sub-areas into which an image is divided is, in an example, one of a plurality of pixels composing an image, or one pixel group comprised of a plurality of adjacent pixels. In this example, modulation in curvature of wavefront per each sub-area would allow one field or one frame of an image, to be displayed so as to represent a plurality of regions having different depths.

Each of sub-areas into which an image is divided is, in an example, one field or frame of an image. In this example, modulation in curvature of wavefront per each sub-area would allow an image, which is composed by a plurality of fields or frames, to be displayed with different depths between a plurality of successive fields or frames. In this example, it is possible, for example, to display objects varying on a field-by-field or frame-by-frame basis, with depths varying on an object-by-object basis.

In addition, in the field of computer graphics, an image displayed on a flat screen is two-dimensional, and therefore, a three-dimensional to-be-displayed object cannot be represented in a stereoscopic image in its strict sense. However, as disclosed in Japanese Patent Application Publication No. HEI 11-25289, data for displaying an image is produced, for a three-dimensional to-be-displayed object to be perceived by a viewer as stereoscopically as possible.

For such data production, a rendering process is implemented for geometrical data representing a to-be-displayed object in a three-dimensional geometrical manner, resulting in the conversion of the geometrical data into pixel data defining display conditions per each pixel.

In this regard, the "geometric data," for example, when a to-be-displayed object includes a three-dimensional object, means polygon data approximately representing the object in polygon. This polygon data is in the form of, for example, vector data.

On the other hand, the "pixel data" is data for representing a to-be-displayed object in a group of pixels. This pixel data includes luminance value data indicative of luminance values for each pixel on a screen; and depth data indicative of a Z-value, which is to say, information on a depth direction of the screen (i.e., a Z-value when the depth direction is defined coincident with a Z-axis direction).

In this regard, the "luminance value data" may be in the form of, for example, data indicative of luminance values in association with respective pixel coordinate-positions, or data indicative of not only the luminance values but also colors (e.g., RGB). On the other hand, the "depth data" may be in the form of, for example, data indicative of distance from a viewer's virtual or real viewpoint, in association with respective pixel coordinate-positions. Hence, specifying a targeted pixel allows a combination of the luminance value and the depth to be specified.

In the field of computer graphics, where an object to be displayed as an image on a screen includes a three-dimensional object, parts of the object, which are obscured by other parts, are therefore invisible to a viewer.

In addition, even where an object within a to-be-displayed object is two-dimensional, if the same to-be-displayed object includes a plurality of objects with different distances from a viewer, and if some of these objects are located behind other ones of these objects, the some objects, which are partially or fully obscured by the other objects, are therefore invisible to a viewer.

For these reasons, in a rendering process for a to-be-displayed object, which is to say, a content, hidden surface elimination is performed for the pixel data into which the geometrical data has directly been converted, resultantly obtaining final pixel data. The hidden surface elimination employs the depth information, which is to say, a Z-value, of an image.

For the hidden surface elimination, for example, a Z-buffer technique is used. In the Z-buffer technique, a sub-plurality of ones of a plurality of pixels composing an image to be displayed, which ones have identical display positions on a screen, are compared with each other with respect to the Z-value, to thereby determine a front-to-back order, which is to say, whether it is located nearer to or more remote from a viewer. Subsequently, the luminance value data are discarded for ones of the sub-plurality of pixels which are located more remote from the viewer, and the only the luminance value data are selected for ones of the sub-plurality of pixels which are located nearer to the viewer, accomplishing the removal of hidden surfaces in an image display.

BRIEF SUMMARY OF THE INVENTION

In the field of computer graphics, the depth data, although it is produced for the hidden surface elimination, is not used in image display. The reason is that, in this field of computer graphics, it is impossible to display an image in a stereoscopic manner. That is to say, in this field of computer graphics, incapability of modulating the curvature of wavefront of light forming an image causes incapability of representing the depth of a to-be-displayed object.

For these reasons, in this field of computer graphics, data of the pixel data which is usable for image display is only the luminance value data. That is to say, in this field of computer graphics, the depth information of a to-be-displayed object is used only in the rendering process, and is not used in an image display process. As a result, in this field of computer graphics, an image signal for displaying a to-be-displayed object as an image is formed so as not to include a depth signal indicative of the depth.

Hence, in a case where the aforementioned image display apparatuses display images using the thus-formed image signal, there cannot conventionally be used again, the depth data which has been used in the aforementioned hidden surface elimination, requiring the depth data to be newly created. As a result, conventionally, the depth information is redundantly produced for the hidden surface elimination and for the representation of the depth by the image display apparatuses.

It is, however, preferable from the perspective of improvements in the depth information acquisition technique, to improve those image display apparatuses so as to allow the depth of a to-be-displayed object to be efficiently represented with a stereoscopic image.

Further, those image display apparatuses are required to process a luminance signal and a depth signal in synchronization with each other, irrespective of whether the depth data is reused or newly produced.

In that, it is preferable that a hardware and/or software configuration for synchronizing those luminance and depth signals is simple, or requires no modification to an existing configuration or a few modifications, if any.

That is to say, it is also preferable from the perspective of improvements in the signal processing technique, to improve those image display apparatuses so as to allow the depth of a to-be-displayed object to be efficiently represented with a stereoscopic image.

In light of the circumstances described above, it is an object of the present invention to provide ones of techniques of displaying to a viewer an image stereoscopically representing a three-dimensional object to be displayed, which are novel techniques allowing the depth of a to-be-displayed object to be efficiently represented with a stereoscopic image.

According to a first aspect of the present invention, an apparatus is provided for displaying to a viewer an image stereoscopically representing a three-dimensional object to be displayed.

This apparatus includes:

an emitter emitting light, having an intensity modulating section capable of intensity modulation for modulating an intensity of the light emitted from the emitter;

a wavefront-curvature modulator capable of wavefront-curvature modulation for modulating a curvature of wavefront of the light emitted from the emitter; and a controller controlling the intensity modulation and the wavefront-curvature modulation, based on a luminance signal indicative of luminance of the image, and a depth signal indicative of depth of the image.

In this apparatus, the depth signal is a signal corresponding to depth data produced in a rendering process for the object to be displayed.

According to a second aspect of the present invention, an apparatus is provided for signal processing which supplies signals to an image display section displaying an image representing a three-dimensional object to be displayed, in an image display region in which the image is to be displayed.

This apparatus includes:

a signal output section performing outputting of a luminance signal to the image display section, and outputting of a depth signal indicative of depth of the image to the image display section, with the depth signal being in the form of a signal corresponding to depth data produced in a rendering process for the object to be displayed.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
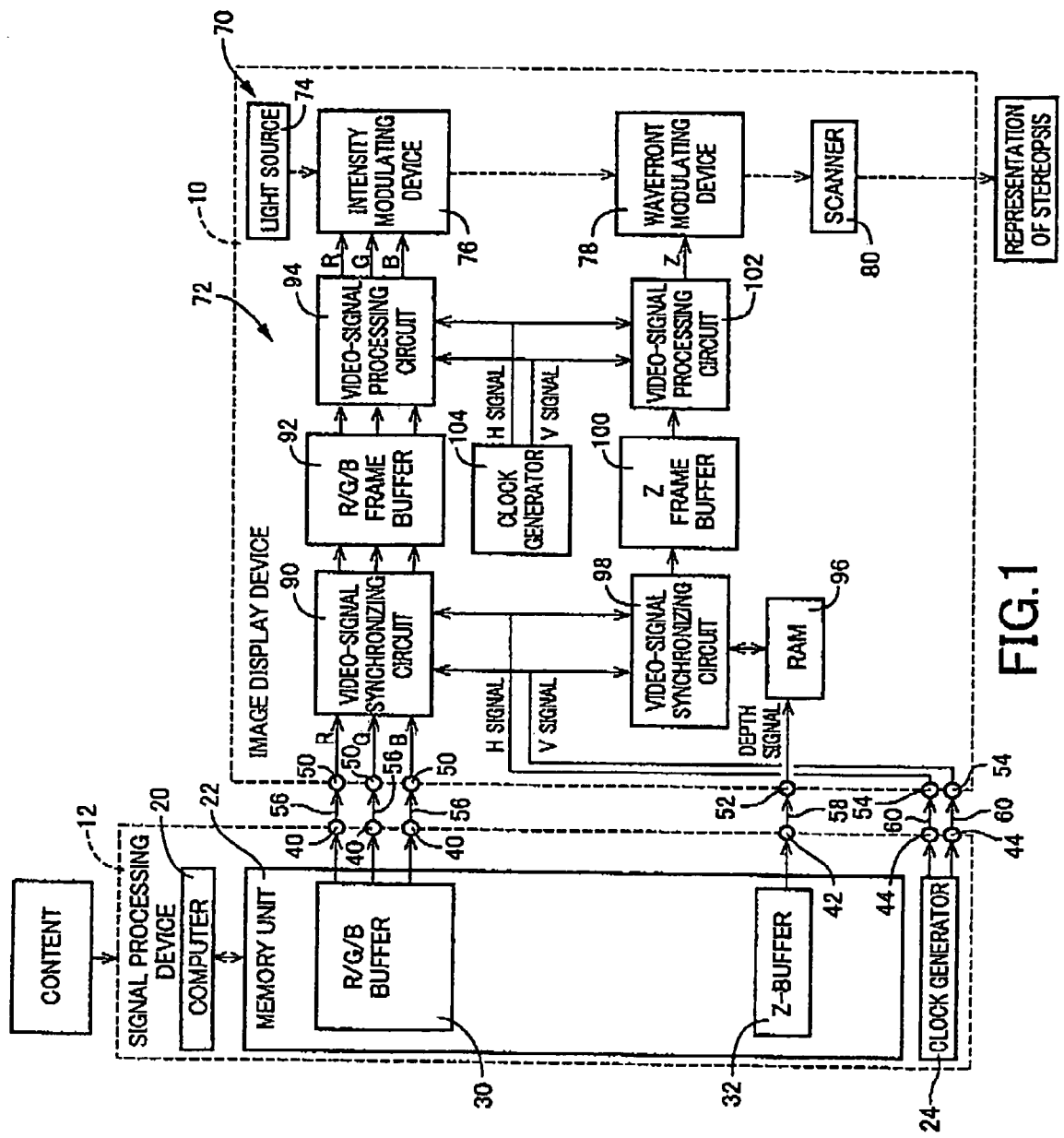
FIG. 1 is a block diagram conceptually illustrating an image display device 10 constructed according to a first embodiment of the present invention, together with a signal processing device 12.

The object mentioned above may be achieved according to any one of the following modes of this invention.

These modes will be stated below so as to be sectioned and numbered, and so as to depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the modes of the invention in such a dependent form as to depend from the other mode or modes does not exclude the possibility that the technological features set forth in a dependent-form mode become independent of those set forth in the corresponding depended mode or modes and to be removed therefrom. It should be interpreted that the technological features set forth in a dependent-form mode is allowed to become independent, where appropriate.

(1) An apparatus for displaying to a viewer an image stereoscopically representing a three-dimensional object to be displayed, the apparatus comprising:

an emitter emitting light, having an intensity modulating section capable of intensity modulation for modulating an intensity of the light emitted from the emitter;

a wavefront-curvature modulator capable of wavefront-curvature modulation for modulating a curvature of wavefront of the light emitted from the emitter; and a controller controlling the intensity modulation and the wavefront-curvature modulation, based on a luminance signal indicative of luminance of the image, and a depth signal indicative of depth of the image;

wherein the depth signal is a signal corresponding to depth data produced in a rendering process for the object to be displayed.

In this image display apparatus, the curvature of wavefront of the light for displaying an image is modulated. This enables the representation of the depth of a three-dimensional to-be-displayed object. Further, the depth signal used for representing the depth is a signal corresponding to the depth data produced in the rendering process for the to-be-displayed object.

This image display apparatus would not therefore require producing the depth signal essential to stereoscopic image-display for representing the depth of a to-be-displayed object, especially for the image display. This results in improvements in the depth signal acquisition technique, facilitating efficient representation of the depth of a to-be-displayed object by the use of a stereoscopic image.

The "emitter" set forth in this mode may be in the form of, for example, a combination of a light source and an intensity modulator (which is one of the aforementioned intensity modulating section) physically separated from the light source. Alternatively, the "emitter" may be in the form of a light source (e.g., semiconductor laser) which incorporates the intensity modulating function. In the latter case, a portion of the light source which provides the intensity modulation function corresponds to the above-mentioned intensity modulating section.

(2) The apparatus according to mode (1), wherein the depth signal is a signal corresponding to the depth data which is produced during hidden surface elimination implemented in the rendering process.

(3) The apparatus according to mode (1) or (2), wherein the depth data is Z-value data indicative of a Z-value which is temporarily stored in a Z-buffer when a Z-buffer technique is implemented for hidden surface elimination in the rendering process.

(4) The apparatus according to any one of modes (1) through (3), wherein the controller includes:

a synchronizer synchronizing the luminance signal and the depth signal relative to each other; and an output section outputting the synchronized luminance and depth signals to the intensity modulating section and the wavefront-curvature modulator.

For displaying an image, a luminance signal and a depth signal are delivered from a controller to an intensity modulating section and a wavefront-curvature modulator. In the delivery, those luminance and depth signals are required to be in synchronization with each other.

However, it is inessential to synchronize the luminance and depth signals relative to each other from the beginning. The reason is that, for those luminance and depth signals, if they are only predefined in the correspondence therebetween, it is possible to be later synchronized relative to each other.

Based on the findings described above, in the image display apparatus according to this mode, the luminance and depth signals are synchronized relative to each other by the synchronizer, and, these luminance and depths signals entered are outputted by the output section, in synchronization with each other, to the intensity modulating section and the wavefront-curvature modulator.

(5) The apparatus according to mode (4), wherein the luminance signal is in the form of a signal including an effective portion in which there is present an effective signal for displaying the image, and a non-effective portion in which the effective signal is absent, wherein a start signal is embedded in the luminance signal at the non-effective portion preceding the effective portion, the start signal being predetermined independent of the effective signal present in the effective portion, and wherein the synchronizer synchronizes the luminance and depth signals relative to each other, based on the embedded start signal.

In this image display apparatus, the luminance signal is in the form of a signal including an effective portion in which an effective signal for displaying an image is present, and a non-effective portion in which the effective signal is absent. Further, there is embedded in the luminance signal at the non-effective portion preceding the effective portion, a start signal which is predetermined independent of the effective signal present in the effective portion.

Additionally, in this image display apparatus, the luminance and depth signals are synchronized relative to each other, based on the start signal embedded in the luminance signal.

Therefore, in this image display apparatus, the correspondence between the luminance and depth signals is defined by the use of the start signal embedded in the non-effective portion of the luminance signal. As a result, the correspondence between the luminance and depth signals can be precisely defined with a greater ease than when such a start signal is not used.

(6) The apparatus according to any one of modes (1) through (3), wherein the controller includes:

(a) an entry section into which an image signal formed by embedding the depth signal into the luminance signal is entered; and (b) an output section extracting the luminance and depth signals from the image signal entered, and outputting the extracted luminance and depth signals to the intensity modulating section and the wavefront-curvature modulator.

For example, some cases exist where a luminance signal and a depth signal, formed into a common serial signal, enter a controller. In these cases, opposed to when these luminance and depth signals, formed as separate signals, enter the controller, it is physically impossible to cause these luminance and depth signals to enter the controller in complete synchronization with each other. However, the correspondence between the luminance signal and the depth signal is precisely defined with a greater ease, when these luminance and depth signals, which are formed into a common serial signal, enter the controller, than when these luminance and depth signals, which are formed as separate signals, enter the controller. The reason is that entry of different sets of information in a serial signal makes no arbitral change in the sequence in which these different sets of information are transmitted.

Based on such findings, in the image display apparatus according to this mode, there is entered an image signal formed by embedding a depth signal into a luminance signal. For example, the luminance and depth signals, formed into a common serial signal, are entered.

Further, in this image display apparatus, the luminance signal and the depth signal are extracted from the entered image signal. The extracted luminance and depth signals, without undergoing any changes, or upon additionally mutually synchronized, if necessary, are outputted to the intensity modulating section and the wavefront-curvature modulator, respectively.

(7) The apparatus according to mode (6), wherein the luminance signal is in the form of a signal including an effective portion corresponding to an image display region in which the apparatus displays the image and, a non-effective portion corresponding to an image non-display region in which the apparatus does not display the image, the effective portion including a plurality of luminance individual-signals representing the luminance for a plurality of respective divisions of one frame of the image, and wherein the depth signal is formed to include a plurality of depth individual-signals representing the depth for the plurality of respective divisions.

Typically, a luminance signal is in the form of a serial signal including an effective portion corresponding to an image display region, and a non-effective portion corresponding to a non-image display region. In the effective portion, there are a plurality of luminance individual-signals which represent the luminance for a plurality of respective divisions of one frame of an image to be displayed. As a result, in a case where luminance values are extracted from the luminance signal, a luminance-value extraction processing is applied to the effective portion of the luminance signal. This processing is executed, irrespective of whether an image to be displayed is three- or two-dimensional.

(8) The apparatus according to mode (7), wherein the image signal is formed such that the depth signal is embedded in the luminance signal, by replacing ones of the luminance individual-signals which are present in a fraction of the effective portion of the luminance signal, with the depth individual-signals corresponding to an image corresponding to an entirety of the effective portion.

For the image display apparatus according to the previous mode (7), in a case where the depth signal is embedded into the luminance signal, it is preferable that the location where the depth signal is to be embedded into the luminance signal is known. Such a location may be selected to be at any of the effective portion and the non-effective portion of the luminance signal.

However, the non-effective portion of the luminance signal is a portion which is not intended to undergo information extraction processing for extracting some information from the luminance signal. If the depth signal is nevertheless embedded into such a non-effective portion, then the execution of the information extraction processing is required not only for the effective portion but also the non-effective portion, with the need of unavoidable major modifications to the conventional procedures in the information extraction processing.

In contrast, in the image display apparatus according to this mode, ones of the luminance individual-signals which are present in a fraction of the effective portion of the luminance signal, are replaced with the depth individual-signals corresponding to an image corresponding to an entirety of the effective portion, thereby embedding the depth signal into the luminance signal, resulting in the formation of an image signal including these luminance and depth signals.

This image display apparatus would therefore allow the extraction of the depth signal from the image signal, without requiring execution of the information extraction processing for the non-effective portion of the image signal, with the result that the extraction of the depth signal from the image signal does not require major modifications to the conventional procedures in the information extraction processing.

(9) The apparatus according to mode (8), wherein the fraction of the effective portion corresponds to an edge area of the image display region corresponding to the entirety of the effective portion.

In the image display apparatus according to the previous mode (8), embedding a depth signal into a luminance signal sacrifices a fraction of an effective portion of the luminance signal, possibly resulting in the appearance of its effects on a displayed image.

In contrast, in the image display apparatus according to this mode, a portion of a luminance signal which is sacrificed for embedding thereinto a depth signal is selected to correspond to an edge area of an image display region. In addition, in a case where noises are locally generated in an image display region, these noises are less noticeable to a viewer when the noises are generated in an edge area of the image display region, than when the noises are generated in the center area of the image display region.

Therefore, this image display apparatus, in which a depth signal is embedded in an effective portion of a luminance signal, would nevertheless avoid a viewer's strong perception of resulting changes in the image quality.

(10) The apparatus according to mode (9), further comprising a scanner two-dimensionally scanning the light modulated by the wavefront-curvature modulator, wherein the scanner performs a first scan for scanning the light in a first scan direction, per each frame of an image to be displayed, and a second scan for scanning the light in a second scan direction intersecting with respect to the first scan direction, to thereby form the image in a plurality of scan lines, wherein a scan region which is an overall region in which the light is two-dimensionally scanned by the scanner is configured to be larger than the image display region, to thereby allow the image non-display region to be located outside the image display region, wherein the image display region is formed with the plurality of scan lines, wherein the effective portion is present for each of the plurality of scan lines, and wherein the fraction of the effective portion corresponds to an edge area of a corresponding one of the plurality of scan lines to an entirety of the effective portion.

Although an example of the "scanner" set forth in this mode is a scanner in its narrow sense, the "scanner" set forth in this mode is met, if only a scanning function is present, whatever the type is.

(11) The apparatus according to mode (7), wherein the image signal is formed by embedding into the non-effective portion of the luminance signal, the depth individual-signals corresponding to an image corresponding to the effective portion preceding or subsequent to the non-effective portion.

In this image display apparatus, embedment of a depth signal into a luminance signal, because of no need of sacrificing an effective portion of the luminance signal, which is to say, a portion corresponding to an image display region, is allowed without any concerns about image quality changes resulting from the embedment of the depth signal into the luminance signal.

(12) The apparatus according to any one of modes (1) through (3), wherein the controller includes:

an entry section into which there are entered the luminance and depth signals which have previously been synchronized relative to each other; and an output section outputting the luminance and depth signals entered to the intensity modulating section and the wavefront-curvature modulator in synchronization with each other.

In this image display apparatus, a luminance signal and a depth signal are entered (e.g., in parallel), with these having previously been synchronized relative to each other, and these entered luminance and depth signals are delivered, in synchronization with each other, to the intensity modulating section and the wavefront-curvature modulator.

(13) An apparatus for signal processing which supplies signals to an image display section displaying an image representing a three-dimensional object to be displayed, in an image display region in which the image is to be displayed, the apparatus comprising:

a signal output section performing outputting of the luminance signal to the image display section, and outputting of a depth signal indicative of depth of the image to the image display section, with the depth signal being in the form of a signal corresponding to depth data produced in a rendering process for the object to be displayed.

This signal processing apparatus provides a signal processing apparatus suitably usable in combination with the image display apparatus according to the previous mode (1).

This signal processing apparatus may be in a type allowing a luminance signal and a depth signal to be outputted to the controller in parallel or in series, in a type allowing a luminance signal and a depth signal to be outputted to the controller, with each being in synchronization with a clock signal, or in a type with these signals being in parallel or in series, in a type allowing a luminance signal and a depth signal to be outputted to the controller in non-synchronization with each other, but in a format allowing these luminance and depth signals to be later synchronized with each other, or using respective control signals for these luminance and depth signals.

This signal processing apparatus, for convenience of functional distinction from the image display apparatus according to any one of the previous modes (1) through (12), may be defined as an apparatus exclusively providing interface between signals entering the signal processing apparatus, and signals outputted to the image display apparatus. However, such a signal processing apparatus, which is not essential to be constituted physically independent of the image display apparatus, may be constituted integrally with the image display apparatus, for example, in a manner in which the signal processing apparatus is accommodated within a common housing together with the image display apparatus.

More specifically, the signal processing apparatus according to this mode and the controller set forth in any one of the previous modes (1) through (12) may be in the form of an integral image display system accommodating within a common housing these signal processing apparatus and controller, or the signal processing apparatus according to this mode and the controller set forth in any one of the previous modes (1) through (12) may be provided so as to be accommodated within respective separate housings, with physical independency.

Therefore, the "image display section" set forth in this mode may be interpreted to, for example, mean a portion of a system in which the signal processing apparatus according to this mode and the aforementioned image display apparatus are accommodated within a common housing, which portion corresponds to the image display apparatus, or, when the signal processing apparatus according to this mode and the aforementioned image display apparatus are accommodated within respective separate housings, may be interpreted to mean the image display apparatus. The interpretation may be applicable to the signal processing apparatuses described below.

(14) The apparatus according to mode (13), wherein the depth signal is a signal corresponding to the depth data which is produced during hidden surface elimination implemented in the rendering process.

(15) The apparatus according to mode (13) or (14), wherein the depth data is Z-value data indicative of a Z-value which is temporarily stored in a Z-buffer when a Z-buffer technique is implemented for hidden surface elimination in the rendering process.

This signal processing apparatus provides a signal processing apparatus suitably usable in combination with the image display apparatus according to the previous mode (2) or (3).

(16) The apparatus according to any one of modes (13) through (15), wherein the signal output section outputs the luminance and depth signals in non-synchronization with each other.

This signal processing apparatus provides a signal processing apparatus suitably usable in combination with the image display apparatus according to the previous mode (4).

(17) The apparatus according to mode (16), wherein the signal output section outputs the luminance signal in the form of a signal including an effective portion in which there is present an effective signal for displaying the image, and a non-effective portion in which the effective signal is absent, and wherein the apparatus further comprises means for embedding a start signal into the luminance signal at the non-effective portion preceding the effective portion, the start signal being predetermined independent of the effective signal present in the effective portion.

This signal processing apparatus provides a signal processing apparatus suitably usable in combination with the image display apparatus according to the previous mode (5).

(18) The apparatus according to any one of modes (13) through (15), further comprising an image signal generator generating an image signal by embedding the depth signal into the luminance signal, and wherein the signal output section outputs the generated image signal to the image display section.

This signal processing apparatus provides a signal processing apparatus suitably usable in combination with the image display apparatus according to the previous mode (6).

(19) The apparatus according to mode (18), wherein the luminance signal is in the form of a signal including an effective portion corresponding to the image display region in which the image display section displays the image, and a non-effective portion corresponding to an image non-display region in which the image display section does not display the image, the effective portion including a plurality of luminance individual-signals representing the luminance for a plurality of respective divisions of one frame of the image, and wherein the depth signal is formed to include a plurality of depth individual-signals representing the depth for the plurality of respective divisions.

This signal processing apparatus provides a signal processing apparatus suitably usable in combination with the image display apparatus according to the previous mode (7).

(20) The apparatus according to mode (19), wherein the image signal is formed by replacing ones of the luminance individual-signals which are present in a fraction of the effective portion of the luminance signal, with the depth individual-signals corresponding to an image corresponding to an entirety of the effective portion, for the depth signal to be embedded into the luminance signal.

This signal processing apparatus provides a signal processing apparatus suitably usable in combination with the image display apparatus according to the previous mode (8).

(21) The apparatus according to mode (20), wherein the fraction of the effective portion corresponds to an edge area of the image display region corresponding to the entirety of the effective portion.

This signal processing apparatus provides a signal processing apparatus suitably usable in combination with the image display apparatus according to the previous mode (9).

(22) The apparatus according to mode (21), wherein the image display section includes a scanner two-dimensionally scanning light modulated by the wavefront-curvature modulator, wherein the scanner performs a first scan for scanning the light in a first scan direction, per each frame of an image to be displayed, and a second scan for scanning the light in a second scan direction intersecting with respect to the first scan direction, to thereby form the image in a plurality of scan lines, wherein a scan region which is an overall region in which the light is two-dimensionally scanned by the scanner is configured to be larger than the image display region, to thereby allow the image non-display region to be located outside the image display region, wherein the image display region is formed with the plurality of scan lines, wherein the effective portion is present for each of the plurality of scan lines, and wherein the fraction of the effective portion corresponds to an edge area of a corresponding one of the plurality of scan lines to an entirety of the effective portion.

This signal processing apparatus provides a signal processing apparatus suitably usable in combination with the image display apparatus according to the previous mode (10).

(23) The apparatus according to mode (19), wherein the image signal is formed by embedding into the non-effective portion of the luminance signal, the depth individual-signals corresponding to an image corresponding to the effective portion preceding or subsequent to the non-effective portion.

This signal processing apparatus provides a signal processing apparatus suitably usable in combination with the image display apparatus according to the previous mode (11).

(24) The apparatus according to any one of modes (13) through (15), wherein the signal output section outputs the luminance and depth signals in synchronization with each other.

This signal processing apparatus provides a signal processing apparatus suitably usable in combination with the image display apparatus according to the previous mode (12).

(25) The apparatus according to mode (16) or (24), wherein the signal output section outputs the luminance signal via a single set of RGB signal lines, while outputting the depth signal via a signal line different in type from the RGB signal lines.

(26) The apparatus according to mode (16) or (24), wherein the signal output section outputs the luminance signal via one of a plurality of sets of RGB signal lines, while outputting the depth signal via another set of RGB signal lines.

(27) An apparatus for displaying to a viewer an image stereoscopically representing a three-dimensional object to be displayed, the apparatus comprising:

an emitter emitting light, having an intensity modulating section capable of intensity modulation for modulating an intensity of the light emitted from the emitter;

a wavefront-curvature modulator capable of wavefront-curvature modulation for modulating a curvature of wavefront of the light emitted from the emitter; and a controller controlling the intensity modulation and the wavefront-curvature modulation, based on a luminance signal indicative of luminance of the image in association with each sub-area, and a depth signal indicative of depth of the image in association with each sub-area;

wherein the controller includes:

(a) an entry section into which an image signal formed by embedding the depth signal into the luminance signal is entered; and (b) an output section extracting the luminance and depth signals from the image signal entered, and, upon synchronization of the luminance and depth signals, outputting the extracted luminance and depth signals to the intensity modulating section and the wavefront-curvature modulator.

Based on the findings described for the previous mode (6), also in the image display apparatus according to this mode, a image signal formed by embedding a depth signal into a luminance signal is entered. That is to say, for example, a luminance signal and a depth signal are entered in a common serial signal.

Further, also in this image display apparatus, the luminance and depth signals are extracted from the entered image signal. The extracted luminance and depth signals, upon synchronized relative to each other, are delivered to the intensity modulation section and the wavefront-curvature modulator.

(28) The apparatus according to mode (27), wherein the luminance signal is in the form of a signal including an effective portion corresponding to an image display region in which the apparatus displays the image and, a non-effective portion corresponding to an image non-display region in which the apparatus does not display the image, the effective portion including a plurality of luminance individual-signals representing the luminance for a plurality of respective divisions of one frame of the image, and wherein the depth signal is formed to include a plurality of depth individual-signals representing the depth for the plurality of respective divisions.

(29) The apparatus according to mode (28), wherein the image signal is formed such that the depth signal is embedded in the luminance signal, by replacing ones of the luminance individual-signals which are present in a fraction of the effective portion of the luminance signal, with the depth individual-signals corresponding to an image corresponding to an entirety of the effective portion.

Similar to the image display apparatus according to the previous mode (8), this image display apparatus, because of the extraction of the depth signal from the image signal, requires no execution of the information extraction processing for the non-effective portion of the image signal, allowing the extraction of the depth signal from the image signal, without no major modifications to the conventional procedures in the information extraction processing.

(30) The apparatus according to mode (28), wherein the image signal is formed by embedding into the non-effective portion of the luminance signal, the depth individual-signals corresponding to an image corresponding to the effective portion preceding or subsequent to the non-effective portion.

Similar to the image display apparatus according to the previous mode (11), this image display apparatus allows embedment of a depth signal into a luminance signal, without any concerns about image quality changes resulting from the embedment of the depth signal into the luminance signal.

(31) An apparatus for signal processing which supplies a luminance signal to an image display section displaying an image representing a three-dimensional object to be displayed, in an image display region in which the image is to be displayed, the apparatus comprising:

an image signal generator generating an image signal by embedding a depth signal representing depth of the image, into the luminance signal; and a signal output section outputting the generated image signal to the image display section.

This signal processing apparatus provides a signal processing apparatus suitably usable in combination with the image display apparatus according to the previous mode (27).

(32) The apparatus according to mode (31), wherein the luminance signal is in the form of a signal including an effective portion corresponding to an image display region in which the apparatus displays the image and, a non-effective portion corresponding to an image non-display region in which the apparatus does not display the image, the effective portion including a plurality of luminance individual-signals representing the luminance for a plurality of respective divisions of one frame of the image, and wherein the depth signal is formed to include a plurality of depth individual-signals representing the depth for the plurality of respective divisions.

This signal processing apparatus provides a signal processing apparatus suitably usable in combination with the image display apparatus according to the previous mode (28).

(33) The apparatus according to mode (32), wherein the image signal is formed such that the depth signal is embedded in the luminance signal, by replacing ones of the luminance individual-signals which are present in a fraction of the effective portion of the luminance signal, with the depth individual-signals corresponding to an image corresponding to an entirety of the effective portion.

This signal processing apparatus provides a signal processing apparatus suitably usable in combination with the image display apparatus according to the previous mode (29).

(34) The apparatus according to mode (32), wherein the image signal is formed by embedding into the non-effective portion of the luminance signal, the depth individual-signals corresponding to an image corresponding to the effective portion preceding or subsequent to the non-effective portion.

This signal processing apparatus provides a signal processing apparatus suitably usable in combination with the image display apparatus according to the previous mode (30).

(35) The apparatus according to mode (13), supplying the luminance and depth signals to the image display section, while supplying to a reproducing device reproducing a physical effect other than an image, a control signal for control of the reproducing device, and further comprising:

a storage medium; and a signal storing section, prior to supply to the image display section and the reproducing device, storing the image signal and the control signal into the storage medium at a plurality of storage blocks positionally associated with each other, respectively, the image signal and the control signal being to be processed in the image display section and the reproducing device, respectively, in synchronization with each other.

This signal processing apparatus supplies an image signal to an image display section, while supplying to a reproducing device reproducing a physical effect other than an image, a control signal for control of the reproducing device. To the image display section and the reproducing device, there are used the image signal and the control signal in synchronization with each other, to thereby allow the image representation by the image display section and the phenomenon reproduction by the reproducing device, to be synchronized relative to each other.

This signal processing apparatus, when compared with a case where the image signal and the control signal, which are to be used in synchronization with each other in the image display section and the reproducing device, respectively, are required to be stored in respective separate storage media, would allow the positional relationship between these image and control signals to be enhanced. As a result, this signal processing apparatus could offer a greater ease in synchronizing these image and control signals relative to each other in a simple and precise manner.

The "physical effect other than an image" set forth in this mode may be defined to include, for example, other effects (e.g., environmental light) perceivable via the human visual sense, audio effects (e.g., sound) perceivable via the human auditory sense, tactile effects (e.g., temperature, humidity, vibration, inclination, etc.) perceivable via the human tactile sense, or olfactory effects (e.g., scent) perceivable via the human olfactory sense.

(36) The apparatus according to mode (35), further comprising:

an interface in common to the image signal and the control signal; and a transmitting circuit in common to the image signal and the control signal, which transmits the image signal and the control signal, upon retrieved from the storage medium, to the image display section and the reproducing device, respectively.

This signal processing apparatus, because of its capability of transmitting the image signal and the control signal to the image display section and the reproducing device, via common interface and transmitting circuit, could allow the transmission to be performed in a simple and precise manner with ease, when compared with a case where the image signal and the control signal are required to be transmitted via respective separate interfaces.

(37) The apparatus according to mode (35) or (36), wherein the image to be displayed by the image display section is formed with a group of a plurality of frames, wherein the storage medium is assigned a plurality of frame-by-frame storage areas with the same number as the number of the frames forming the image, the plurality of frame-by-frame storage areas used for storing the image signal and the control signal per each frame of the image, and wherein the signal storing section stores the image signal and the control signal into the frame-by-frame storage areas per each frame of the image.

This signal processing apparatus, because of its capability of storing the image signal and the control signal into the same storage medium per each frame of an image, allows the image signal and the control signal, which are used in association with the same frame, to be stored into the storage medium, with the image and control signals being positionally associated with each other.

Therefore, this signal processing apparatus allows the image signal and the control signal retrieved from the storage medium, to be synchronized relative to each other, per each frame of an image, with ease, when compared with a case where the image and control signals used in association with the same frame, are stored into the storage medium, without being positionally associated with each other.

It is added that the signal processing apparatus according to the previous mode (35) or (36) may be practiced, for example, in an arrangement in which, with each frame of an image being composed with a group of a plurality of fields, the image signal and the control signal are stored into the storage medium, with positional association, per each field of each frame of an image.

(38) The apparatus according to mode (37), wherein the signal storing section stores the control signal into each of the frame-by-frame storage areas on an upstream side of a direction in which the image signal and the control signal are retrieved from each of the frame-by-frame storage areas for transmission.

This signal processing apparatus would offer a greater ease in supplying the control signal to the reproducing device, prior to the supply of the image signal, on a frame-by-frame basis.

(39) The apparatus according to mode (37), wherein the signal storing section stores the control signal into each of the frame-by-frame storage areas on a downstream side of a direction in which the image signal and the control signal are retrieved from each of the frame-by-frame storage areas for transmission.

This signal processing apparatus would offer a greater ease in supplying the image signal to the image display section, prior to the supply of the control signal, on a frame-by-frame basis.

(40) The apparatus according to any one of modes (37) through (39), wherein one frame of an image to be displayed by the image display section is formed with a group of a plurality of lines, wherein each of the frame-by-frame storage areas is assigned a plurality of line-by-line storage regions with the same number as the number of the lines forming each frame of the image, the plurality of line-by-line storage regions used for storing the image signal and the control signal per each line of each frame of the image, and wherein the signal storing section stores the image signal and the control signal into the line-by-line storage regions per each line of each frame of the image.

This signal processing apparatus, because of its capability of storing the image signal and the control signal into the same storage medium per each line of an image, allows the image signal and the control signal, which are used in association with the same line, to be stored into the storage medium, with the image and control signals being positionally associated with each other.

Therefore, this signal processing apparatus allows the image signal and the control signal retrieved from the storage medium, to be synchronized relative to each other, per each line of an image, with ease, when compared with a case where the image and control signals used in association with the same line, are stored into the storage medium, without being positionally associated with each other.

(41) The apparatus according to mode (40), wherein the signal storing section stores the control signal into each of the line-by-line storage regions on an upstream side of a direction in which the image signal and the control signal are retrieved from each of the line-by-line storage regions for transmission.

This signal processing apparatus would offer a greater ease in supplying the control signal to the reproducing device, prior to the supply of the image signal, on a line-by-line basis.

(42) The apparatus according to mode (40), wherein the signal storing section stores the control signal into each of the line-by-line storage regions on a downstream side of a direction in which the image signal and the control signal are retrieved from each of the line-by-line storage, regions for transmission.

This signal processing apparatus would offer a greater ease in supplying the image signal to the image display section, prior to the supply of the control signal, on a line-by-line basis.

(43) An apparatus for signal processing which supplies to an image display device for display of an image, an image signal for displaying the image, while supplying to a reproducing device reproducing a physical effect other than an image, a control signal for control of the reproducing device; the apparatus comprising:

a storage medium; and a signal storing section, prior to supply to the image display section and the reproducing device, storing the image signal and the control signal into the storage medium at a plurality of storage blocks positionally associated with each other, respectively, the image signal and the control signal being to be processed in the image display section and the reproducing device, respectively, in synchronization with each other.

Japanese Patent Application Publication No. 2001-359121 discloses one example of conventional image-display devices for displaying images. Such a type of image display devices is configured, in general, such that, upon entry of an image signal, i.e., a color signal and a luminance signal corresponding to individual pixels composing an image, individual pixels are displayed so as to have colors and luminance in accordance with those color signal and luminance signal, to thereby display the overall image.

In addition, to enhance the possible realism with which a viewer is viewing an image displayed by an image display apparatus, there exist techniques in which a physical effect other than an image is reproduced together with the image for a viewer's experience. The practice of these techniques could appeal to not only a viewer's visual sense but also to a viewer's other senses, allowing the viewer to view an image with enhanced realism.

To this end, in combination with an image display device, there is disposed as a peripheral device a reproducing device for reproducing a physical effect other than an image, with a control signal for operation of the reproducing device being supplied thereto. The supply of the control signal is performed in synchronization with the supply of an image signal to the image display device.

An example of such a reproducing device is a sound system for generating a sound, and the use of an image display device together with the sound system would enhance the realism of an image, in cooperation with a sound effect of the sound system.

However, according to an exemplary conventional practice of such techniques, a signal processing apparatus is used for supplying individual signals to the image display device and the peripheral device, and is conventionally configured so as to individually store an image signal for control of the image display device and a control signal for control of the peripheral device, into respective exclusive storage media.

For these reasons, the conventional signal-processing apparatus requires a special device for allowing image-signal processing in the image display device and control-signal processing in the peripheral device to be synchronized relative to each other, for operation of the peripheral device in synchronization with an image display operation by the image display device. As a result, this conventional signal-processing apparatus tends to become complex in configuration.

For overcoming such shortcomings, the signal processing apparatus according to this mode is provided for offering a greater ease in synchronizing an image signal and a control signal relative to each other.

The signal processing apparatus according to this mode, when compared with a case where an image signal and a control signal are required to be stored into respective separate storage media, would enhance the physical association between the image signal and the control signal. As a result, this signal processing apparatus could offer a greater ease in synchronizing the image signal and the control signal relative to each other in a simple and precise manner.

The "image signal" set forth in this mode may be defined to at least include a luminance signal indicative of luminance of individual pixels of an image, to include such a luminance signal and a color signal indicative of colors of individual pixels, or to include these luminance and color signals, and a depth signal indicative of depth of an image.

The "physical effect other than an image" set forth in this mode may be defined to include, for example, other effects (e.g., environmental light) perceivable via the human visual sense, audio effects (e.g., sound) perceivable via the human auditory sense, tactile effects (e.g., temperature, humidity, vibration, inclination, etc.) perceivable via the human tactile sense, or olfactory effects (e.g., scent) perceivable via the human olfactory sense.

(44) The apparatus according to mode (43), further comprising:

an interface in common to the image signal and the control signal; and a transmitting circuit in common to the image signal and the control signal, which transmits the image signal and the control signal, upon retrieved from the storage medium, to the image display device and the reproducing device, respectively.

This signal processing apparatus, because of its capability of transmitting the image signal and the control signal to the image display device and the reproducing device, via common interface and transmitting circuit, could allow the transmission to be performed in a simple and precise manner with ease, when compared with a case here the image signal and the control signal are required to be transmitted via respective separate interfaces.

The "transmitting" set forth in this mode may be performed by wire, or wireless

(45) The apparatus according to mode (43) or (44), wherein the mage to be displayed by the image display device is formed with a group of a plurality of frames, wherein the storage medium is assigned a plurality of frame-by-frame storage areas with the same number as the number of the frames forming the image, the plurality of frame-by-frame storage areas used for storing the image signal and the control signal per each frame of the image, and wherein the signal storing section stores the image signal and the control signal into the frame-by-frame storage areas per each frame of the image.

This signal processing apparatus, because of its capability of storing the image signal and the control signal into the same storage medium per each frame of an image, allows the image signal and the control signal, which are used in association with the same frame, to be stored into the storage medium, with the image and control signals being positionally associated with each other.

Therefore, this signal processing apparatus allows the image signal and the control signal retrieved from the storage medium, to be synchronized relative to each other, per each frame of an image, with ease, when compared with a case where the image and control signals used in association with the same frame, are stored into the storage medium, without these being positionally associated with each other.

(46) The apparatus according to mode (45), wherein the signal storing section stores the control signal into each of the frame-by-frame storage areas on an upstream side of a direction in which the image signal and the control signal are retrieved from each of the frame-by-frame storage areas for transmission.

This signal processing apparatus would offer a greater ease in supplying the control signal to the reproducing device, prior to the supply of the image signal, on a frame-by-frame basis.

(47) The apparatus according to mode (45), wherein the signal storing section stores the control signal into each of the frame-by-frame storage areas on a downstream side of a direction in which the image signal and the control signal are retrieved from each of the frame-by-frame storage areas for transmission.

This signal processing apparatus would offer a greater ease in supplying the image signal to the image display device, prior to the supply of the control signal, on a frame-by-frame basis.

(48) The apparatus according to any one of modes (45) through (47), wherein one frame of an image to be displayed by the image display device is formed with a group of a plurality of lines, wherein each of the frame-by-frame storage areas is assigned a plurality of line-by-line storage regions with the same number as the number of the lines forming each frame of the image, the plurality of line-by-line storage regions used for storing the image signal and the control signal per each line of each frame of the image, and wherein the signal storing section stores the image signal and the control signal into the line-by-line storage regions per each line of each frame of the image.

This signal processing apparatus, because of its capability of storing the image signal and the control signal into the same storage medium per each line of an image, allows the image signal and the control signal, which are used in association with the same line, to be stored into the storage medium, with the image and control signals being positionally associated with each other.

Therefore, this signal processing apparatus allows the image signal and the control signal retrieved from the storage medium, to be synchronized relative to each other, per each line of an image, with ease, when compared with a case where the image and control signals used in association with the same line, are stored into the storage medium, without these being positionally associated with each other.

(49) The apparatus according to mode (48), wherein the signal storing section stores the control signal into each of the line-by-line storage regions on an upstream side of a direction in which the image signal and the control signal are retrieved from each of the line-by-line storage regions for transmission.

This signal processing apparatus would offer a greater ease in supplying the control signal to the reproducing device, prior to the supply of the image signal on a line-by-line basis.

(50) The apparatus according to mode (48), wherein the signal storing section stores the control signal into each of the line-by-line storage regions on a downstream side of a direction in which the image signal and the control signal are retrieved from each of the line-by-line storage regions for transmission.

This signal processing apparatus would offer a greater ease in supplying the image signal to the image display device, prior to the supply of the control signal, on a line-by-line basis.

(51) An apparatus for signal processing which supplies to an image display device displaying an image, an image signal for display of the image, which includes a right-eye image signal and a left-eye image signal, the apparatus comprising:

a storage medium;

a first storing section, prior to supply to the image display device, storing into the storage medium at a plurality of storage blocks positionally associated with each other, the right-eye image signal, and a right-eye control signal indicating that the image signal is the right-eye image signal, the right-eye image signal and the right-eye control signal being to be used in the image display device in synchronization with each other; and a second storing section, prior to supply to the image display device, storing into the storage medium at a plurality of storage blocks positionally associated with each other, the left-eye image signal, and a left-eye control signal indicating that the image signal is the left-eye image signal, the left-eye image signal and the left-eye control signal being to be used in the image display device in synchronization with each other.

This signal processing apparatus would allow, in a case where an image signal supplied for display of an image to an image display device includes a right-eye image signal and a left-eye image signal, the right-eye and left-eye image signals to be easily discriminated from each other, owing to right-eye and left-eye control signals which are stored in a storage medium in association with the right-eye and left-eye image signals, respectively.

Further, this signal processing apparatus, because of storage of an image signal and a control signal in the same storage medium with the image and control signals being positionally associated with each other, per each eye of a viewer, would more easily allow the image and control signals to be synchronized relative to each other in an image display device.

(52) An apparatus for signal processing which supplies to an image display device displaying an image, an image signal including a luminance signal indicative of luminance of individual pixels of the image, and a depth signal indicative of depth of the image, the apparatus comprising:

a storage medium; and a signal storing section, prior to supply to the image display device, storing the image signal and the depth signal into the storage medium at a plurality of storage blocks positionally associated with each other, respectively, the image signal and the depth signal being to be used in the image display device in synchronization with each other.

This signal processing apparatus would allow an image display device to display an image in a stereoscopic manner. Further, this signal processing apparatus, because of its capability of storing of a luminance signal and a depth signal into the same storage medium with the luminance signal and the depth signal being positionally associated with each other, would allow the luminance signal and the depth signal to be more easily synchronized relative to each other in the image display device.

(53) An apparatus receiving an image signal for display of an image and a control signal to be processed in synchronization with the image signal, and displaying the image based on the received image and control signals, the apparatus comprising:

an interface in common to the image and control signals;

a receiving circuit, in common to the image and control signals, receiving the image and control signals via the interface;

a separating circuit separating the image and control signals received from the receiving circuit, from each other; and a display section-displaying the image based on the image and control signals separated by the separating circuit.

This image display apparatus, because of its capability of receiving the image signal and the control signal via the common interface, could allow the receipt to be performed in a simple and precise manner with ease, when compared with a case where the image signal and the control signal are required to be received via respective separate interfaces.

(54) The apparatus according to mode (53), wherein the image signal includes at least one of a color signal indicative of color of individual pixels of the image, and a luminance signal indicative of luminance of the individual pixels, and wherein the display section includes:

a light emitter emitting light modulated based on the image signal; and a modulating section modulating the modulated light emitted by the light emitter, based on the control signal.

This image display apparatus, once the synchronization between the image signal and the control signal has been ensured, would allow the modulation (e.g., intensity modulation) of light by the light emitter (e.g., a light source having an intensity modulating function, or a combination of a light source and an intensity modulator), and the modulation of light by the modulator (modulation of a characteristic quantity of light other than the intensity of light), to be performed in synchronization with each other.

(55) The apparatus according to mode (54), wherein the control signal includes a depth signal indicative of depth of the image, and wherein the modulator includes a wavefront-curvature modulating section modulating a curvature of wavefront of the light emitted by the light emitter, based on the depth signal.

This image display apparatus, because the curvature of wavefront of the modulated light emitted by the light emitter is modulated based on the depth signal, allows the image to be displayed with the depth represented by the depth signal, imparting depth perception to the image.

Further, this image display apparatus, once the synchronization between the image signal and the control signal has been ensured, would allow the modulation (e.g., intensity modulation) of light by the light emitter and the modulation of the curvature of wavefront of the light by the wavefront-curvature modulating section, to be performed in synchronization with each other.

Several presently preferred embodiments of the invention will be described in detail by reference to the drawings in which like numerals are used to indicate like elements throughout.

In FIG. 1, an image display device 10 of a retinal-scanning type according to a first embodiment of the present invention is conceptually illustrated in block diagram. This image display device 10 is used in connection with a signal processing device 12 which is constructed to be physically separate from or integral with the image display device 10.

The image display device 10 projects a beam of light (this constitutes an example of the "light" set forth in the above mode (1)) on a retina of a viewer's eye, while scanning the beam of light, based on an RGB signal (this constitutes an example of the "luminance signal" set forth in the above mode (1)) and a depth signal both supplied from the signal processing device 12, to thereby display to the viewer an image stereoscopically representing a three-dimensional object to be displayed. That is to say, this image display device 10 is classified as, what is called, a retinal scanning display.

An RGB signal is typically a signal formed by combining an R luminance-signal indicative of the luminance of a red-colored beam of light, a G luminance-signal indicative of the luminance of a green-colored beam of light and a B luminance-signal indicative of the luminance of a blue-colored beam of light, all of which are in parallel to each other.

The signal processing device 12 is constructed to include a computer 20, a memory unit 22 and a clock generator 24. The memory unit 22 is provided with an R/G/B buffer 30 and a Z-buffer 32, both of which will be described below.

Figure 2:
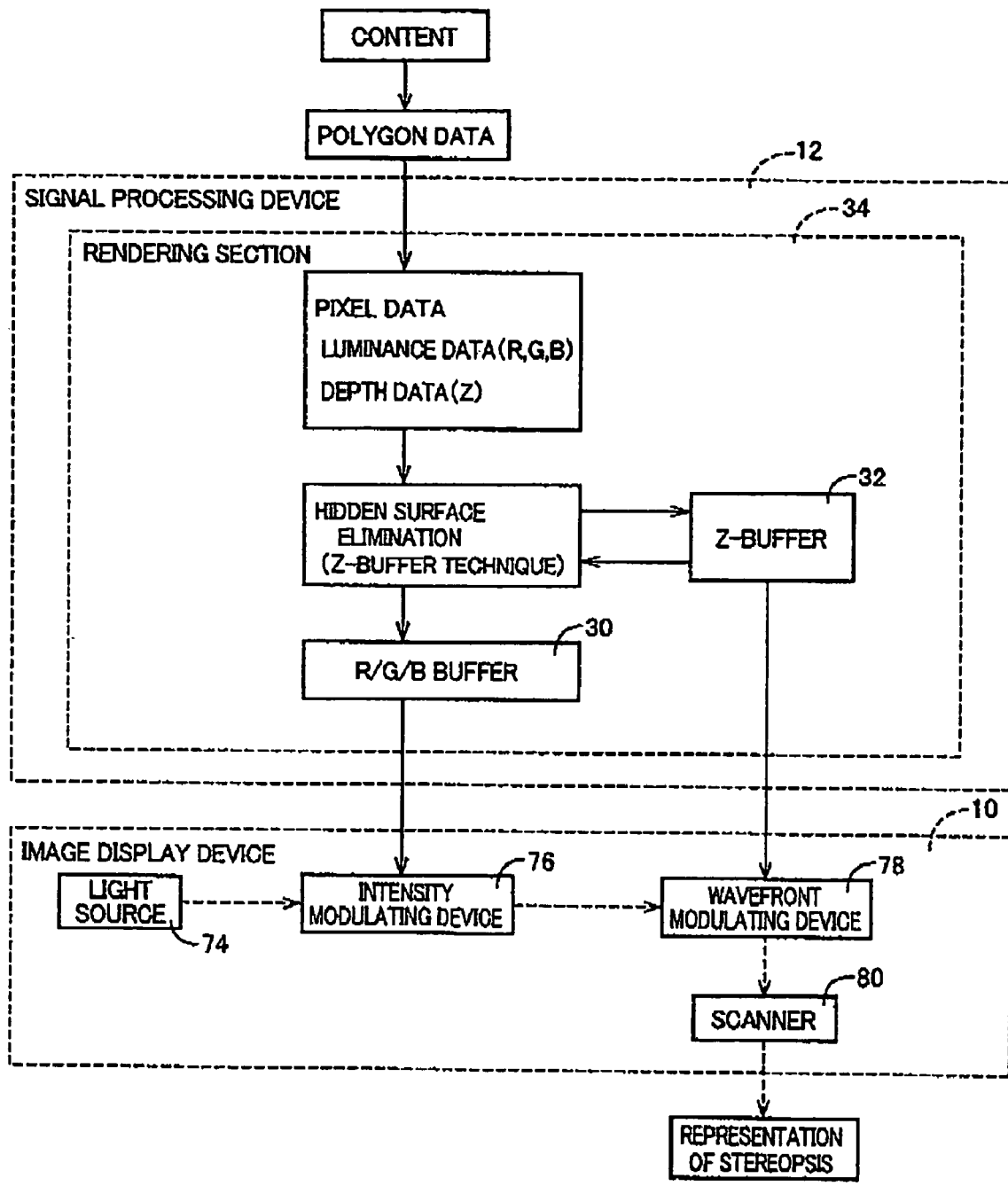
FIG. 2 is a block diagram conceptually illustrating a rendering unit 34 of the signal processing device 12 in FIG. 1.

This signal processing device 12 includes a rendering section 34, as illustrated in FIG. 2 conceptually depicting the processing of the rendering section in block diagram. In this rendering section 34, there are produced on the basis of polygon data geometrically representing a three-dimensional object to be displayed or a content to be displayed by the image display device 10, luminance value data indicative of luminance values for individual pixels, and depth data indicative of depths or Z-values for individual pixels. The luminance value data are stored in the R/G/B buffer 30 in association with individual pixels, while the depth data are stored in the Z-buffer 32 in association with individual pixels. A combination of the luminance value data and the depth data constitutes pixel data defining displaying conditions per each pixel.

Further, in this rendering section 34, for the thus-produced pixel data, hidden surface elimination is performed using a Z-buffer technique.

As is well known, in this Z-buffer technique, a sub-plurality of ones of a plurality of pixels composing an image to be displayed, which ones have identical display positions in an image display region of the image display device 10, are compared with each other with respect to the Z-values stored in the Z-buffer 32, to thereby determine a front-to-back order per each pixel, which is to say, whether each pixel is located nearer to or more remote from the viewer. Subsequently, in the R/G/B buffer 30, the luminance value data for a more remote pixel is not stored, or stored, provided that the luminance value data for a nearer pixel is subsequently stored to overwrite the preciously-stored data, with the result that only the luminance value data for a nearer pixel is ultimately stored.

The signal processing device 12 includes RGB terminals (video terminals) 40 (including R, G and B signal terminals), a USB terminal 42, and sync signal terminals 44. In parallel to these, the image display device 10 includes RGB terminals 50 (including R, G and B signal terminals), a USB terminal 52, and sync signal terminals 54, as well.

More specifically, the signal processing device 12 outputs an R signal indicative of the luminance value data produced for a red color, to the image display device 10, via a cable 56 (or otherwise by-wireless) between one of the RGB terminals 40 and one of the RGB terminals 50 both for the R signal; outputs a G signal indicative of the luminance value data produced for a green color, to the image display device 10, via a cable 56 (or otherwise by-wireless) between one of the RGB terminals 40 and one of the RGB terminals 50 both for the G signal; and outputs a B signal indicative of the luminance value data produced for a blue color, to the image display device 10, via a cable 56 (or otherwise by-wireless) between one of the RGB terminals 40 and one of the RGB terminals 50 both for the B signal. That is to say, the signal processing device 12 outputs the luminance value data for red color, the luminance value data for green color and the luminance value data for blue color, to the image display device 10, in parallel to each other.

The signal processing device 12 further outputs the produced depth data to the image display device 10 via a cable 58 (or otherwise by-wireless) between the USB terminals 42 and 52.

The signal processing device 12 is not designed to actively synchronize an RGB signal and a depth signal relative to each other, and then actively output them from the memory unit 22. An RGB signal and a depth signal are synchronized by the image display device 10. To this end, the image display device 10 is so constructed as to refer to a clock signal as described below, which is inputted from the signal processing device 12, provided that an RGB signal and a depth signal have been associated with each other, on a pixel-by-pixel basis, for allowing later establishment of synchronization therebetween. The signal processing performed by the image display device 10 is designed with a known correspondence between the RGB signal and the depth signal being presupposed.

The signal processing device 12 outputs a clock signal generated from the clock generator 24, to the image display device 10 via a cable 60 (or otherwise by-wireless) between the sync signal terminals 44 and 54. The clock signal includes a horizontal sync signal (indicated as "H signal" in FIG. 1), and a vertical sync signal (indicated as "V signal" in FIG. 1).

Figure 3:
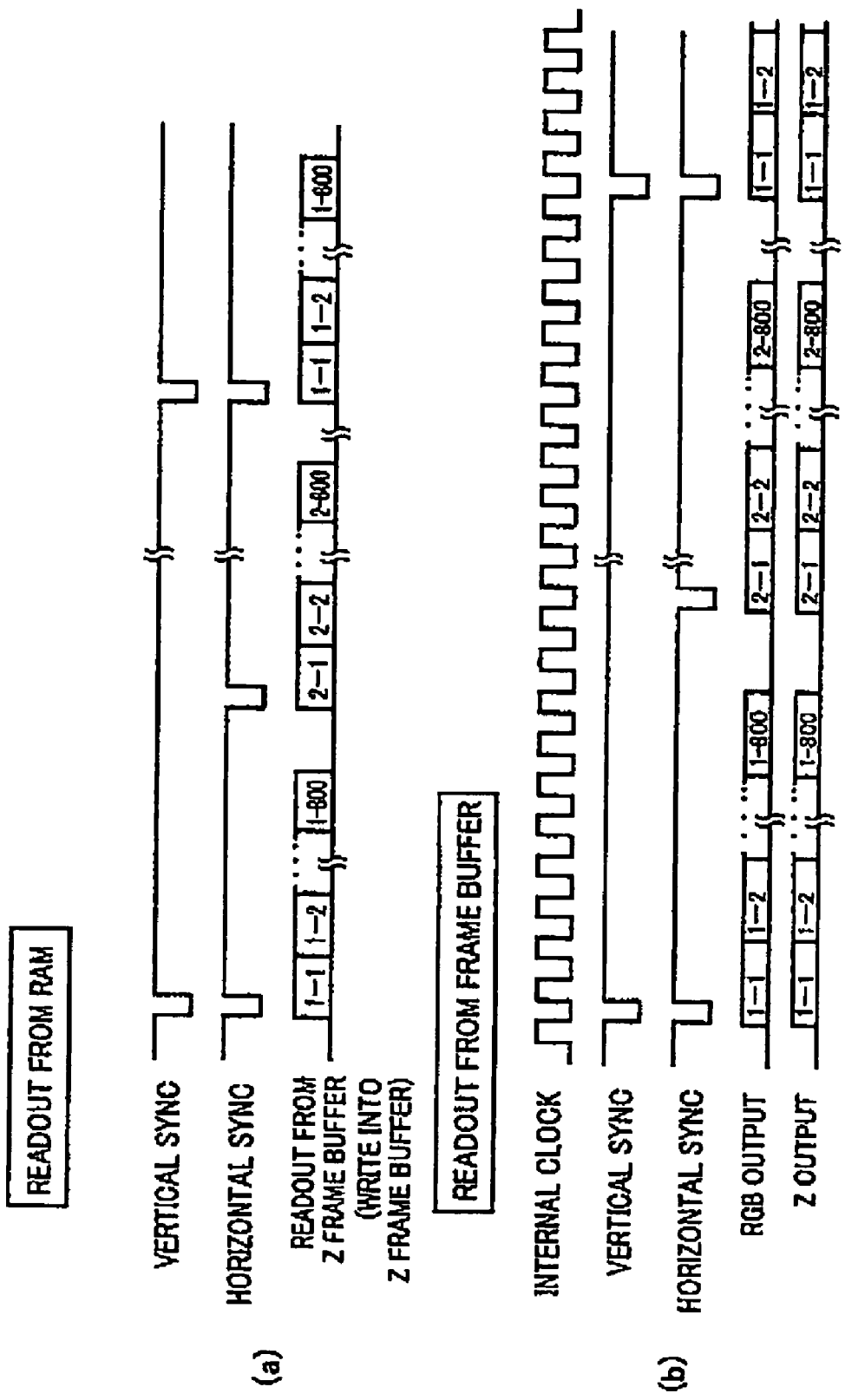
FIG. 3 is a time chart for explaining the timings of reading data from a RAM 96, an R/G/B frame buffer 92 and a Z frame buffer 100, respectively, all in FIG. 1.

As illustrated in FIG. 3 (a) in time chart, the vertical sync signal is generated per each frame of an image. On the other hand, the vertical sync signal is generated per each scan-line of each frame.

Referring then to FIG. 1, the image display device 10 will be described in more detail.

The image display device 10 is so constructed as to include an optical system 70, and a signal processing system or a controller 72. In the optical system 70, a light source (e.g., a semiconductor laser) 74 which emits a laser light beam (hereinafter, referred to simply as "light beam") is provided per each of RGB colors.

Further, an intensity modulating device (e.g., an acousto-optic modulating device) 76 is also provided on a color-by-color basis. Each intensity modulating device 76 modulates the intensity of the light beam per each color, in response to each luminance signal (R/G/B) entered into each intensity modulating device 76. However, when the light source 74 has a built-in function of modulating light intensity, like when the light source 74 is a semiconductor laser, the intensity modulating device 76, which is separate from the light source 74, may be eliminated.

Still further, in the optical system 70, there is also provided a wavefront modulating device 78 for modulating the curvature of wavefront of a light beam. The wavefront modulating device 78, although may be individually provided per each light beam of each color, may be solely provided for a composite light beam formed by combining light beams of three RGB colors. In any case, the wavefront modulating device 78 is constructed so as to include, for example, a converging lens or reflecting mirror which is disposed on the optical axis of a light beam, at a variable position or with a variable curvature.

As a result, a light beam (e.g., parallel light) entering the wavefront modulating device 78 is converted into diverging or converging light, and the curvature of wavefront of the diverging or converging light is modulated in response to a depth signal entered into the wavefront modulating device 78.

Yet further, in the optical system 70, there is provided a scanner 80 which a composite light beam, upon being wavefront-curvature-modulated, enters. The scanner 80 performs a first scan in which the composite light beam is scanned in a first scan direction (e.g., a horizontal scan direction), and a second scan in which the composite light beam is scanned in a second scan direction (e.g., a vertical scan direction) intersecting with respect to the first scan direction. The first and second scans cooperate to compose one frame of an image with a plurality of scan-lines.

In the present embodiment, the first scan is performed for a horizontal scan (a raster scan) in which a composite light beam is horizontally scanned in response to a horizontal sync signal, while the second scan is performed for a vertical scan in which a composite light beam is vertically scanned in response to a vertical sync signal.

The scanner 80 may be of a type allowing the horizontal and vertical scans to be performed using a common optical device, or may be of a type allowing the horizontal and vertical scans to be performed using separate optical devices. An example of the latter type allows the horizontal scan to be performed using a polygon mirror, while allowing the vertical scan to be performed using a galvano mirror which is disposed downstream from the polygon mirror.

A light beam, upon being scanned by the scanner 80, is projected onto the retina of the eye through a pupil of the viewer. As a result, an image stereoscopically representing a three-dimensional object is displayed to the viewer.

Figure 4:
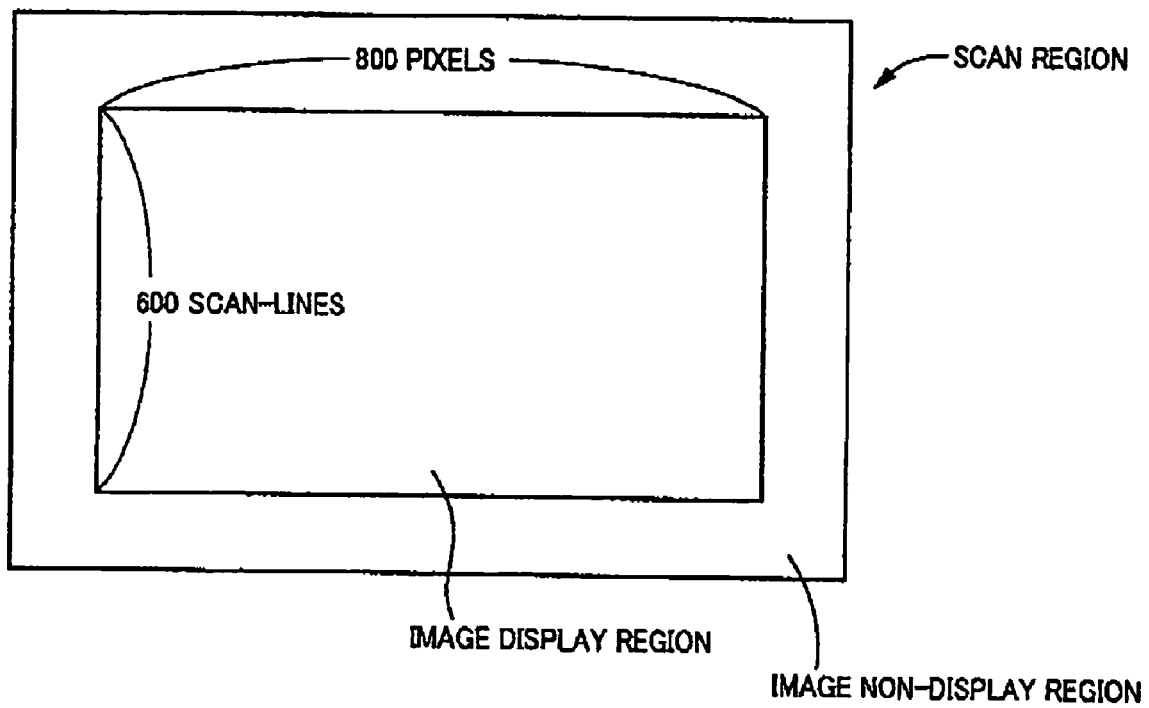
FIG. 4 is a front view for explaining a relationship between a scan region, an image display region and an image non-displayed region all used by the image display device 10 depicted in FIG. 1.

As illustrated in FIG. 4, a scan region which is an overall region in which a light beam is two-dimensionally scanned by the scanner 80, is configured to be larger than an image display region in which an image is displayed as a result of entry of a light beam into the pupil of the viewer's eye, to thereby allow an image non-display region in which no image is displayed, to be located outside the image display region. In the present embodiment, the image display region is formed, for example, with 600 scan-lines each of which is formed with 800 pixels.

Then, there will be described each format of the RGB signals and the depth signal, both of which are supplied from the image display device 10 to the signal processing device 12.

Figure 5:
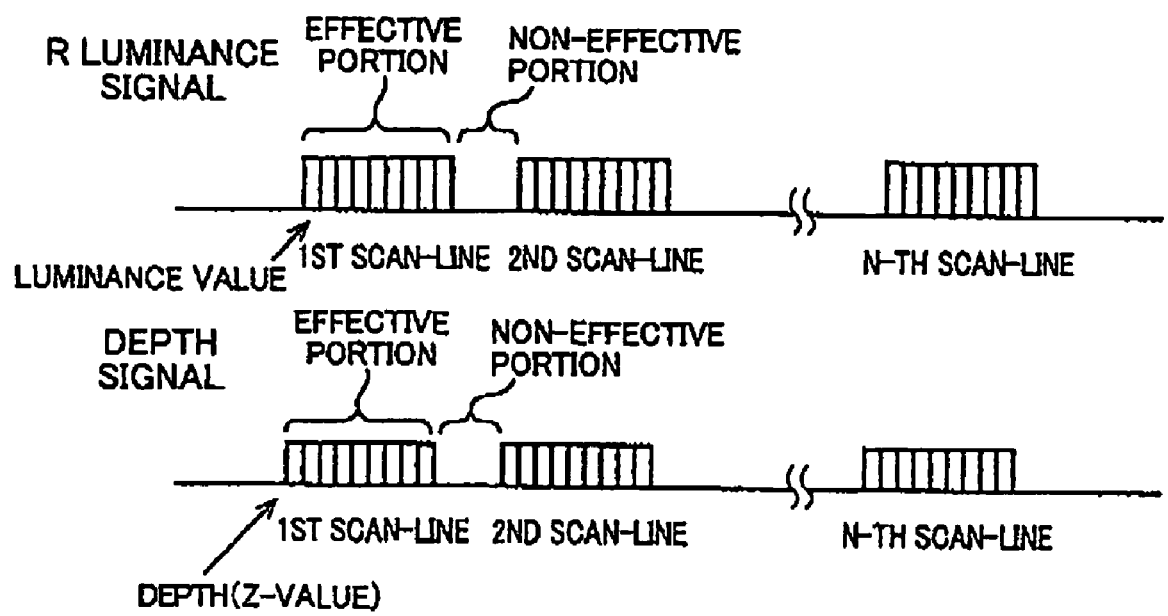
FIG. 5 is a time chart illustrating the forms of an RGB signal and a depth signal both in FIG. 1.

As illustrated in FIG. 5, the RGB signal (in FIG. 5, only an R luminance signal of an RGB signal is representatively illustrated) is in the form of a serial signal including an effective portion corresponding to the image display region, and a non-effective portion corresponding to the image non-display region. Within the effective portion of an RGB signal, there are a plurality of luminance individual-signals each representing a luminance on a pixel-by-pixel basis. Similarly, the depth signal is in the form a signal including a plurality of depth individual-signals each representing a depth or a Z-value on a pixel-by-pixel basis.

Although the optical system 70 of the image display device 10 has been described above, then the controller 72 will be described below.

As illustrated in FIG. 1, in the controller 72, there is disposed between the RGB terminals 50, 50 and 50, and the intensity modulating device 76, a series of a video-signal synchronizing circuit 90, the R/G/B buffer 92, and a video-signal processing circuit 94 interconnected in the description order. The R/G/B frame buffer 92 is a buffer for storing luminance value data in association with individual pixels, on a frame-by-frame basis of an image.

A similar series circuit is also provided between the USB terminal 52 and the wavefront modulating device 78. The USB terminal 52 is, however, connected through the RAM 96 to a series circuit of a video-signal synchronizing circuit 98, a Z frame buffer 100, and a video-signal processing circuit 102.

The image display device 10 further includes a clock generator 104 as an internal clock. As illustrated in FIG. 3 (*b*), the clock generator 104 generates an internal clock signal, and then divides the internal clock signal, to thereby generate a vertical sync signal (indicated as "V signal" in FIG. 1) and a horizontal sync signal (indicated as "H signal" in FIG. 1).

The depth signal supplied from the signal processing circuit 12 to the controller 72 through the USB terminal 52, upon being transformed into depth data, is stored into the RAM 96 in which the depth data is stored per each scan-line. As illustrated in FIG. 3(*a*), in response to the vertical and horizontal sync signals supplied from the signal processing device 12, the video-signal synchronizing circuit 98 retrieves the depth data from the RAM 96, and then writes the depth data into the Z frame buffer 100. In this Figure, the "1-1" denotes a start one of pixels, or the 1st pixel in a first scan-line, and the "1-800" denotes an end one of pixels, or the 800th pixel in the first scan-line.

Similarly, the RGB signal supplied from the signal processing circuit 12 to the controller 72 through the corresponding RGB terminals 50, 50 and 50, upon being transformed into the luminance value data (the R luminance value data, the G luminance value data, and the B luminance value data), is stored by the video-signal synchronizing circuit 90 into the R/G/B frame buffer 92, per each scan-line, in response to the vertical and horizontal sync signals supplied from the signal processing device 12.

The video-signal synchronizing circuits 90 and 98 are operated in response to a common clock signal, following that the RGB signal (luminance value data) and the depth signal (depth data, i.e., Z-value data) are concurrently retrieved in parallel, from the R/G/B buffer 30 and the RAM 96, respectively, per each scan-line.

As illustrated in FIG. 3(*b*) in time chart, the video-signal processing circuit 94 retrieves the luminance value data (i.e., the R luminance value data, the G luminance value data, and the B luminance value data) from the R/G/B/ frame buffer 92, in response to the vertical and horizontal sync signals supplied from the clock generator 104, on a pixel-by-pixel basis, and then outputs the luminance value data to the intensity modulating device 76. In this Figure, this is denoted by "RGB output."

Similarly, as illustrated in FIG. 3 (*b*) in time chart, the video-signal processing circuit 102 retrieves the depth data (i.e., Z-value data) from the Z frame buffer 100, in response to the vertical and horizontal sync signals supplied from the clock generator 104, on a pixel-by-pixel basis, and then outputs the depth data to the wavefront modulating device 78. In this Figure, this is denoted by "Z output."

The video-signal processing circuits 94 and 102 are operated in response to a common clock signal, with the result that the luminance value data and the depth data or Z-value data are concurrently retrieved in parallel, from the R/G/B frame buffer 92 and the Z frame buffer 100, respectively, on a pixel-by-pixel basis, and are then outputted to the intensity modulating device 76 and the wavefront modulating device 78, in parallel and in synchronization with each other, respectively.

As will be apparent from the above description, in the present embodiment, the Z-value, which is generated during the transformation of polygon data into pixel data in the rendering section 34 of the signal processing device 12, is transferred from the signal processing device 12 to the image display device 10, in which a stereoscopic image is displayed using the transferred Z-value. That is to say, the Z-value generated in the rendering section 34 is used also for representing the depth of an image.

Therefore, the present embodiment would make it unnecessary to produce depth information in the image display device 10, independently of the signal processing device 12, whereby the technique of acquiring depth information is improved, and the depth of a three-dimensional object to be displayed is represented with a stereoscopic image, with an improved efficiency.

Further, in the present embodiment, the RGB signals and the depth signal, which have not been previously synchronized relative to each other, are later synchronized relative to each other because of the co-action of the two video-signal synchronizing circuits 90 and 98, and then enter from the signal processing device 12 into the controller 72 in parallel. Additionally, those RGB and depth signals are outputted in parallel and in synchronization with each other, to the intensity modulating device 76 and the wavefront modulating device 78, respectively.

Therefore, the present embodiment would establish precise synchronization between luminance values and a depth, providing precise representation of a depth of a three-dimensional object to be displayed, resulting in the enhancement of reproducibility of a stereoscopic image with a greater ease.

Further, the present embodiment would enable the transfer of the depth signal from the signal processing device 12 to the image display device 10, using the USB terminals 42 and 52, which are ordinarily attached to those devices 10 and 12, without causing signal attenuation. Accordingly, the transfer of the depth signal does not require attaching special terminals to those devices 10 and 12.

As will be apparent from the above description, in the present embodiment, the image display device 10 constitutes an example of the "apparatus" according to the above mode (1), the light source 74 and the intensity modulating device 76 together constitute an example of the "emitter" set forth in the same mode, the intensity modulating device 76 constitutes an example of the "intensity modulating section" set forth in the same mode, and the wavefront modulating device 78 constitutes an example of the "wavefront-curvature modulator" set forth in the same mode.

Further, in the present embodiment, the video-signal synchronizing circuits 90 and 98 and the RAM 96 together constitute an example of the "synchronizer" set forth in the above mode (4), and the R/G/B frame buffer 92, the Z frame buffer 100, the video-signal processing circuits 94 and 102, and the clock generator 104 together constitute an example of the "output section" set forth in the same mode.

Still further, in the present embodiment, the signal processing device 12 constitutes an example of the "apparatus" according to the above mode (13), and the image display device 10 constitutes an example of the "image display section" set forth in the same mode.

Yet still further, in the present embodiment, the RGB terminals 40, 40 and 40, the USB terminal 42, a portion of the computer 20 which is assigned to retrieve the RGB signals from the R/G/B buffer 30, and then output them to the image display device 10 through the RGB terminals 40, 40 and 40, and to retrieve the Z-value data from the Z-buffer 32, and then output it to the image display device 10 through the USB terminal 42 together constitute an example of the "signal output section" set forth in the above mode (13), (16), (24) or (25).

Next, a second embodiment of the present invention will be described, provided that, because the present embodiment has common elements to the first embodiment, the common elements will be omitted in detailed description by reference using the identical reference numerals or names, while only the different elements will be described in greater detail below.

Figure 6:
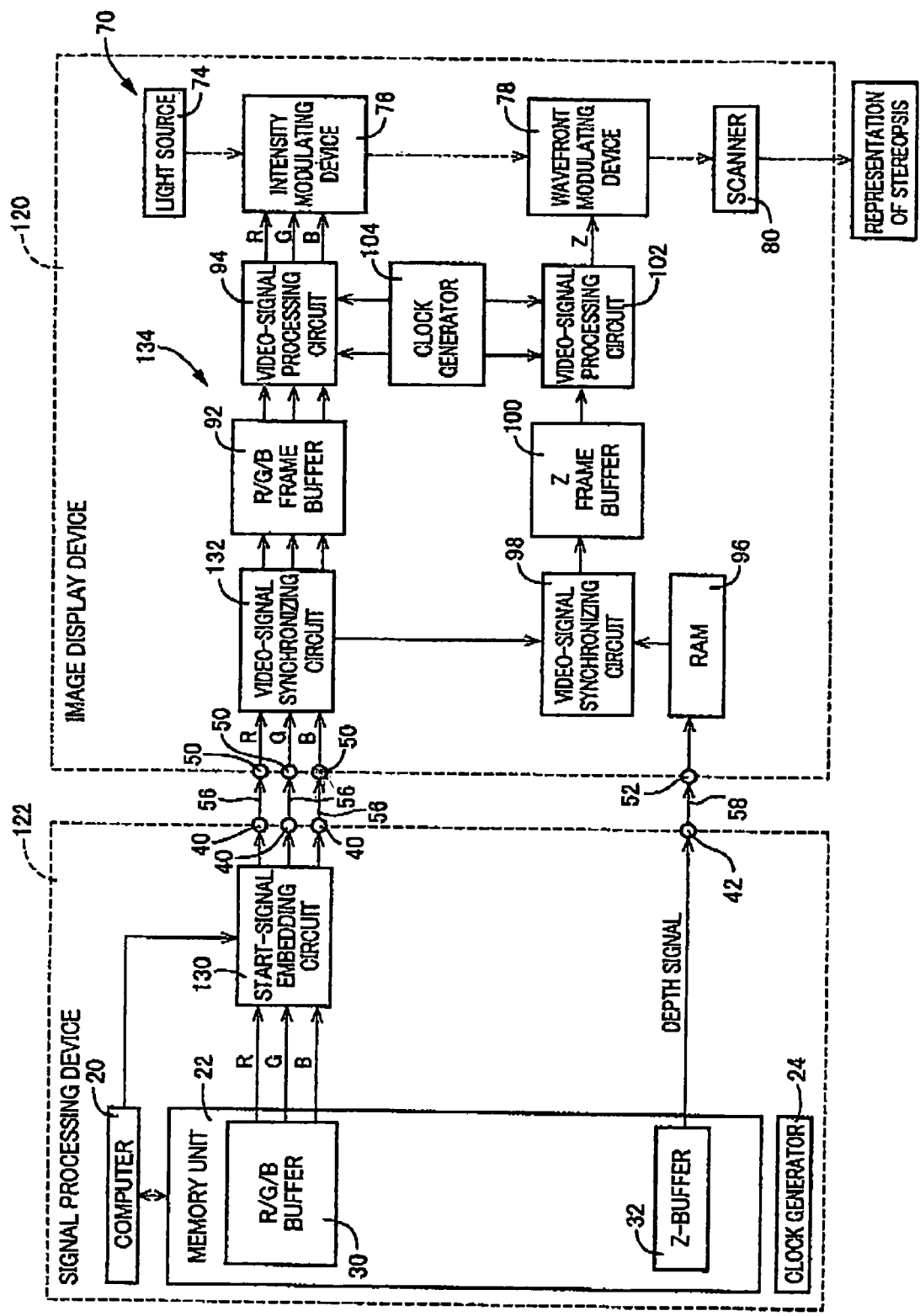
FIG. 6 is a block diagram conceptually illustrating an image display device 120 constructed according to a second embodiment of the present invention, together with a signal processing device 122.

In the present embodiment, as illustrated in FIG. 6, an image display device 120 and a signal processing device 122 are in common in basic construction to the image display device 10 and the signal processing device 12 in the first embodiment, respectively.

Further, similarly with the first embodiment, the R, G and B signals are transferred in parallel from the signal processing device 122 to the image display device 120 through the cables 56, 56 and 56 interconnecting the RGB terminals 40, 40 and 40 of the signal processing device 122 and the RGB terminals 50, 50 and 50 of the image display device 120. Additionally, the depth signal is transferred from the signal processing device 122 to the image display device 120 through the cable 58 interconnecting the USB terminal 42 of the signal processing device 122 and the USB terminal 52 of the image display device 120. That is to say, similarly with the first embodiment, the R, G and B signals and the depth signal are transferred in parallel from the signal processing device 122 to the image display device 120.

In the present embodiment, differently from the first embodiment, the signal processing device 122, however, incorporates an additional start-signal embedding circuit 130.

Figure 7:
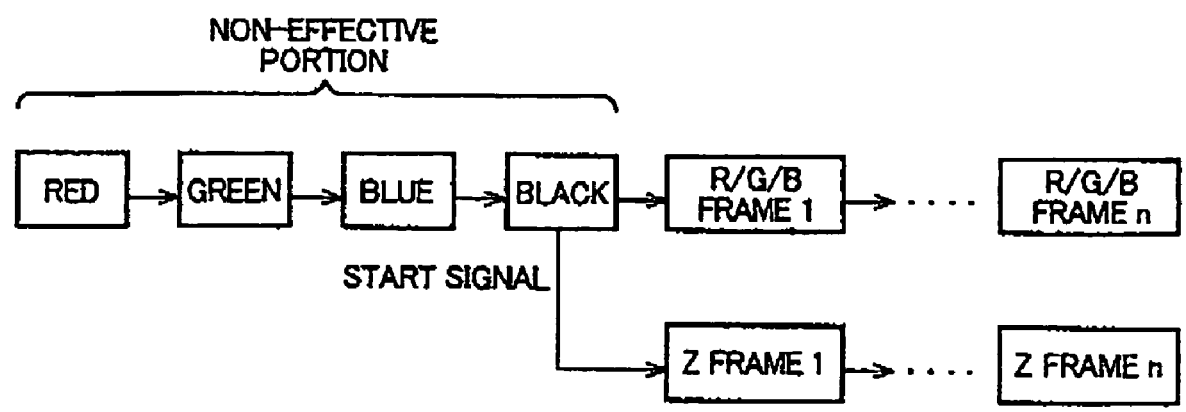
FIG. 7 is a time chart illustrating an RGB signal outputted from a start-signal embedding circuit 130 in FIG. 6.

As illustrated in FIG. 7, the start-signal embedding circuit 130 is provided for embedding a given start signal into the non-effective portion of each RGB signal supplied from the R/G/B buffer 30, independently of the luminance individual-signals which are present in the effective portion subsequent to the non-effective portion. The start signal is embedded, for example, into the non-effective portion of each serial RGB signal (e.g., the R luminance signal), which precedes the effective portion for displaying a succession of visual images. That is to say, the start signal is embedded, for example, into a location immediately before a succession of image frames.

In an example of FIG. 7, the luminance individual-signals are collectively and simply illustrated on a frame-by-frame basis of an image. The start signal, for it to become distinguishable from the luminance individual-signals present in the effective portion, is in the form of a previously-selected luminance signal which the luminance individual-signals cannot take.

In the example of FIG. 7, the start signal is in the form of a selected luminance signal sequentially indicative of an image-frame colored entirely red, an image-frame colored entirely green, an image-frame colored entirely blue, and an image-frame colored entirely black, in the description order.

A video-signal synchronizing circuit 132, once detects such a start signal from each RGB signal in which the start signal has been embedded, retrieves each RGB signal from the R/G/B buffer 30 for a first one of image frames, and concurrently retrieves, for the first image-frame, a depth signal from the RAM 96 through the video-signal synchronizing circuit 98. As a result, synchronization is established between the R, G and B signals, and the depth signal.

The R, G and B signals, and depth signal are processed by a controller 134 of the image display device 120 in a similar manner with that of the first embodiment, and resultantly, they are outputted to the intensity modulating device 76 and the wavefront modulating device 78, in parallel and synchronization with each other, respectively.

Therefore, the present embodiment allows the start signal capable of locating a start position of a series of each RGB signal, to enter the image display device 120, together with each of the original RGB signals, with the image display device 120 being capable of start detection for a series of each RGB signal using the start signal. As a result, this makes it easier to ensure precise synchronization between luminance values and a depth.

Further, the present embodiment allows each RGB signal and the start signal to be supplied to the image display device 120, not in parallel but in series, with the result that the start signal can be supplied to the image display device 120 without requiring any increase in the number of input terminals of the image display device 120.

As will be apparent from the above description, in the present embodiment, the video-signal synchronizing circuits 132 and 98 together constitute an example of the "synchronizer" set forth in the above mode (5), and the start-signal embedding circuit 130 constitutes an example of the "means for embedding a start signal" set forth in the above mode (17).

It is added that, although, in the present embodiment, the start signal is embedded into each RGB signal per each succession of visual images, the present invention may be practiced, for example, in a mode in which the start signal is embedded per each frame for using it as a vertical sync, or in a mode in which the start signal is embedded per each scan-line for using it as a horizontal sync.

Next, a third embodiment of the present invention will be described, provided that, because the present embodiment has common elements to the first embodiment, the common elements will be omitted in detailed description by reference using the identical reference numerals or names, while only the different elements will be described in greater detail below.

Figure 8:
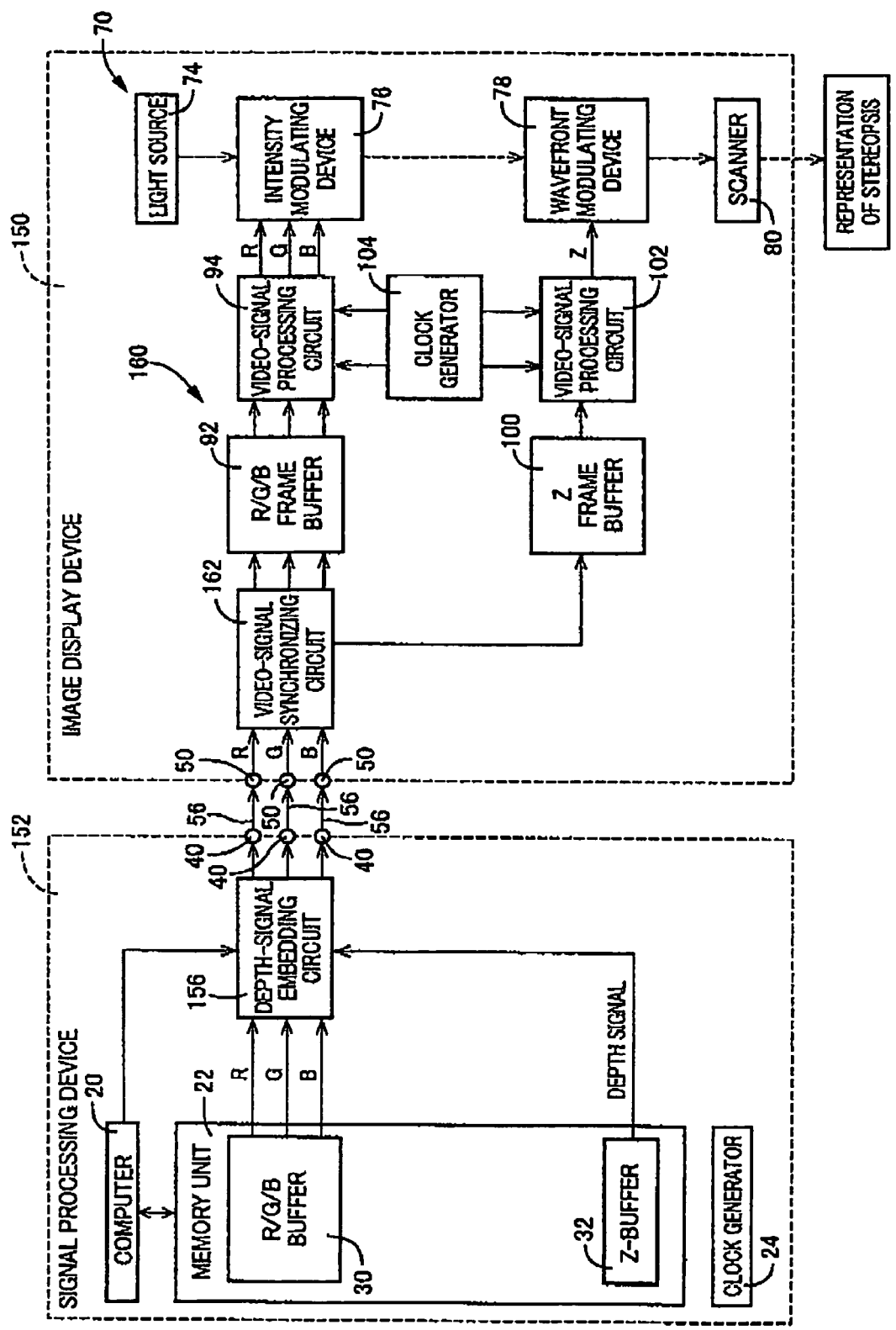
FIG. 8 is a block diagram conceptually illustrating an image display device 150 constructed according to a third embodiment of the present invention, together with a signal processing device 152.

In the present embodiment, as illustrated in FIG. 8, an image display device 150 and a signal processing device 152 are in common in basic construction to the image display device 10 and the signal processing device 12 in the first embodiment. Differently from the first embodiment, the signal processing device 152, however, incorporates an additional depth-signal embedding circuit 156 for embedding a depth signal into each RGB signal to produce a serial image-signal (video signal). Further, a controller 160 of the image display device 150, for accommodating the modifications of the signal processing device 152, is so configured as to convert a serial image-signal which has been received from the signal processing device 152, into RGB signals and a depth signal in parallel and synchronization with each other.

Because it suffices that a depth signal solely exists for each pixel, it suffices that a depth signal is embedded into any one of the R, G and B signals for each pixel. The depth signal may however be embedded into every one of the R, G and B signals.

Figure 9:
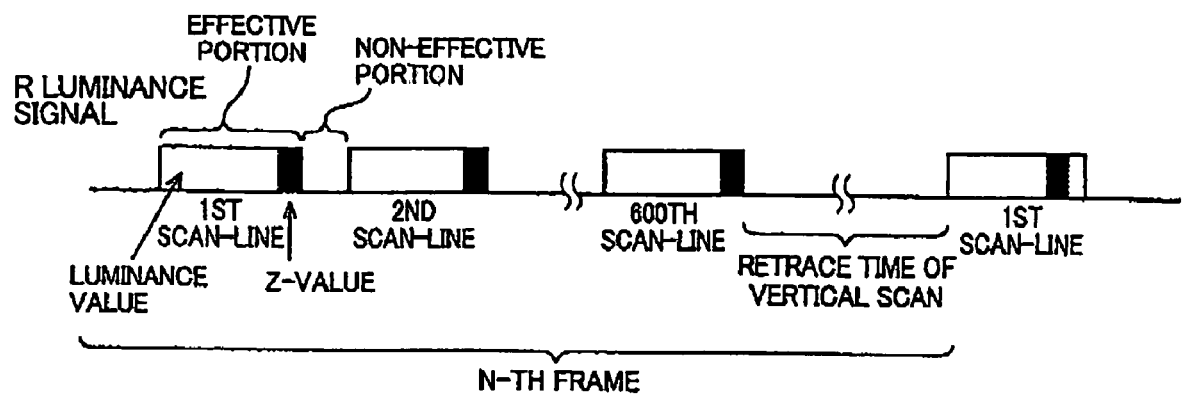
FIG. 9 is a time chart illustrating an image signal produced by a depth-signal embedding circuit 156 in FIG. 6.

As illustrated in FIG. 9, the depth-signal embedding circuit 156 embeds depth signals into each RGB signal, by replacing luminance individual-signals present in a part of the effective portion of each RGB signal, with depth individual-signals corresponding to an image corresponding to the entire effective portion. In FIG. 9, only an R luminance signal is illustrated as a representative one of the RGB signals. In an example of FIG. 9, the R luminance signal includes an effective portion per each scan-line, and allows a non-effective portion to be present between each effective portion and an effective portion corresponding to the subsequent scan-line.

A non-effective portion is also present which corresponds to a retrace time period for a vertical scan.

In the example of FIG. 9, there is performed per each scan-line, replacement of a luminance individual-signal (a signal indicative of a luminance value for each pixel) which has been located at one of both ends of an effective portion of the R luminance signal, which is nearer to the subsequent scan-line, with a depth individual-signal (a signal indicative of a depth or a Z-value for each pixel or each pixel group) which corresponds to an image corresponding to the scan line. As a result, a luminance individual-signal exits in an area of an original effective portion excluding its one end proximal to the subsequent effective portion, in association with each pixel, while a depth individual-signal exits in the one end, in association with each pixel or each pixel group.

Then, in the present embodiment, as illustrated in FIG. 9, an effective and non-effective portions corresponding to 600 scan-lines constitute an image signal for one frame.

Figure 10:
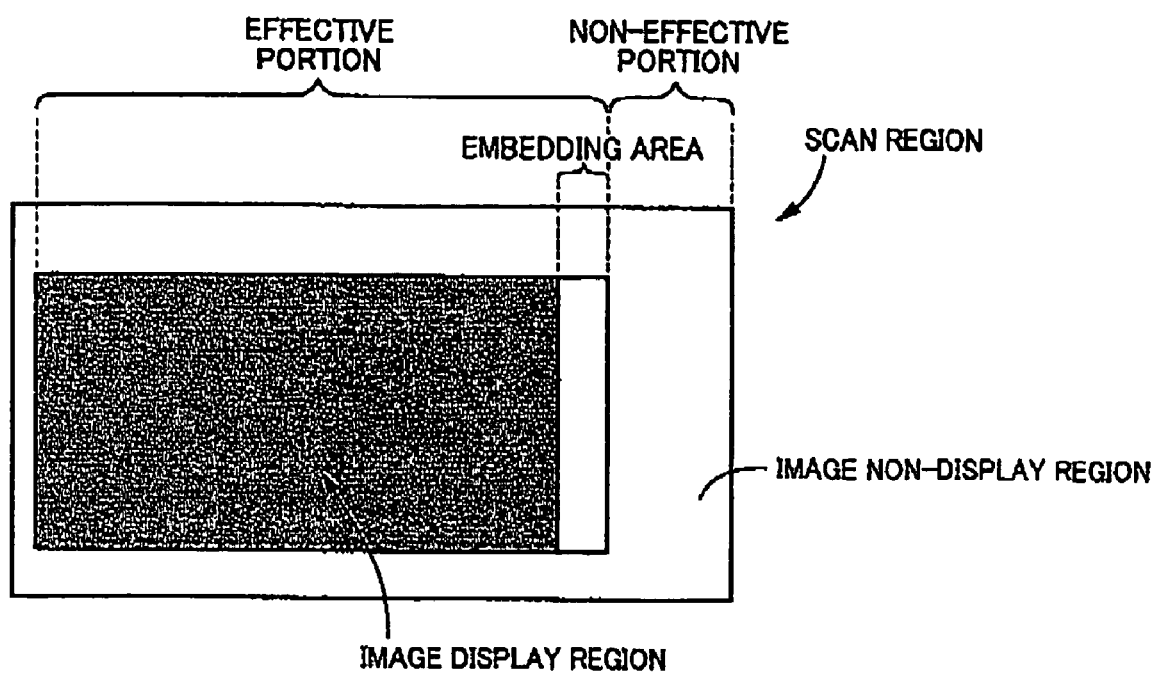
FIG. 10 is a front view for explaining correspondence between an image signal depicted in FIG. 9, an image display region and an image non-displayed region.

As illustrated in FIG. 10, the effective portions of each RGB signal correspond to an image display region, while the non-effective portions correspond to an image non-display region. As described above, at a trailing end of the effective portion of each RGB signal, there is present an embedding area in which a depth signal has been embedded, and accordingly, as illustrated in FIG. 10, the embedding area corresponds to a right-hand edge of the image display region.

It is added that a location of the R luminance signal into which a depth individual-signal is embedded may be modified. More specifically, for example, there is performed per each scan-line, replacement of a luminance individual-signal which has been located at one of both ends of an effective portion of the R luminance signal, which is nearer to the preceding scan-line, with a depth individual-signal which corresponds to an image corresponding to the scan line.

In this case, a luminance individual-signal exits in an area of an original effective portion excluding its one end proximal to the preceding effective portion, in association with each pixel, while a depth individual-signal exits in the one end, in association with each pixel or each pixel group. Further, in this case, at a leading end of the effective portion of each RGB signal, there is present an embedding area in which a depth signal has been embedded, and accordingly, the embedding area corresponds to a left-hand edge of the image display region.

As illustrated in FIG. 8, individual RGB signals in which respective depth signals have been embedded are transferred in parallel, from the signal processing device 152 to the image display device 150, through the cables 56 interconnecting the RGB terminals 40 of the signal processing device 152 and the RGB terminals 50 of the image display device 150.

Figure 11:
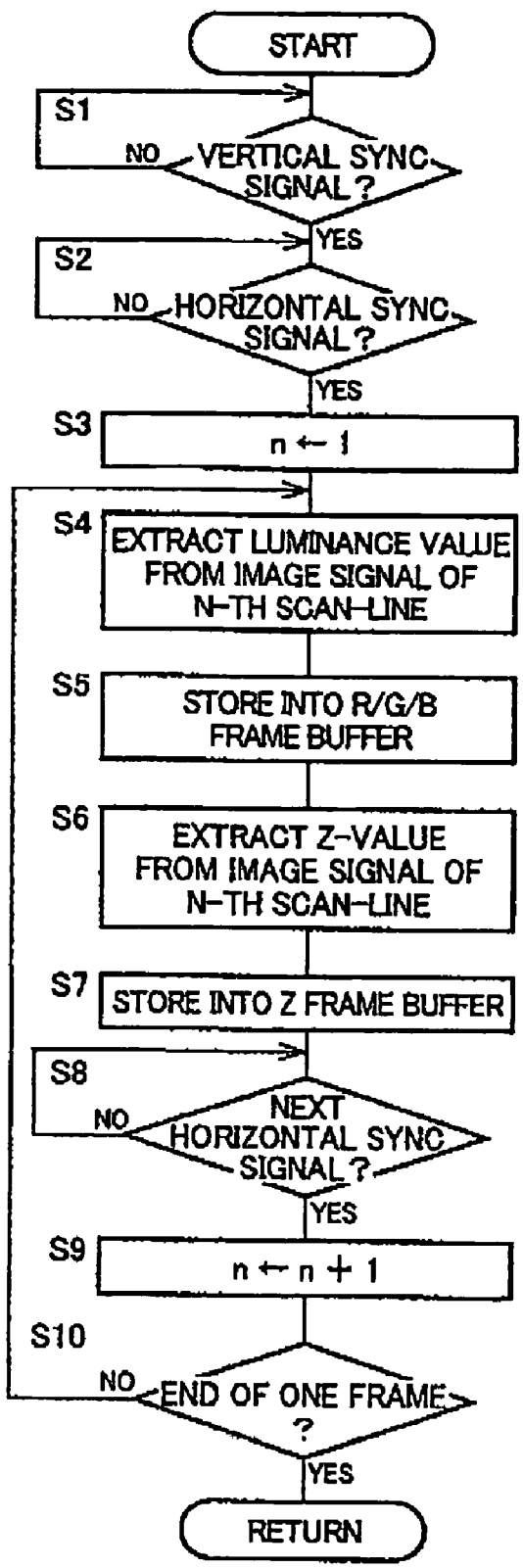
FIG. 11 is a flow chart conceptually illustrating the operation of a video-signal synchronizer circuit 162 in FIG. 8.

In FIG. 11, there is conceptually illustrated in flow chart the signal processing performed by a video-signal synchronizing circuit 162 in FIG. 8.

In the video-signal synchronizing circuit 162, at an initial step S1 (hereinafter, indicated simply as "S1," similarly with other steps), it waits for a horizontal sync signal to be inputted from the clock generator 24 of the signal processing device 152, or the clock generator 104 of the image display device 150. Upon inputted, at S2, it waits for a vertical sync signal to be inputted from the clock generator 24 of the signal processing device 152, or the clock generator 104 of the image display device 150.

Upon inputted, at S3, the value of "n" indicative of a scan-line number is set to one. Thereafter, at S4, luminance values are extracted from an image signal for an n-th scan-line inputted from the signal processing device 152, in association with individual pixels. Locations are pre-defined at which signals are retrieved from an image signal for extracting luminance values. Subsequently, at S5, luminance value data representing the extracted luminance values are stored into the R/G/B frame buffer 92 in association with the current scan-line and the individual pixels.

Thereafter, at S6, Z-values are extracted from the image signal for the n-th scan-line inputted from the signal processing device 152, in association with the individual pixels. Locations are pre-defined at which signals are retrieved from an image signal for extracting Z-values. At S7, Z-value data representing the extracted Z-values are stored into the Z frame buffer 100 in association with the current scan-line and the individual pixels.

Subsequently, at S8, it waits for the subsequent horizontal sync signal to enter. Upon entering, at S9, the scan-line number "n" is incremented by one, and thereafter, at S10, it is determined whether or not the extraction of luminance values and Z-values has been completed for one image-frame. If it has not been completed, then the determination becomes "NO," and it returns to S4 to extract luminance values and Z-values for the subsequent scan-line.

If the extraction of luminance values and Z-values for one image-frame has been completed as a result of repeated implementation of S4-S10, then the determination of S10 becomes "YES," and ultimately, one cycle of the signal processing by the video-signal synchronizing circuit 162 is terminated.

As will be apparent from the above description, the present embodiment merely requires the use of the RGB terminals 40 and 50 for transfer of the RGB signals, without requiring use of any terminal exclusively for transferring a depth signal, for enabling transfer of the RGB signals and the depth signal from the signal processing device 152 to the image display device 150.

As will be apparent from the above description, in the present embodiment, the RGB terminals 50, 50 and 50 and the video-signal synchronizing circuit 162 together constitute an example of the "entry section" set forth in the above mode (6), and the R/G/B frame buffer 92, the Z frame buffer 100, the video-signal processing circuits 94 and 102, and the clock generator 104 together constitute an example of the "output section" set forth in the same mode.

Further, in the present embodiment, the depth-signal embedding circuit 156 constitutes an example of the "image signal generator" set forth in the above mode (18).

Still further, in the present embodiment, the RGB terminals 50, 50 and 50 and the video-signal synchronizing circuit 162 together constitute an example of the "entry section" set forth in the above mode (27), and the R/G/B frame buffer 92, the Z frame buffer 100, the video-signal processing circuits 94 and 102, and the clock generator 104 together constitute an example of the "output section" set forth in the same mode.

Yet still further, in the present embodiment, the depth-signal embedding circuit 156 constitutes an example of the "image signal generator" set forth in the above mode (31), and the RGB terminals 40, 40 and 40, and a portion of the computer 20 which is assigned to retrieve the RGB signals from the R/G/B buffer 30 and then output them to the image display system 10 through the RGB terminal 40, and which is assigned to retrieve the Z-value data from the Z-buffer 32 and then output it to the image display device 10 through the RGB terminals 40, 40 and 40, together constitute an example of the "signal output section" set forth in the same mode.

Figure 12:
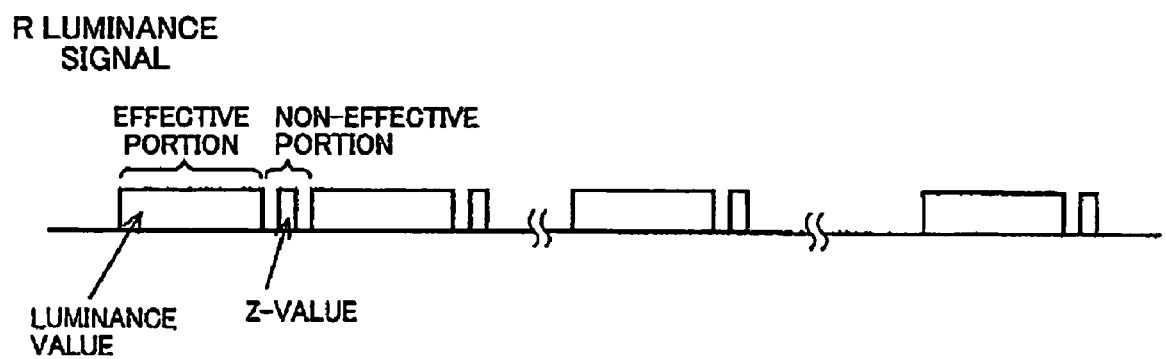
FIG. 12 is a time chart illustrating one exemplary modification of the image signal depicted in FIG. 9.

It is added that, although, in the present embodiment, the depth signals are embedded into the effective portions of each RGB signal, the present invention may be practiced, for example, in an arrangement in which, as illustrated in FIG. 12 in time chart, the depth signals are embedded into the non-effective portions of each RGB signal.

Next, a fourth embodiment of the present invention will be described, provided that, because the present embodiment has common elements to the first embodiment, the common elements will be omitted in detailed description by reference using the identical reference numerals or names, while only the different elements will be described in greater detail below.

Figure 13:
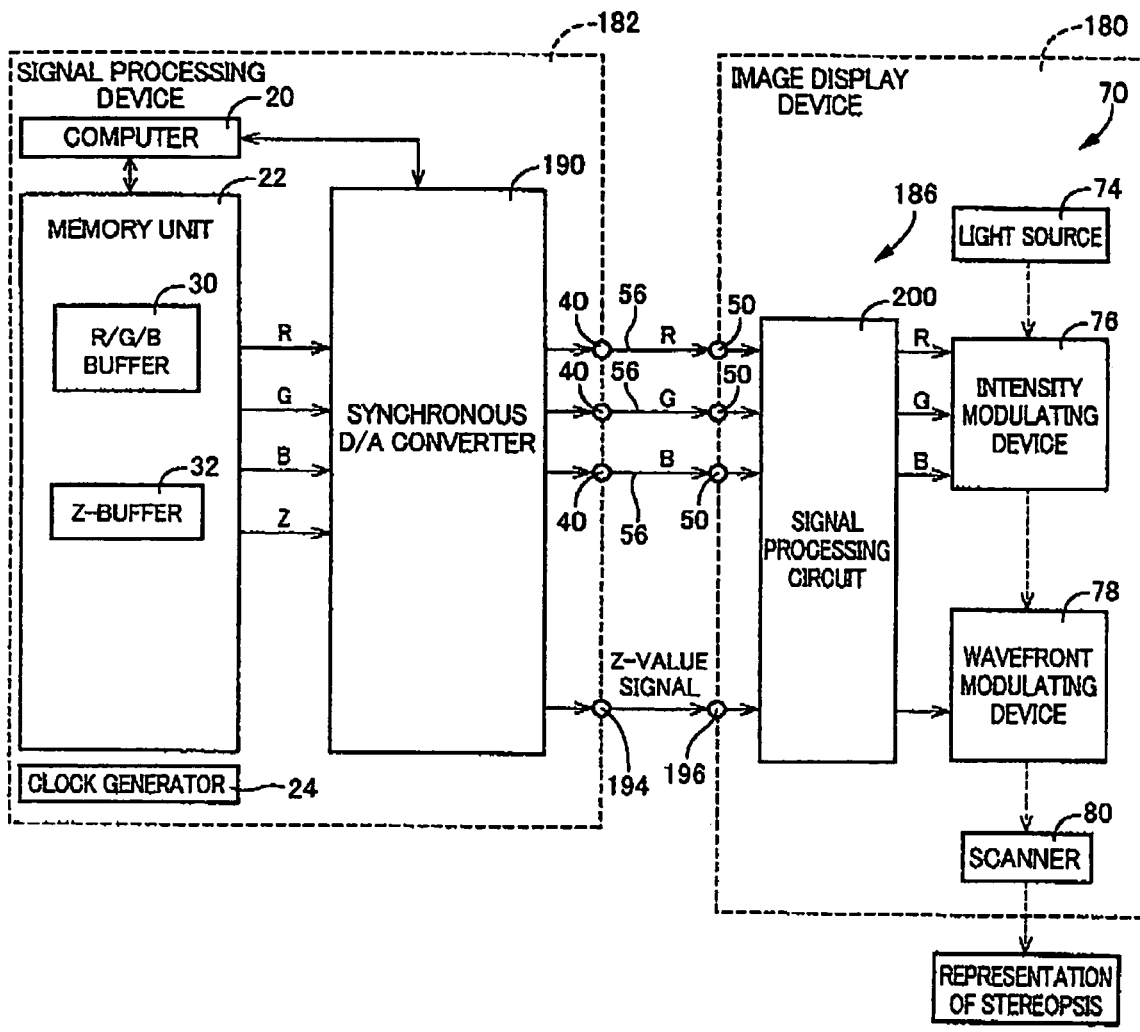
FIG. 13 is a block diagram conceptually illustrating an image display device 180 constructed according to a fourth embodiment of the present invention, together with a signal processing device 182.

In the present embodiment, as illustrated in FIG. 13, an image display device 180 and a signal processing device 182 are in common in basic construction to the image display device 10 and the signal processing device 12 in the first embodiment, respectively. However, differently from the first embodiment, the signal processing device 182 outputs the R, G and B signals and the depth signal in parallel and synchronization with each other.

Further, in the present embodiment, a controller 186 of the image display device 180, for accommodating the modifications of the signal processing device 182, is configured to output the R, G and B signals and the depth signal inputted from the signal processing device 182 in parallel and synchronization with each other, to the intensity modulating device 76 and the wavefront modulating device 78, respectively.

More specifically, as illustrated in FIG. 13, the signal processing device 182 includes a synchronous D/A converter 190. The synchronous D/A converter 190 outputs R luminance value data, G luminance value data and B luminance value data, and Z-value data, once supplied from the memory unit 22 in parallel, in parallel and synchronization with each other, to the image display device 180.

Further, the synchronous D/A converter 190 converts those digital data into analog signals. More specifically, the synchronous D/A converter 190 converts the R luminance value data, G luminance value data and B luminance value data, and the Z-value data, which are in parallel, into an R luminance signal, a G luminance signal and a B luminance signal, and a Z-value signal, which are parallel analog signals.

The signal processing device 182 includes an R signal terminal 40, a G signal terminal 40, a B signal terminal 40, and a Z-value signal terminal 194 used for outputting an R signal, a G signal, a B signal, a Z-value signal indicative of the R luminance value data, the G luminance value data, the B luminance value data, and the Z-value data, respectively. To meet this, the image display device 180 includes an R signal terminal 50, a G signal terminal 50, a B signal terminal 50, a Z-value signal terminal 196 used for entry of the R, G and B signals, and the Z-value signal.

In the present embodiment, the Z-value signal terminals 194 and 196, both exclusively for depth representation, are mounted in the image signal processing device 182 and the image display device 180, respectively. However, in the case where the signal processing device 182 includes two sets of RGB terminals 40, 40 and 40, and the image display device 180 includes two sets of RGB terminals 50, 50 and 50, a fraction (e.g., pins for R luminance signal) of pins of the RGB terminals 40, 40, 40, 50, 50, 50 belonging to one of the two sets of RGB terminals 40, 40, 40 and one of the two sets of RGB terminals 50, 50, 50, both ones being inactive in transfer of RGB signals, may be used as the Z-value signal terminals 194 and 196. In addition, in the case where the signal processing device 182 and the image display device 180 include audio terminals, these terminals may be used as the Z-value signal terminals 194 and 196.

As illustrated in FIG. 13, the controller 186 of the image display device 180 includes a signal processing circuit 200. The signal processing circuit 200 outputs R, G and B signals and Z-value signal which have been entered into the controller 186 in parallel, to the intensity modulating device 76 and the wavefront modulating device 78, in parallel and in maintained synchronization, respectively.

As will be apparent from the above description, in the present embodiment, the RGB terminals 50, 50 and 50, and the Z-value signal terminal 196 together constitute an example of the "entry section" set forth in the above mode (12), and the signal processing circuit 200 constitutes an example of the "output section" set forth in the same mode.

Further, in the present embodiment, the RGB terminals 40, 40 and 40, the Z-value signal terminal 194, and the synchronous D/A converter 190 together constitute an example of the "signal output section" set forth in the above mode (24).

Next, a fifth embodiment of the present invention will be described, provided that, because the present embodiment has common elements to the third embodiment which has been described above with reference to FIG. 8, the common elements will be omitted in detailed description by reference using the identical reference numerals or names, while only the different elements will be described in greater detail below.

In the third embodiment, as illustrated in FIG. 8, the signal processing device 152 generates an image signal formed by combining luminance and depth signals, and outputs the generated image signal to the image display device 150. As a result, the image display device 150 displays a stereoscopic image based on the image signal.

Figure 14:
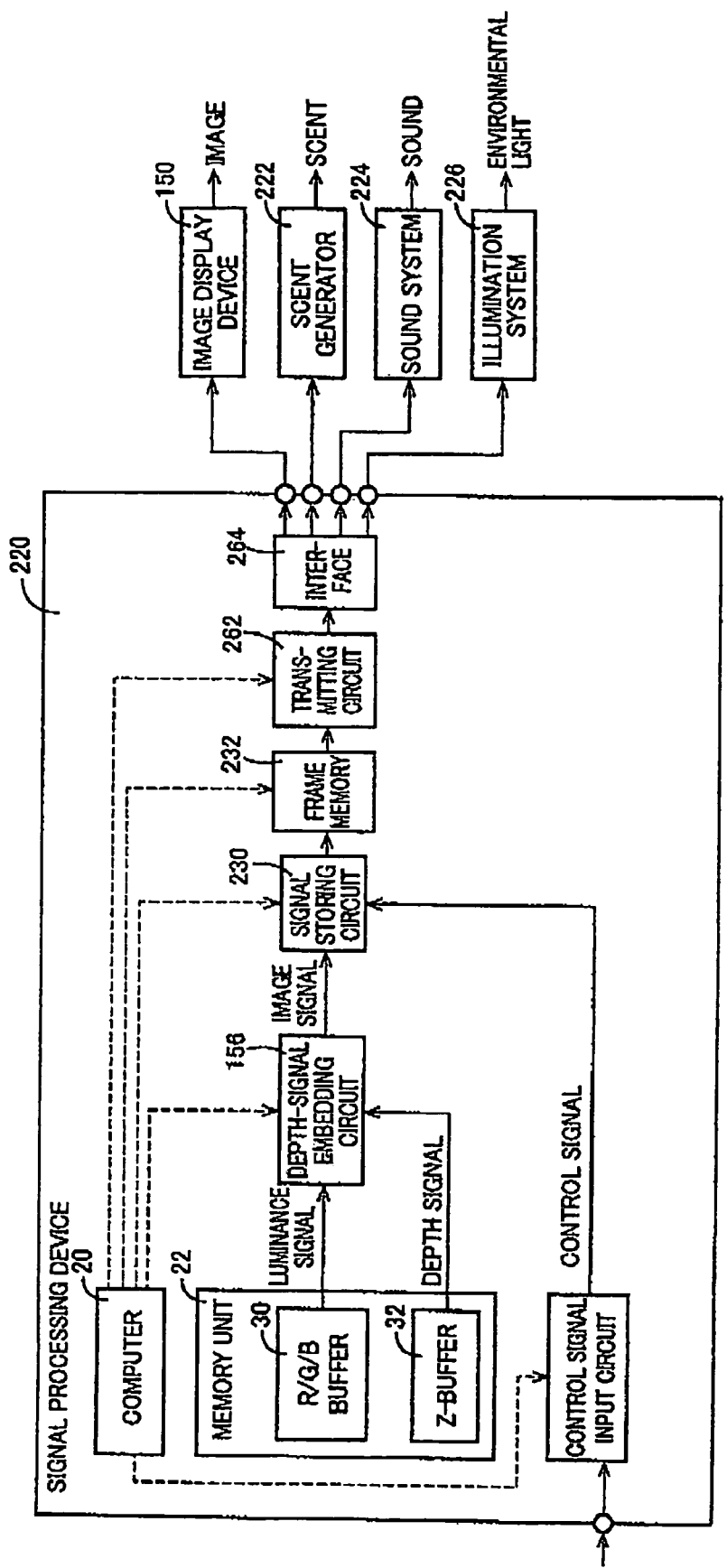
FIG. 14 is a block diagram conceptually illustrating a signal processing device 220 constructed according to a fifth embodiment of the present invention, together with its some peripheral devices.

In contrast, in the present embodiment, as illustrated in FIG. 14, a signal processing device 220 is used instead of the signal processing device 152. However, the signal processing device 220 includes, similarly with the signal processing device 152, the computer 20, the memory unit 22, and the depth-signal embedding circuit 156. In the signal processing device 220, the depth-signal embedding circuit 156 embeds a depth signal into a luminance signal according to the procedure similar with the third embodiment, resulting in the generation of an image signal in the form of a composite signal.

As illustrated in FIG. 14, the signal processing device 220 is connected with the image display device 150, similarly with the third embodiment. In the image display device 150, an image with depths is stereoscopically displayed based on an image signal supplied from the signal processing device 220.

As illustrated in FIG. 14, in the present embodiment, differently from the third embodiment, the signal processing device 220 is further connected with a scent generator 222, a sound system 224 and an illumination system 226. The scent generator 222, the sound system 224 and the illumination system 226, which will be employed also in a sixth embodiment and which will be described in greater detail in conjunction with the sixth embodiment, will therefore be omitted in the detailed description of the present embodiment.

The signal processing device 220 supplies to the scent generator 222, the sound system 224 and the illumination system 226, a plurality of various control signals for use in control of the scent generator 222, the sound system 224 and the illumination system 226, respectively.

To this end, as illustrated in FIG. 14, the signal processing device 220 includes: a signal storing circuit 230 for combining into a composite signal, an image signal and various control signals which are to be synchronized with each other, on a frame-by-frame basis of an image; and a frame memory 232 in which the composite signal is stored on a frame-by-frame basis. The signal storing circuit 230 may be in the form of electronic circuitry which is operated in response to a command to store signals, from the computer 20.

The various control signals to be processed in the signal processing device 220 are classified into a first control signal (a high-speed switching control signal) required to be updated per each scan-line of an image, and a second control signal (a low-speed switching control signal) required to be updated per each frame of an image.

Figure 15:
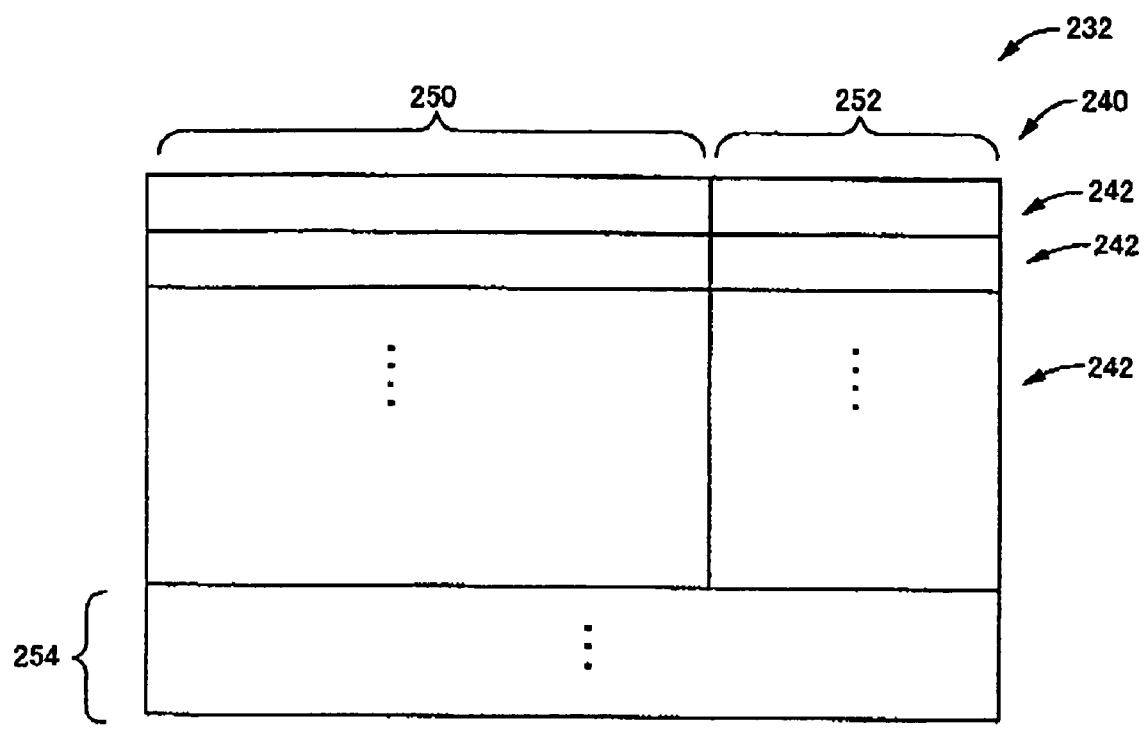
FIG. 15 is a view conceptually illustrating the configuration of a frame memory 232 in FIG. 14.

In FIG. 15, the logical structure of various storage regions are assigned to the frame memory 232, is illustrated in top plan view, in an analogous manner with the frame construction in which one frame of an image is formed with a plurality of scan lines. In FIG. 15, however, only one of successive frames forming an image is representatively illustrated.

As illustrated in FIG. 15, there are assigned to the frame memory 232, frame-by-frame storage areas 240 in each of which an image signal, and the first and second control signals are stored altogether, which is to say, so as to be positionally associated with each other, on a frame-by-frame basis. The frame-by-frame storage areas 240 may be assigned to the frame memory 232 with the same number as that of frames composing an image.

The frame-by-frame storage areas 240 may be designed so as to be in common to tri-color luminance signals (R/G/B), and to store the tri-color luminance signals altogether, in association with pixel positions, or may be designed so as to be provided individually for each color luminance signal, and to store the luminance signal in association with pixel positions.

As illustrated in FIG. 15, there are assigned to each frame-by-frame storage area 240, line-by-line storage regions 242 in each of which an image signal and the first control signal are to be stored altogether, which is to say, so as to be positionally associated with each other, per each scan-line. The line-by-line storage regions 242 may be assigned to the corresponding frame-by-frame storage area 240 with the same number as that of scan lines forming the corresponding frame.

As illustrated in FIG. 15, there is assigned to each line-by-line storage region 242 on its upstream side of a direction in which signals are retrieved from each line-by-line storage region 242 for transmission (i.e., on an upstream side of a direction in which each line-by-line storage region 242 is scanned for signal retrieval and transmission), an image-signal storage sub-region 250 in which a plurality of image individual-signals (image signals for each pixel) are to be stored in the same sequence as the signals are reproduced. Further, there is assigned to each line-by-line storage region 242 on a downstream side thereof, a first control-signal storage sub-region 252 in which the aforementioned first control signal (a control signal for each pixel or each scan-line) is to be stored.

As illustrated in FIG. 15, in addition to the line-by-line storage regions 242, there is assigned to each frame-by-frame storage area 240 on a downstream side of the line-by-line storage regions 242, a second control-signal storage sub-region 254 in which the aforementioned second control signal (a control signal for each frame) is stored.

As illustrated in FIG. 14, the signal storing circuit 230, upon receiving a plurality of image individual-signals each of which has been formatted into a composite signal by the depth-signal embedding circuit 156, stores the plurality of image individual-signals into the image-signal storage sub-region 250 of one of the line-by-line storage regions 242 of one of the frame-by-frame storage areas 240, in association with the positions of frame, scan line, and pixel for which each image individual-signal is to be reproduced, as illustrated in FIG. 15.

On the other hand, the signal storing circuit 230, upon receiving the first control signal, stores the first control signal into the first control-signal storage sub-region 252 of one of the line-by-line storage regions 242 of one of the frame-by-frame storage areas 240, in association with the positions of frame and scan line for which each control signal is to be reproduced, as illustrated in FIG. 15.

On the other hand, the signal storing circuit 230, upon receiving the second control signal, stores the second control signal into the second control-signal storage sub-region 254 of one of the frame-by-frame storage area 240, in association with the position of frame for which each control signal is to be reproduced, as illustrated in FIG. 15.

As illustrated in FIG. 14, the signal processing device 220 further includes a transmitting circuit 262 and an interface 264. The transmitting circuit 262 and the interface 264 are each commonly used for an image signal and control signals.

The transmitting circuit 262, upon receipt of a transmit-command signal from the computer 20, retrieves an image signal and control signals from the frame memory 232 in the same sequence as that of addresses stored in the frame memory 232, and subsequently transmits the retrieved image signal and control signals to the image display device 150, the scent generator 222, the sound system 224 and the illumination system 226, via the interface 264.

More specifically, the transmitting circuit 262 transmits an image signal to the image display device 150, while transmits a corresponding portion of a control signal to the scent generator 222 in substantial synchronization with the image signal. The transmitting circuit 262 further transmits a corresponding portion of the control signal to the sound system 224, and transmits a corresponding portion of the control signal to the illumination system 226, in substantial synchronization with the image signal.

As a result, required signals are supplied from the signal processing device 220 to the image display device 150, the scent generator 222, the sound system 224 and the illumination system 226, in substantial synchronization with each other.

The image display device 150, the scent generator 222, the sound system 224 and the illumination system 226, upon receipt of required signals from the signal processing device 220, perform image display, generation (or control) of scent, generation (or control) of sound, and generation (or control) of environmental light, in substantial synchronization with each other.

Therefore, the viewer, who is viewing an image displayed by the image display device 150, feels scent, sound and environmental light, in synchronization with display of the image, resulting in the achievement of a greater realism of an image than when the viewer is allowed to appreciate a scene only through an image.

As will be apparent from the above description, in the present embodiment, the image display device 150 constitutes an example of the "image display section" set forth in the above mode (35), the scent generator 222, the sound system 224 and the illumination system 226 each constitute an example of the "reproducing device" set forth in the same mode, the frame memory 232 constitutes an example of the "storage medium" set forth in the same mode, and the signal storing circuit 230 constitutes an example of the "signal storing section" set forth in the same mode.

Next, a sixth embodiment of the present invention will be described, provided that, because the present embodiment has common elements to the fifth embodiment, the common elements will be omitted in detailed description by reference using the identical reference numerals or names, while only the different elements will be described in greater detail below.

Figure 16:
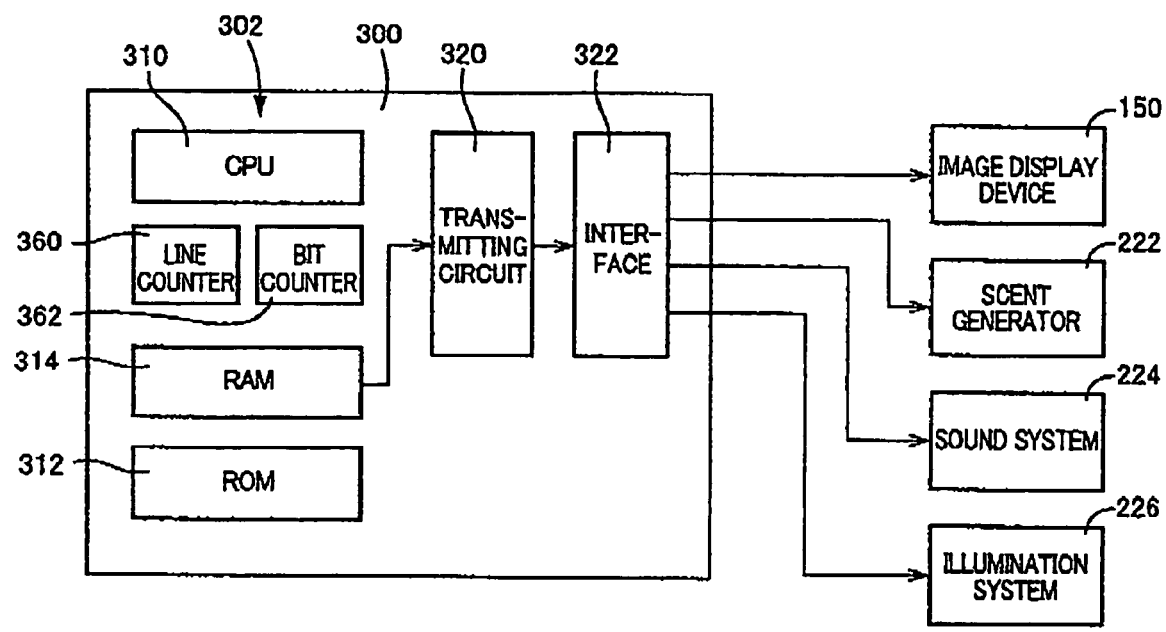
FIG. 16 is a block diagram conceptually illustrating a signal processing device 300 constructed according to a sixth embodiment of the present invention, together with its some peripheral devices.

In FIG. 16, a signal processing device 300 according to the present embodiment is conceptually illustrated in block diagram. The signal processing device 300 is configured principally with a computer 302. As is well known, the computer 302 is constructed by interconnecting a CPU 310, a ROM 312 and a RAM 314 via a bus not shown.

As illustrated in FIG. 16, the signal processing device 300 further includes a transmitting circuit 320 and an interface 322. The transmitting circuit 320, upon receipt of a transmission-command signal from the CPU 310, retrieves required data, which is to say, an image signal and control signals from the RAM 314, and transmits to peripheral devices described below, via the interface 322.

As illustrated in FIG. 16, the signal processing device 300 is connected at the interface 322 with the image display device 150, the scent generator 222, the sound system 224 and the illumination system 226, each functioning as a peripheral device. The scent generator 222, the sound system 224 and the illumination system 226 are provided for enhancing the realism with which the viewer is viewing an image displayed by the image display device 150.

The scent generator 222 is provided for appealing to an olfactory one of five senses of a viewer viewing an image displayed by the image display device 150, to thereby enhance the realism of the image. The scent generator 222 is so constructed as to include, for example, although not illustrated, (a) different types of containers (e.g., tanks) containing different types of liquids (e.g., aromatic substance) or gases which emits a unique scent, respectively, and (b) a release unit (e.g., a pressure-vaporization type, a filter-vaporization type, a supersonic vapor generation type, etc.) for releasing a valve disposed at an outlet of one of the containers which is containing a selected one of the different types of the liquids or gases, to thereby release the selected type of liquid or gas from the released valve into a room in which a viewer is present, after being misted, if needed.

This scent generator 222 may be configured, for example, when an image reproduces a scene of the sea, so as to emit the real salty scent of seawater or a comparable scent, when an image reproduces a scene of forest, so as to emit the real scent of trees or a comparable scent, or when an image is displayed for viewer's relaxation, so as to emit the scent of herbs or a comparable scent. The scent generator 222 emits a scent for effectively enhancing the realism of an image using a viewer's olfactory sense, into the same space where the viewer is present, in synchronization with an image start or image development.

The sound system 224 is provided for appealing to an auditory one of five senses of a viewer viewing an image displayed by the image display device 150, to thereby enhance the realism of the image. The sound system 224 is so constructed as to include, for example, although not illustrated, (a) a recording unit (e.g., a CD) for recording different types of sound data, and (b) a reproducing unit (e.g., a CD player) for capturing a corresponding one of the different types of sound data from the recording unit, and then reproducing.

This sound system 224 may be configured, for example, when an image reproduces a scene of the sea, so as to emit the sound of the wave in the form of a natural or artificial sound, when an image reproduces a scene of forest, so as to emit birds' chirp and the sound of a breeze in the form of a natural or artificial sound, or when an image is displayed for viewer's relaxation, so as to emit an environmental sound for effectively relaxing the viewer's brain. This sound system 224 emits a sound for effectively enhancing the realism of an image using a viewer's auditory sense, into the same space where the viewer is present, in synchronization with an image start or image development.

The illumination system 226 is provided for appealing to a visual one of five senses of a viewer viewing an image displayed by the image display device 150, to thereby enhance the realism of the image. This illumination system 226 is so constructed as to include, for example, although not illustrated, (a) an illuminator (a primary or auxiliary illuminator) disposed in a room where the viewer is present, the illuminator emitting one type or different types of light in a selective manner, and (b) a controller for controlling the illuminator to produce a corresponding one of the different types of light.

This illumination system 226 may be constructed, for example, when an image reproduces a scene of the sea, so as to emit light comparable to bright sunlight, or when an image reproduces a scene of forest, so as to emit light comparable to sunlight reaching down to the forest. This illumination system 226 emits light for effectively enhancing the realism of an image using a viewer's visual sense, into the same space where the viewer is present, in synchronization with an image start or image development.

To summarize the above, the scent generator 222, the sound system 224 and the illumination system 226 are each constitute an example of a reproducing device for reproducing a physical effect other than an image, in synchronization with an image start or image development, for enhancing the realism of the image viewed.

The signal processing device 300 supplies an image signal to the image display device 150 for allowing the image display device 150 to display an image. Further, the signal processing device 300 supplies a plurality of different control signals to the scent generator 222, the sound system 224 and the illumination system 226, respectively, for control of the scent generator 222, the sound system 224 and the illumination system 226.

In the RAM 314, an image signal and a control signal are stored. An image signal is a signal for specifying the content of an image to be displayed, within which, for example, a color signal for specifying the color of each pixel of an image to be displayed, a luminance signal for specifying the luminance of each pixel, etc. fall. On the other hand, a control signal is a signal to be synchronized with an image signal, which is other than the color signal and the luminance signal.

The control signal may be defined to include, for example, a signal needed to be supplied to the scent generator 222 for causing the scent generator 222 to emit a scent in synchronization with an image displayed by the image display device 150.

Moreover, the control signal may be also defined to include a signal needed to be supplied to the sound system 224 for causing the sound system 224 to control sound in synchronization with an image displayed by the image display device 150.

Further, the control signal includes a signal needed to be supplied to the illumination system 226 for causing the illumination system 226 to control environmental light in synchronization with an image displayed by the image display device 150.

Incidentally, when the image display device 150 is requested to stereoscopically display an image, there is a need of supplying to the image display device 150, a depth signal together with at least a luminance signal, the depth signal being for specifying the depth of an image to be displayed. For example, there is a case where the depth signal is required to be supplied to the image display device 150 in association with individual pixels, a case where the depth signal is required to be supplied to the image display device 150 in association with one scan-line or consecutive scan-lines, or a case where the depth signal is required to be supplied to the image display device 150 in association with one frame or consecutive frames.

In the present embodiment, when an image signal is produced by combining a luminance signal and a depth signal on a pixel-by-pixel basis, similarly with the first through fifth embodiments, the depth signal can be treated as a kind of an image signal. Further, in the present embodiment, because the RAM 314 has an additional area enabling storage of a control signal per each pixel in association therewith, the depth signal can be also treated as a kind of a control signal.

Figure 17:
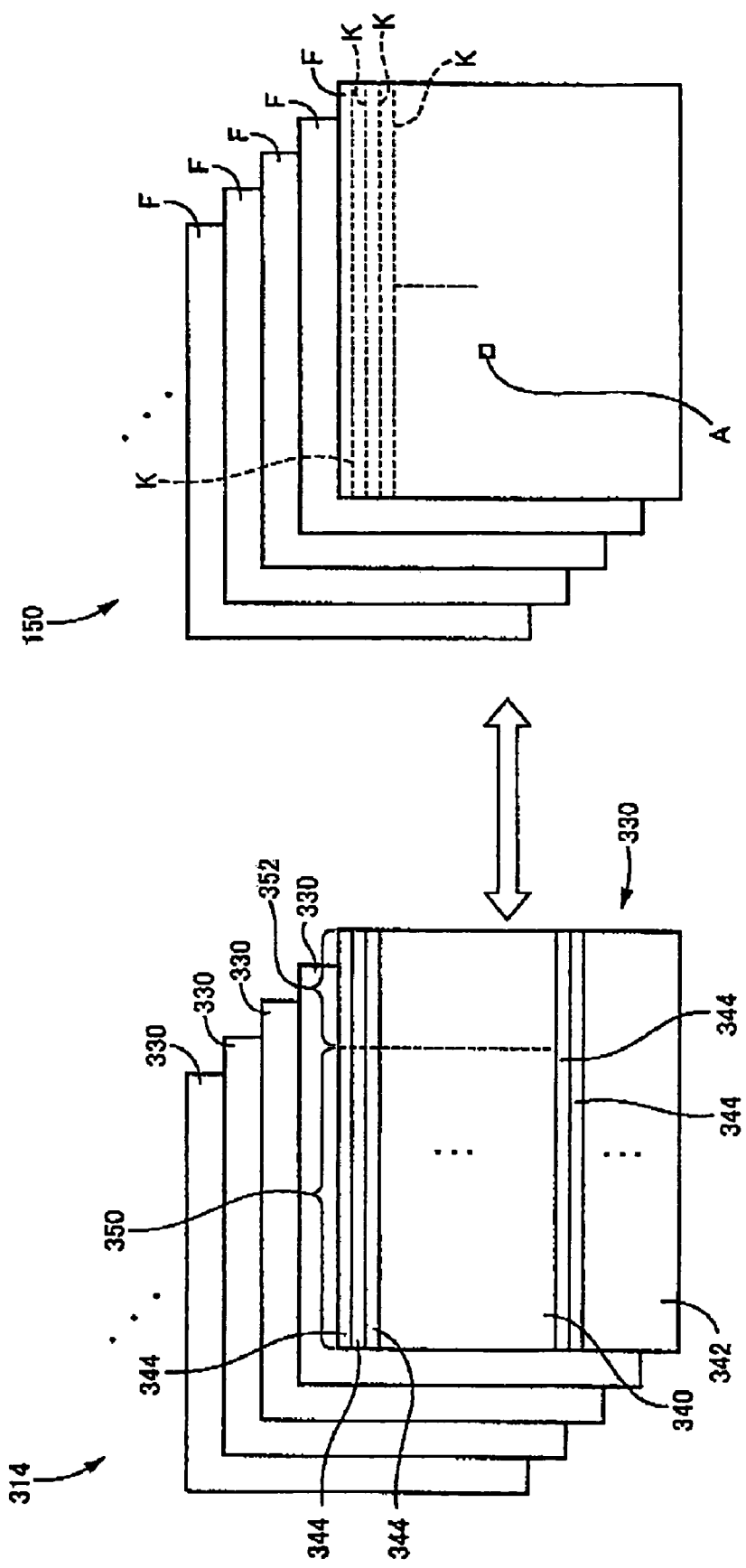
FIG. 17 is a view conceptually illustrating the configuration of a RAM 314 in FIG. 16 in association with a frame configuration of an image.
Figure 18:
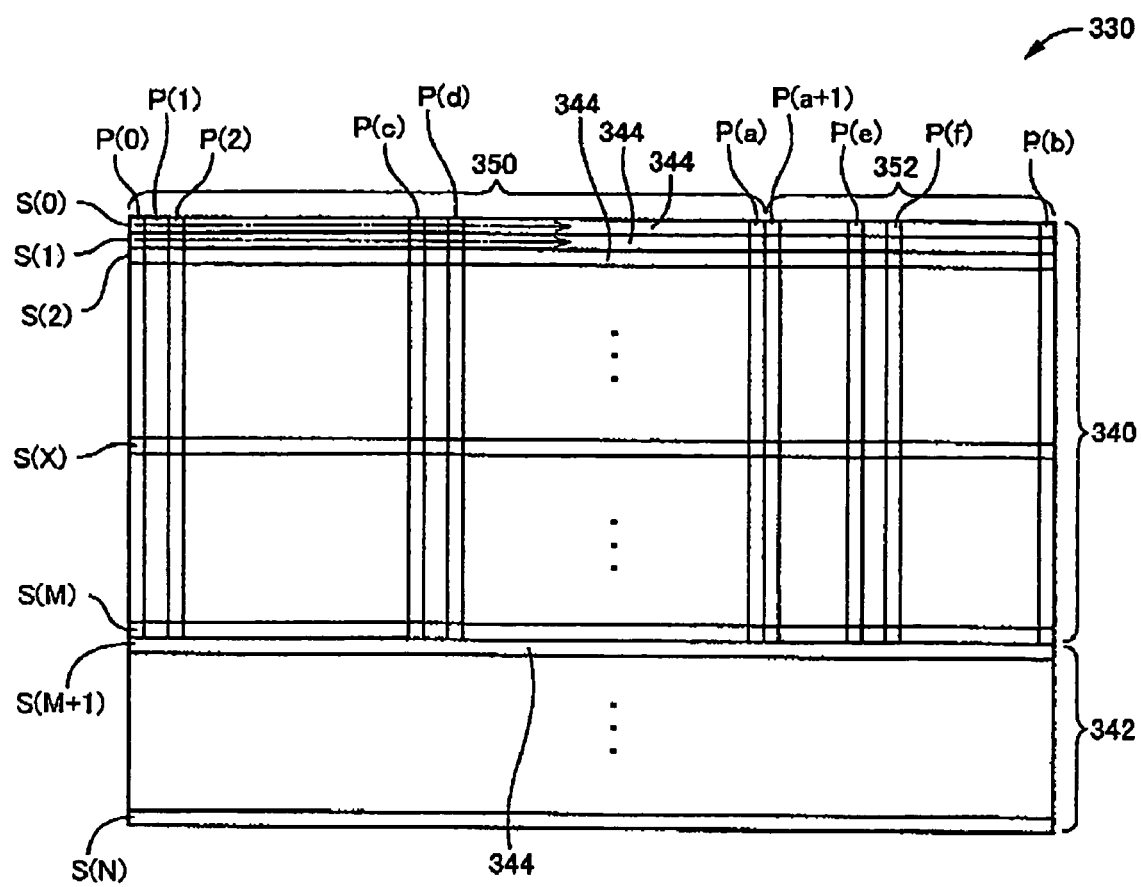
FIG. 18 is a view conceptually illustrating the configuration of the RAM 314 in FIG. 17 in greater detail.

Referring next to FIGS. 17 and 18, the logical structure for data storage in the RAM 314 will be described.

As illustrated in FIG. 17, there is assigned to the RAM 314, a storage area corresponding to one frame F of an image to be displayed by the image display device 150, which is to say, frame-by-frame storage areas 330. As illustrated in FIG. 17, when the image display device 150 is required to display a succession of images comprised of a plurality of frames F, the frame-by-frame storage areas 330 are provided with the same number as that of the frames F to be displayed, allowing a plurality of image signals corresponding to a succession of images displayed by the image display device 150 to be stored.

Each frame-by-frame storage area 330 is partitioned into a first storage sub-area 340 and a second storage sub-area 342. In FIG. 17, the first and second storage sub-areas 340, 342 are separated with a horizontal solid line. The first and second storage sub-areas 340, 342 are each partitioned into a plurality of line-by-line storage regions 344.

In FIG. 18, the organization of a plurality of storage locations (bit areas as described below, namely, minimum storage units) in one frame-by-frame storage area 330 is illustrated in greater detail. When an image is displayed by the image display device 150, the frame-by-frame storage area 330 is scanned in a direction indicated by the arrowed dot-dash line in FIG. 18, from the upper left-hand end of the first storage sub-area 340, to the lower right-hand end of the second storage sub-area 342, in this Figure, to thereby allow the retrieval of stored information (data or signals) in series.

As illustrated in FIG. 18, the line-by-line storage regions 344 are individually numbered serial line numbers S(0), S(1), S(2), S(M), . . . , S(N), arranged in top-to-bottom order in FIG. 18. For the convenience of addressing, the line-by-line storage regions 344 are individually specified with the line numbers S(0), S(1), S(2), . . . S(M), . . . , S(N). The first storage sub-area 340 located at the top of the frame-by-frame storage area 330 are organized with a sub-plurality of the plurality of line-by-line storage regions 340 having line numbers S(0) through S(M). On the other hand, the second storage sub-area 342 located at the bottom of the frame-by-frame storage area 330 are organized with a sub-plurality of the plurality of line-by-line storage regions 340 having line numbers S(M+1) through S(N).

The number of the line-by-line storage regions 344 belonging to the first storage sub-area 340, as illustrated on the right-hand side of FIG. 17, is equal to the number of scan-lines K forming a frame F to be displayed. Each line-by-line storage region 344 in the first storage sub-area 340 is partitioned into an image-signal storage sub-region 350 and a control-signal storage sub-region 352.

An image signal is stored in the image-signal storage sub-region 350, while a control signal is stored in the control-signal storage sub-region 352. The image-signal storage sub-region 350 is located on an upstream side of each line-by-line storage region 344, while the control-signal storage sub-region 352 is located on a downstream side of each line-by-line storage region 344. Individual image signals and individual control signals are stored in each line-by-line storage region 344 in association with individual pixels to be displayed.

As illustrated in FIG. 18, each line-by-line storage region 344 is partitioned into a plurality of bit areas in each of which one-bit data (signals) are stored. For example, an image signal such as a color signal or a luminance signal uses multi-bits data for representing color, luminance, etc. of each pixel. The multi-bits are stored in the line-by-line storage region 344 so as to span consecutive bit-areas.

The bit areas are individually numbered bit numbers P (0), P (1), P (2), . . . , P (a), . . . , P (b), arranged in left-to-right order in FIG. 18. The image-signal storage sub-region 350 and the control-signal storage sub-region 352 are discriminated with the value of a bit number. The image-signal storage sub-region 350 is organized by a plurality of bit areas having bit numbers P (0) through P (a). On the other hand, the control-signal storage sub-region 352 is organized with a plurality of bit areas having bit numbers P (a+1) through P (b).

Therefore, in the present embodiment, as illustrated in FIG. 18, for example, because of image signals stored in a plurality of bit areas of the image-signal storage sub-region 350, which each have a line number S(x) within the first storage sub-area 340, and which have bit numbers P(c)-P(d), the color, the luminance or the like of pixel A depicted in FIG. 17 are specified. In addition, because of control signals stored in a plurality of bit areas of the control-signal storage sub-region 352, which each have a line number S(x) within the first storage sub-area 340, and which have bit numbers P(e)-P(f), the various kinds of control (generation of scent, control of sound effect and control of environmental light) are executed in synchronization with the display of pixel A.

In the present embodiment, the image signal is retrieved from the RAM 314, serially in the scanning order described above, per each line, and then is transmitted to the image display device 150, whereby the image display device 150 displays an image.

Further, in the present embodiment, following the retrieval of the image signal, the control signal (control signal stored for each pixel) is retrieved from the RAM 314, serially in the scanning order described above, per each line, similarly with the image signal. When the control signal includes a depth signal, the depth signal is transmitted to the image display device 150, whereby it is used for stereoscopic image-representation purposes.

When the control signal includes a signal for control of scent, the signal is transmitted to the scent generator 222. When the control signal includes a signal for control of sound, the signal is transmitted to the sound system 224. When the control signal includes a signal for control of environmental light, the signal is transmitted to the illumination system 226.

As described above, the boundary between the first and second storage sub-areas 340, 342 is specified using the line number S(M). In addition, the boundary between the image-signal storage sub-region 350 and the control-signal storage sub-region 352 is specified using the bit number P(a). As illustrated in FIG. 16, the computer 302 includes a line counter 360 for counting a line number, and a bit counter 362 for counting a bit number.

As illustrated in FIG. 18, control signals are stored in the second storage sub-area 342. There are classified as control signals stored in the second storage sub-area 342, control signals needed to be supplied to the scent generator 222, the sound system 224 and the illumination system 226, each time one frame's worth of image signal is transmitted to the image display device 150.

This second storage sub-area 342, although is in common to the control-signal storage sub-regions 352 in that it is assigned to the RAM 314 for storage of control signals, is different from the control-signal storage sub-regions 352 in that it can store control signal only on a frame-by-frame basis, wherein the control-signal storage sub-regions 352 can store control signals on a pixel-by-pixel basis or a scan-line-by-scan-line basis.

Therefore, there are classified as control signals stored in the control-signal storage sub-regions 352 of the first storage sub-area 340, a depth signal for controlling a depth position of an image to be displayed in synchronization with pixels displayed by the image display device 150, and a control signal for controlling the sound system 224 in synchronization with scan lines K of a frame F to be displayed. On the other hand, there is classified as a control signal stored in the second storage sub-area 342, a control signal for controlling the scent generator 222, the sound system 224 or the illumination system 226 in synchronization with a frame F to be displayed.

Next, there will be described the procedure in which an image signal and a control signal are stored into the RAM 314.

For storage of an image signal and a control signal into the RAM 314, a signal storage program, not illustrated, is executed by the CPU 310, or electrical circuitry for signal storage (including, for example, the line counter 360, the bit counter 362, etc.), not illustrated, is operated, to thereby store an image signal corresponding to individual pixels of an image to be displayed, into the individual image-signal storage sub-regions 350 of the first storage sub-area 340, so as to start at leading ends of the image-signal storage sub-regions 350, and proceed in the aforementioned scanning order, and further, to thereby store a control signal corresponding to the individual pixels into the control-signal storage sub-regions 352 such that the storing starts at their leading ends, and such that the storing is proceeded in the aforementioned scanning order. Further, the CPU 310 stores a control signal also into the second storage sub-area 342 in the similar manner.

In the above manner, the CPU 310 performs, for all the pixels forming an image to be displayed, at least one of the storage of the image signal into the image-signal storage sub-regions 350, and the storage of the control signal into the control-signal storage sub-regions 352 and/or the second storage sub-area 342.

Next, there will be described the procedure in which an image signal and a control signal are retrieved from the RAM 314.

As illustrated in FIG. 18, for retrieval of an image signal and a control signal from the RAM 314 the transmitting circuit 320 first retrieves the image signal serially from one of the image-signal storage sub-regions 350 which corresponds to one of the line-by-line storage regions 344 having a line number of S(0), so as to start at its leading end, in the order. Upon completion of the retrieval, the transmitting circuit 320 subsequently retrieves the control signal serially from the control-signal storage sub-regions 352. Because of the transmitting circuit 320, the retrieved image signal and control signal are transmitted to the image display device 150 via the common interface 322 to these image signal and control signal.

Upon completion of retrieval of the image signal and the control signal from one of the line-by-line storage regions 344 having a line number of S(0), the transmitting circuit 320 retrieves the image signal and the control signal which have been stored in one of the line-by-line storage regions 344 having a line number of S(1), in the similar manner. Thereafter, the image signal and the control signal which have been stored in all the line-by-line storage regions 344 are serially retrieved by the transmitting circuit 320 in the similar manner, with transmission to the image display device 150 via the interface 322.

Figure 22:
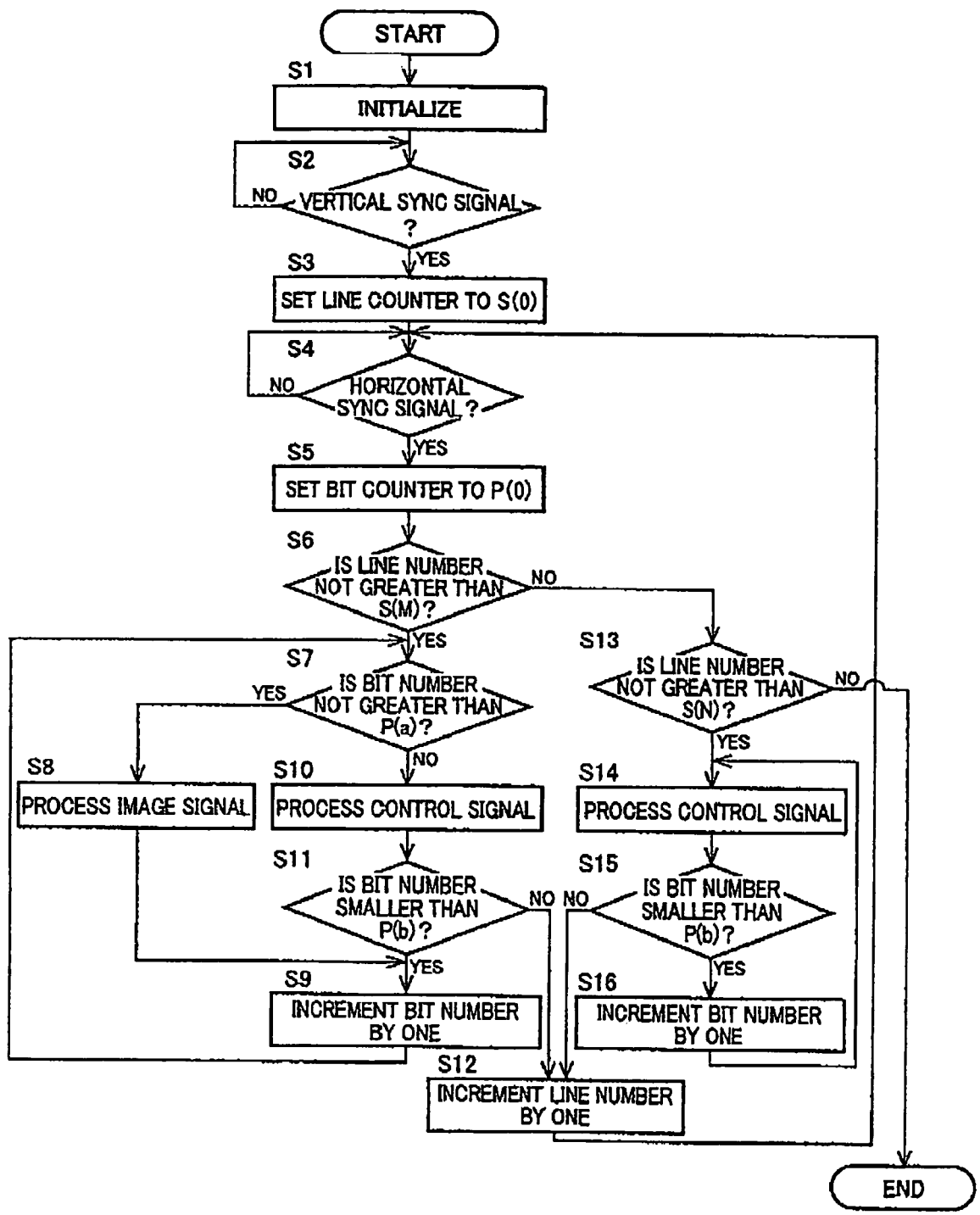
FIG. 22 is a flow chart for conceptually explaining signal processing in the signal processing device 300 and the image display device 400 both depicted in FIG. 20.

The CPU 310 executes a program which has been previously stored in the ROM 312 for performing the signal storage described above and the transmission using the transmitting circuit 320, and the program, because is in common to a program which will be described with reference to FIG. 22, is omitted herein in detailed description.

The image display device 150 displays an image based on the retrieved image signal, and further reproduces the depth of the image based on a depth signal of the retrieved control signal, to thereby display the image in a stereoscopic manner. Additionally, the scent generator 222, the sound system 224 and the illumination system 226 are controlled based on the retrieved control signal, resulting in the enhancement of realism of the image in synchronization with the image displayed by the image display device 150.

In the present embodiment, the storage into the RAM 314, of a control signal to be synchronized with an image signal, together with the image signal allows the control signal to be stored in the similar manner with the image signal, and also allow the control signal to be retrievable in the similar manner with the image signal via the common interface 322 thereto. Accordingly, the image signal and the control signal become capable of being stored into and retrieved from the RAM 314, and transmitted from the RAM 314 to the external, with a greater ease.

Further, in the present embodiment, the storage of a control signal into the frame-by-frame storage areas 330 per each frame of an image facilitates the various control based on the control signal to be performed in synchronization with display of each frame by the image display device 150. Additionally, the storage of a control signal into the individual line-by-line storage regions 344 per each scan-line facilitates the various control based on the control signal to be performed in synchronization with display of each scan-line K by the image display device 150.

As will be apparent from the above description, in the present embodiment, the image display device 150 constitutes an example of the "image display apparatus" set forth in the above mode (43), the scent generator 222, the sound system 224 and the illumination system 226 each constitute an example of the "reproducing device" set forth in the same mode, the RAM 314 to which the frame-by-frame storage areas 330 is assigned constitutes an example of the "storage medium" set forth in the same mode, and a portion of the computer 302 which is assigned to execute the aforementioned signal storage program or the aforementioned electrical circuitry for signal storage constitutes an example of the "signal storing section" set forth in the same mode.

Next, a seventh embodiment of the present invention will be described, provided that, because the present embodiment is different from the sixth embodiment only in the construction of the frame-by-frame storage areas 330 in the RAM 314, and is in common to the sixth embodiment in the remaining elements, the common elements will be omitted in detailed description by reference using the identical reference numerals or names, while only the construction of the frame-by-frame storage areas 330 will be described in greater detail below.

In the sixth embodiment, as illustrated in FIG. 18, on an upstream side of each line-by-line storage region 344, the image-signal storage sub-region 350 is located, while, on its downstream side, the control-signal storage sub-region 352 is located.

Figure 19:
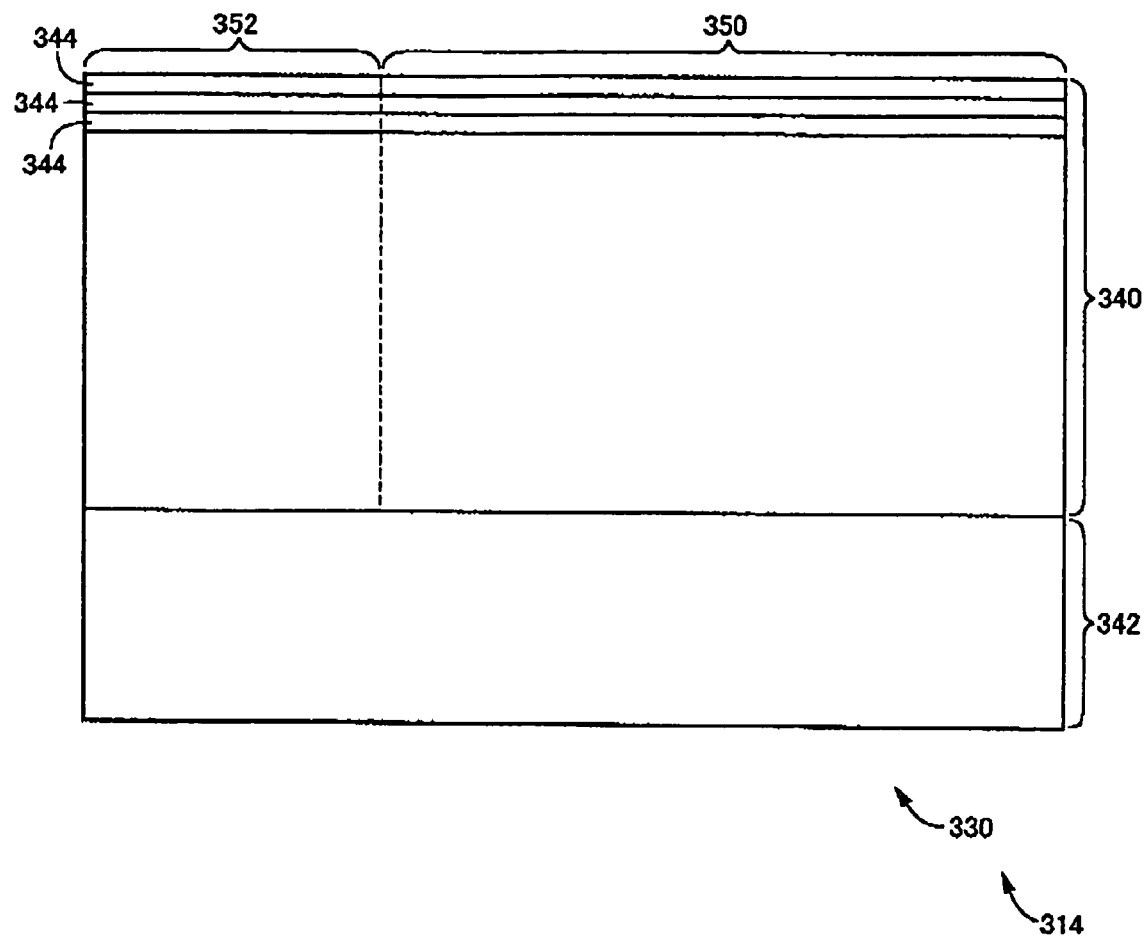
FIG. 19 is a block diagram conceptually illustrating the configuration of a RAM 314 in a signal processing device 300 constructed according to a seventh embodiment of the present invention.

Alternatively, in the present embodiment, as illustrated in FIG. 19, on a downstream side of each line-by-line storage region 344, the image-signal storage sub-region 350 is located, while, on its upstream side, the control-signal storage sub-region 352 is located.

Owing to the employment of such an organization, the present embodiment would facilitate the storage of a control signal into the RAM 314 prior to that of an image signal, per scan-line, and the retrieval of a control signal from the RAM 314 prior to that of an image signal, per scan-line, and the transmission of a control signal prior to that of an image signal.

Next, an eighth embodiment of the present invention will be described, provided that, because the present embodiment has common elements to the sixth embodiment, the common elements will be omitted in detailed description by reference using the identical reference numerals or names, while only the different elements will be described in greater detail below.

Figure 20:
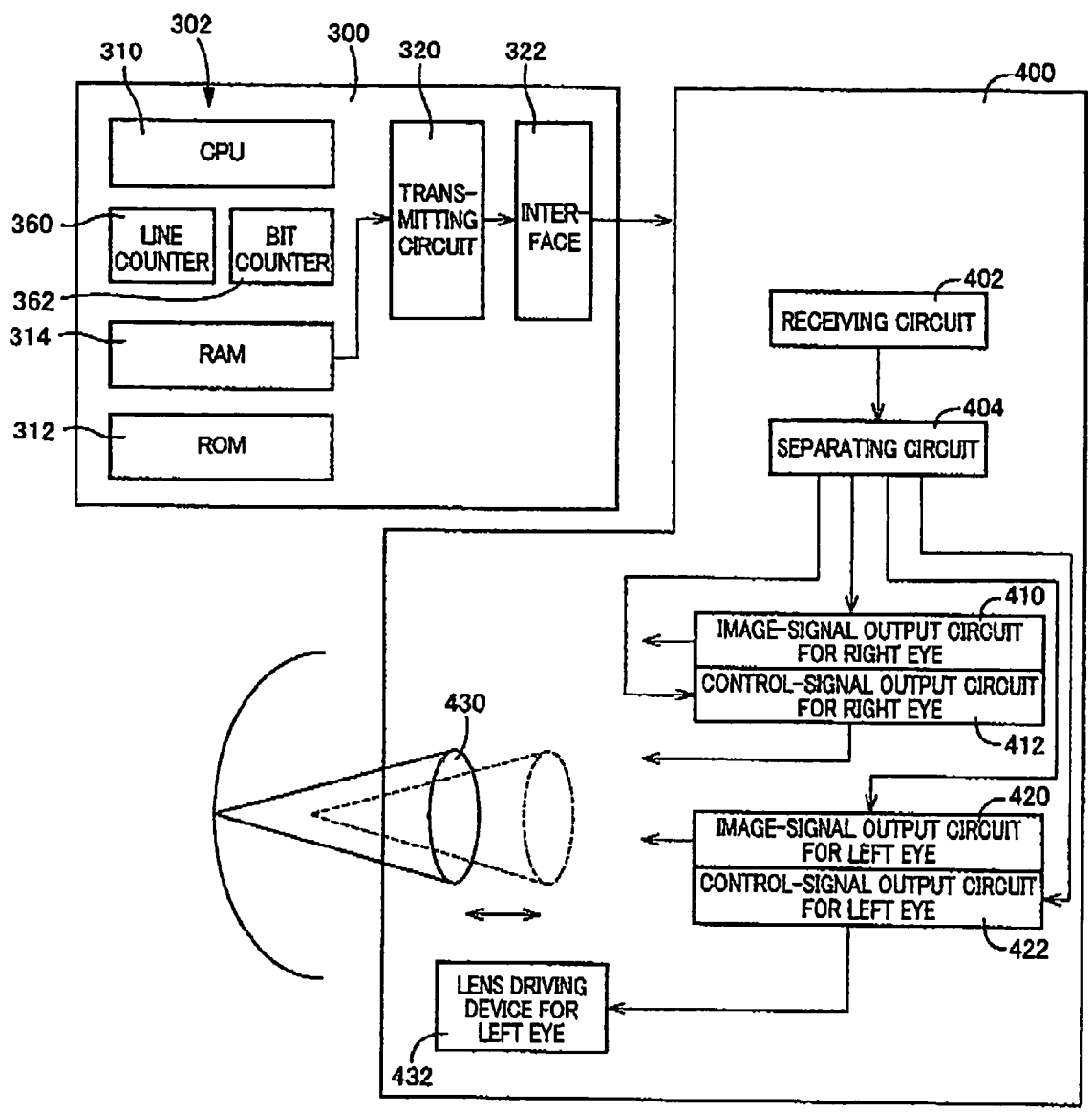
FIG. 20 is a block diagram conceptually illustrating a signal processing device 300 constructed according to an eighth embodiment of the present invention, together with an image display device 400.

As illustrated in FIG. 20, in the present embodiment, as opposed to the sixth embodiment, the signal processing device 300 is connected with an image display device 400. The image display device 400 displays images on the retina of a viewer's right eye and the retina of the viewer's left eye, respectively. For this purpose, the signal processing device 300 is required to supply image signals and control signals to the thus-configured image display device 400, for the right and left eyes in a distinguishable manner.

Figure 21:
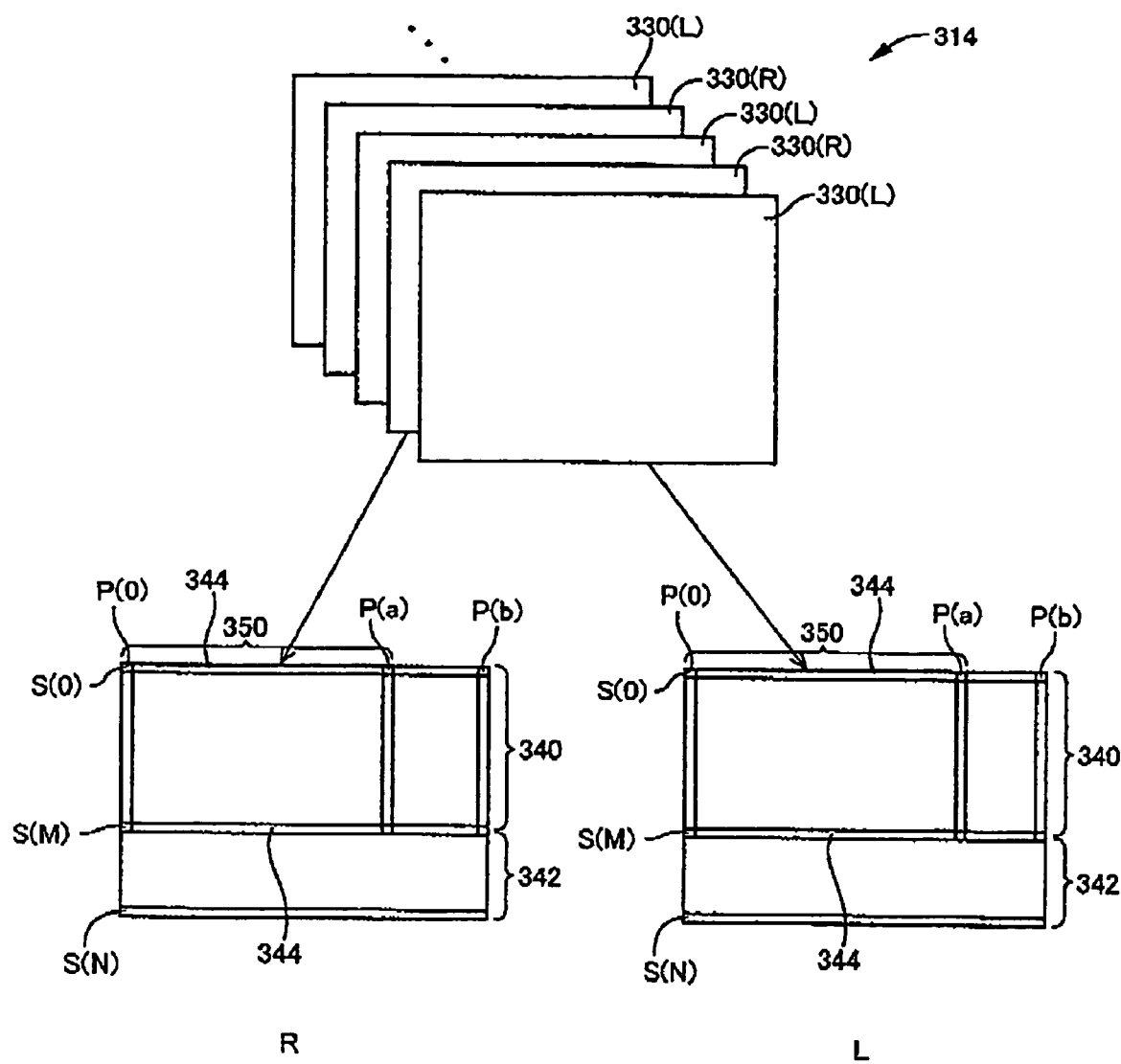
FIG. 21 is a view conceptually illustrating the configuration of a RAM 314 in FIG. 20.

Due to the above, as illustrated in FIG. 21, in the present embodiment, a plurality of frame-by-frame storage areas 330 are assigned to the RAM 314, such that the frame-by-frame storage areas 330(L) for the left eye and the frame-by-frame storage areas 330(R) for the right eye are alternately arranged.

As illustrated in FIG. 20, the image display device 400 includes a receiving circuit 402, a separating circuit 404, an image-signal output circuit 410 for the right eye, a control-signal output circuit 412 for the right eye, an image-signal output circuit 420 for the left eye, and a control-signal output circuit 422 for the left eye.

The receiving circuit 402, in order to receive an image signal (color signal and luminance signal) and a control signal (depth signal) from the signal processing device 300, is provided in common to these image signal and control signal.

The separating circuit 404 first separates a composite signal received from the receiving circuit 402 into a composite signal for the left eye and a composite signal for the right eye. The separating circuit 404 next separates each of the composite signals by separation, into an image signal and a control signal, in the manner described below.

As illustrated in FIG. 20, the image display device 400 further includes a lens 430 for the left eye, a lens driving device 432 for driving the lens 430 for the left eye, a lens for the right eye, not illustrated, and a lens driving device for driving the lens for the right eye, not illustrated. In view of the similarity in construction with the lens 430 for the left eye and the lens driving device 432 for the left eye, respectively, the lens for the right eye and the lens driving device for the right eye will be omitted in explanation by drawings or text.

As described above, an image signal is stored in each line-by-line storage region 344 (illustrated in FIGS. 17 and 18), at the image-signal storage sub-region 350 having bit numbers of P(0) to P(a), and a control signal is stored in each line-by-line storage region 344, at the control-signal storage sub-region 352 having bit numbers of P(a+1) to P(b). By taking advantage of this fact, the separating circuit 404 separates a signal received from the signal processing device 300 into the image signal and the control signal, according to whether or not the bit number of the bit counter 362 is equal to or smaller than P(a).

For allowing the lens 430 for the left eye to focus a video image displayed by a display unit (not illustrated) such as a liquid crystal display, onto the retina of the left eye of a user (viewer), the image-signal output circuit 420 is designed to output the image signal received from the signal processing device 300 to the display unit. The image signal includes color signals of individual pixels (luminance signals per each color).

The lens driving device 432 is designed such that, once a control signal is supplied thereto, the position of the lens 430 for the left eye (e.g., position on the optical axis) is adjusted in response to the control signal. The control signal includes a depth signal indicative of the depth of an image. Once the lens driving device 432 for the left eye shifts a focal position of the left lens 430 by moving the lens 430 for the left eye back and forth (in a direction indicated by the arrow in FIG. 20), the user (viewer) adjusts a focal length of a lens in the eye ball, for focusing his or her eye.

As a result, the user becomes capable of stereoscopically perceiving an image displayed by the image display device 400. Further, this image display device 400 allows not only the presentation of stereopsis by parallax performed in conventional three-dimensional display, but also the presentation of an image with reduced differences in convergence in the user (viewer), with enhanced realism. Additionally, the user's fatigue in the eyes is eliminated.

For the position adjustment of the lens 430 for the left eye, the control-signal output circuit 422 for the left eye supplies a control signal received from the signal processing device 300, to the lens driving device 432 for the left eye. As a result, the focal position of the lens 430 for the left eye is adjusted so as to achieve image depth indicated by the control signal.

Referring next, in particular, to FIG. 22, there will be described in greater detail, signal processing for allowing the signal processing device 300 to transmit an image signal and a control signal from the RAM 314, and signal processing for allowing the image display device 400 to receive and then separate the transmitted image signal and control signal, to thereby display an image.

However, the aforementioned signal processing is shared in content between the frame-by-frame storage areas 330(L) for the left eye and the frame-by-frame storage areas 330(R) for the right eye, and therefore, only one of the frame-by-frame storage areas 330(L) for the left eye and the frame-by-frame storage areas 330(R) for the right eye will be described in greater detail, while the other will be omitted in redundant description.

It is added that, although FIG. 22 illustrates the aforementioned signal processing in flow chart, they may be performed by causing the computer 302 of the signal processing device 300 and/or a computer, not illustrated, of the image display device 400, to execute a specific program.

In the aforementioned signal processing, at an initial step S1 (hereinafter, indicated simply as "S1," similarly with other steps), the configuration of the separating circuit 404 is initialized. Next, at S2, it waits for the entry of vertical sync signal into the computer 302 in the signal processing device 300, and upon entry, at S3, the line number stored in the line counter 360 is set to S(0).

Subsequently, at S4, it waits for the entry of horizontal sync signal into the computer 302 in the signal processing device 300, and upon entry, at S5, the bit number stored in the bit counter 362 is set to P(0).

Thereafter, at S6, a determination is made as to whether or not the line number stored in the line counter 360 is equal to or smaller than S(M). If the line number is equal to or smaller than S(M), then the determination of S6 becomes "YES." In this case, as illustrated in FIG. 21, a read-data position of the current frame-by-frame storage area 330 does not reach the line-by-line storage region 344 located lowermost in the first storage sub-area 340, which region 344 has a line number of S(M), and therefore, S7 is reached.

At this S7, a determination is made as to whether or not the bit number of the bit counter 362 is equal to or smaller than P(a). If the bit number is equal to or smaller than P(a), then the determination of S7 becomes "YES," progressing to S8. At this S8, the transmitting circuit 320 transmits a signal from the RAM 314, as an image signal, to the image display device 400 via the interface 322, and the image display device 400 processes the transmitted signal, as an image signal (color signals and luminance signals).

Thereafter, at S9, the bit number of the bit counter 362 is incremented by one, returning to S7. The implementation of S7-S9 is repeated until the bit number of the bit counter 362 exceeds P (a) and the determination of S7 becomes "NO."

If the bit number of the bit counter 362 exceeds P (a), then the determination of S7 becomes "NO," and, at S10, the transmitting circuit 320 transmits a signal from the RAM 314, as a control signal, to the image display device 400 via the interface 322, and the image display device 400 processes the transmitted signal, as a control signal (depth signal).

Subsequently, at S11, a determination is made as to whether or not the bit number stored in the bit counter 362 is smaller than P(b). If the bit number is smaller than P(b), then the determination of S11 becomes "YES," and, at S9, the bit number of the bit counter 362 is incremented by one, returning to S7.

If the bit number stored in the bit counter 362 reaches P(b) as a result of repetition of the implementation of S7, S10, S11 and S9, then the determination of S11 becomes "NO." In this case, because of the completion of transmission and reception of one line's worth of signal, at S12, the line number stored in the line counter 360 is incremented by one, returning to S4.

If the line number of the line counter 360 becomes larger than S(M), then the determination of S6 becomes "NO," with progress to S13. At this S13, a determination is made as to whether or not the line number of the line counter 360 is equal to or smaller than S(N). If the line number is equal to or smaller than S(N), then the determination of S13 becomes "YES," and, at S14, the transmitting circuit 320 transmits a signal from the RAM 314, as a control signal, to the image display device 400 via the interface 322, and the image display device 400 processes the transmitted signal, as a control signal.

Thereafter, at S15, a determination is made as to whether or not the bit number of the bit counter 362 is smaller than P(b). If the bit number is smaller than P(b), then the determination of S15 becomes "YES," and, at S16, the bit number stored in the bit counter 362 is incremented by one, returning to S14. At this S14, the transmitting circuit 320 transmits a signal from the RAM 314, as a control signal, to the image display device 400 via the interface 322, and the image display device 400 processes the transmitted signal, as a control signal.

If the bit number stored in the bit counter 362 reaches P(b) as a result of repetition of the implementation of S14-16, then the determination of S15 becomes "NO." In this case, because of the completion of transmission and reception of one line's worth of signal, at S12, the line number stored in the line counter 360 is incremented by one, returning to S4.

If the line number of the line counter 360 reaches S(N), then the determination of S13 becomes "NO." In this case, the transmission and the reception are completed for the image signal and the control signal in one of the frame-by-frame storage areas 330.

Thereafter, similarly, the image signal and the control signal stored in all the frame-by-frame storage areas 330 are transmitted to the image display device 400, and as a result, the image display device 400 processes the image signal and the control signal and displays an image.

Next, a ninth embodiment of the present invention will be described, provided that, because the present embodiment is different from the eighth embodiment only in the construction of the frame-by-frame storage areas 330 in the RAM 314, and is in common to the eighth embodiment in the remaining elements, the common elements will be omitted in detailed description by reference using the identical reference numerals or names, while only the construction of the frame-by-frame storage areas 330 will be described in greater detail below.

In the eighth embodiment, as illustrated in FIG. 21, the plurality of frame-by-frame storage areas 330 are assigned to the RAM 314, such that the frame-by-frame storage areas 330(L) for the left eye and the frame-by-frame storage areas 330(R) for the right eye are arranged alternately in a given order. There has been stored in none of the frame-by-frame storage areas 330, a control signal S for distinguishing the frame-by-frame storage areas 330(L) for the left eye and the frame-by-frame storage areas 330(R) for the right eye, from each other.

Figure 23:
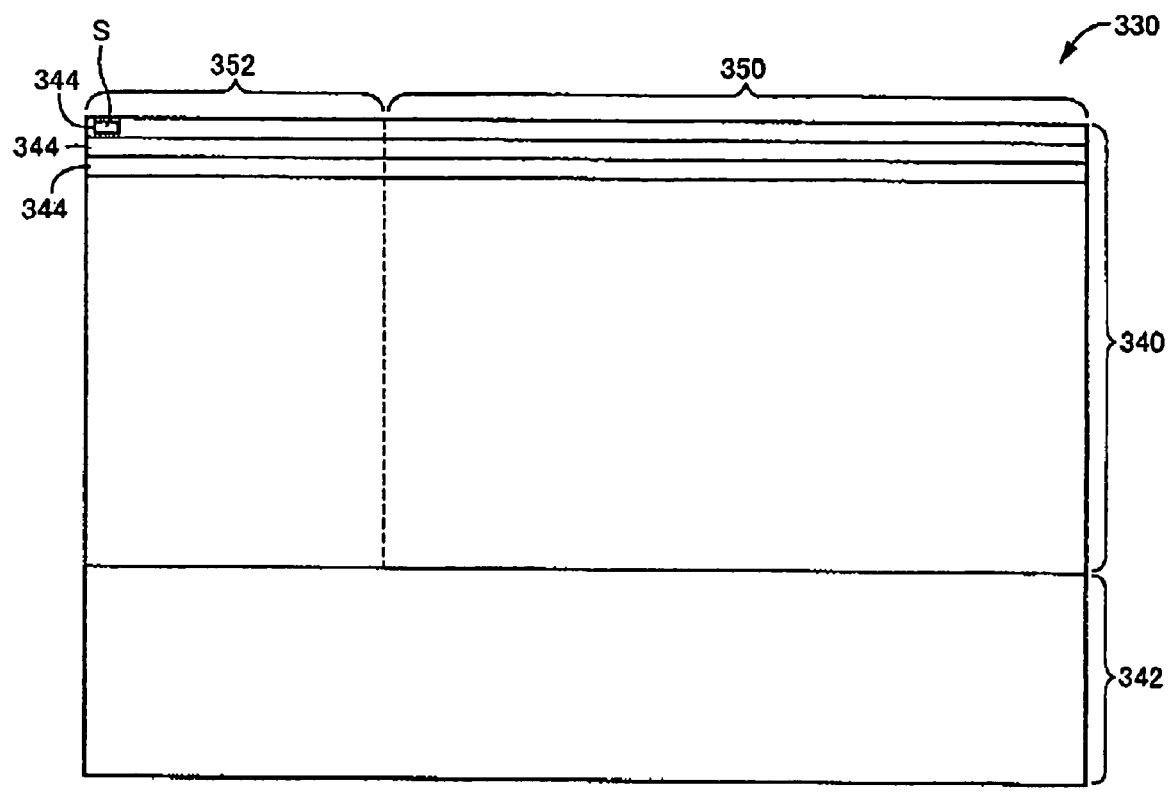
FIG. 23 is a view conceptually illustrating the configuration of a RAM 314 in a signal processing device 300 constructed according to a ninth embodiment of the present invention.

Alternatively, in the present embodiment, as illustrated in FIG. 23, on a downstream side of each line-by-line storage region 344, the image-signal storage sub-region 350 is located, while, on its upstream side, the control-signal storage sub-region 352 is located. In the control-signal storage sub-region 352, a control signal S for distinguishing the frame-by-frame storage areas 330(L) for the left eye and the frame-by-frame storage areas 330(R) for the right eye, from each other.

Owing to the employment of such an organization, the present embodiment would initially refer to the control signal S stored in each frame-by-frame storage area 330 at its leading end, for example, in the separating circuit 404, to thereby offer a greater ease in determining to which one of the frame-by-frame storage areas 330(L) for the left eye and the frame-by-frame storage areas 330(R) for the right eye, a currently-interested one of the frame-by-frame storage areas 330 belongs, in a simplified and ensured manner.

Next, a tenth embodiment of the present invention will be described, provided that, because the present embodiment has common elements to the sixth embodiment described above with reference to FIG. 16, the common elements will be omitted in detailed description by reference using the identical reference numerals or names, while only the different elements will be described in greater detail below.

In the sixth embodiment, as illustrated in FIG. 16, the signal processing device 300 is connected with the image display device 150, and further connected with environment control device for controlling the environment in which a viewer is viewing an image displayed by the image display device 150, in the form of the scent generator 222, the sound system 224 and the illumination system 226.

Figure 24:
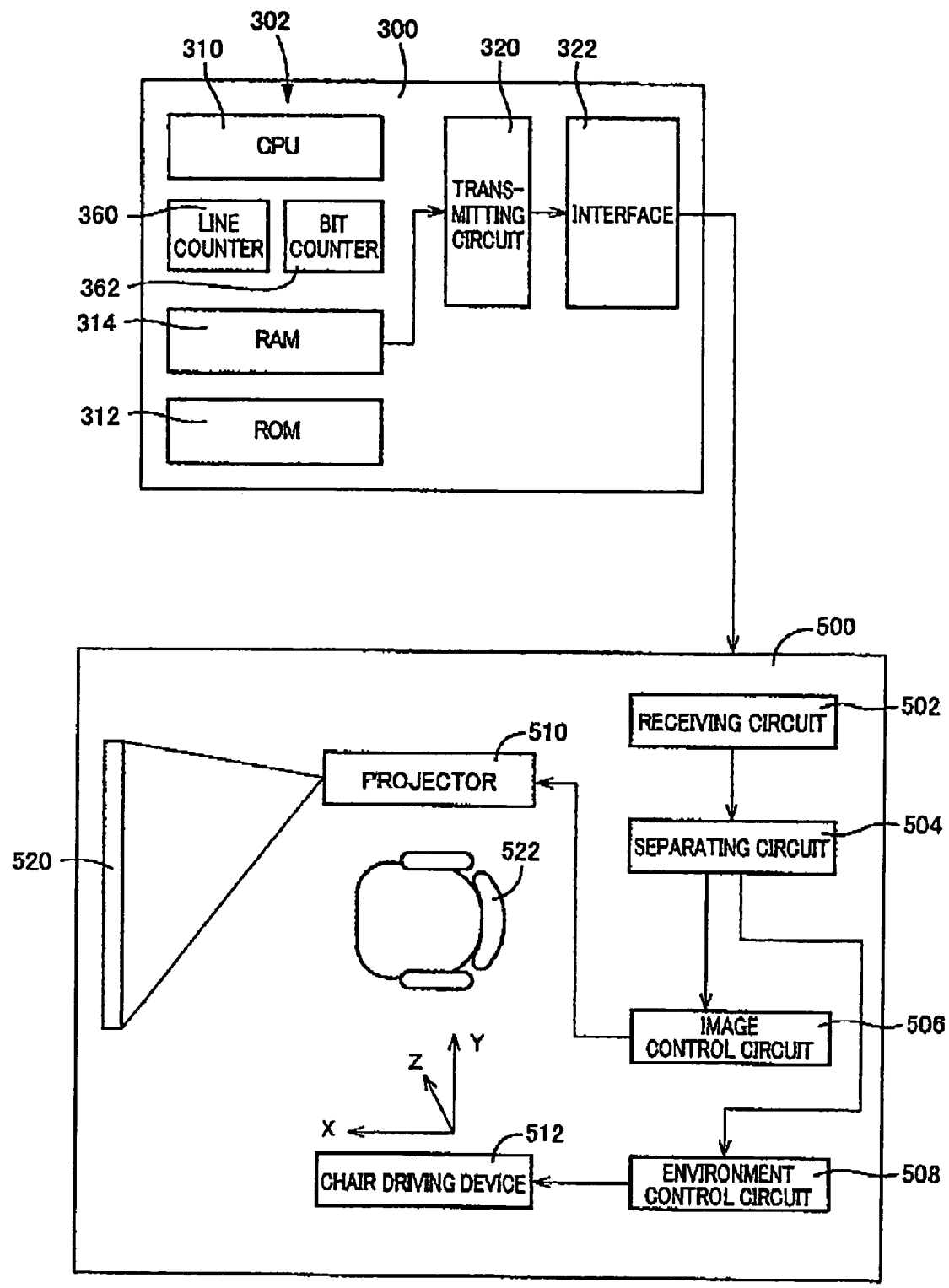
FIG. 24 is a block diagram conceptually illustrating a signal processing device 300 constructed according to a tenth embodiment of the present invention, together with a reproducing system 500.

Alternatively, in the present embodiment, as illustrated in FIG. 24, the signal processing device 300 is connected with a reproducing system 500, which has an image display function and an environment control function, and which reproduces a physical effect to promote a user to associate a specific scene more realistically.

To this end, in the present embodiment, the signal processing device 300 stores an image signal for displaying an image, and a control signal for controlling the environment in the RAM 314 at locations interrelated in position, in the similar manner with the sixth embodiment, and also transmits those image signal and control signal to the reproducing system 500 via the transmitting circuit 320 and the interface 322 both in common to those signals.

As illustrated in FIG. 24, the reproducing system 500 includes a separating circuit 504 for separating a composite signal serially received from the signal processing device 300, into an image signal and a control signal. The separating circuit 504 performs signal separation in the similar manner with the sixth embodiment. This separating circuit 504 performs the signal separation, for example, with the collaborative action of causing the computer 302 of the signal processing device 300 to execute a program analogous to the program illustrated in FIG. 22.

The reproducing system 500 further includes an image control circuit 506 and an environment control circuit 508. The reproducing system 500 still further includes an image display device in the form of a projector 510, and an environment control device in the form of a chair driving device 512.

The projector 510, as is well known, projects light onto a screen 520, based on an image signal, the light being responsive to the image signal, to thereby display an image. For performing this function, the image control circuit 506 supplies to the projector 510 an image signal received from the separating circuit 504.

The chair driving device 512 moves a chair 522 (or otherwise, a floor) on which a viewer of an image displayed by the projector 510 sits, in any direction in an xyz orthogonal coordinate system defined relative to a space, or rotates the chair 522 about any one of coordinate axes. This allows the viewer to experience a linear or rotational movement, vibration, shock, inclination, etc., during viewing. For performing this function, the environment control circuit 508 supplies a control signal received from the separating circuit 504, to the chair driving device 512.

To the projector 510 and the chair driving device 512, an image signal and a control signal are supplied from the image control circuit 506 and the environment control circuit 508, in synchronization with each other, respectively. As a result, the chair 522 is controlled by the chair driving device 512 in synchronization with the display operation of an image by the projector 510. Therefore, the synchronized motion of the chair 522 with the display image allows the viewer of the image to obtain an enhanced realism during viewing.

Next, an eleventh embodiment of the present invention will be described, provided that, because the present embodiment has common elements to the eighth embodiment described above with reference to FIG. 20, the common elements will be omitted in detailed description by reference using the identical reference numerals or names, while only the different elements will be described in greater detail below.

Figure 25:
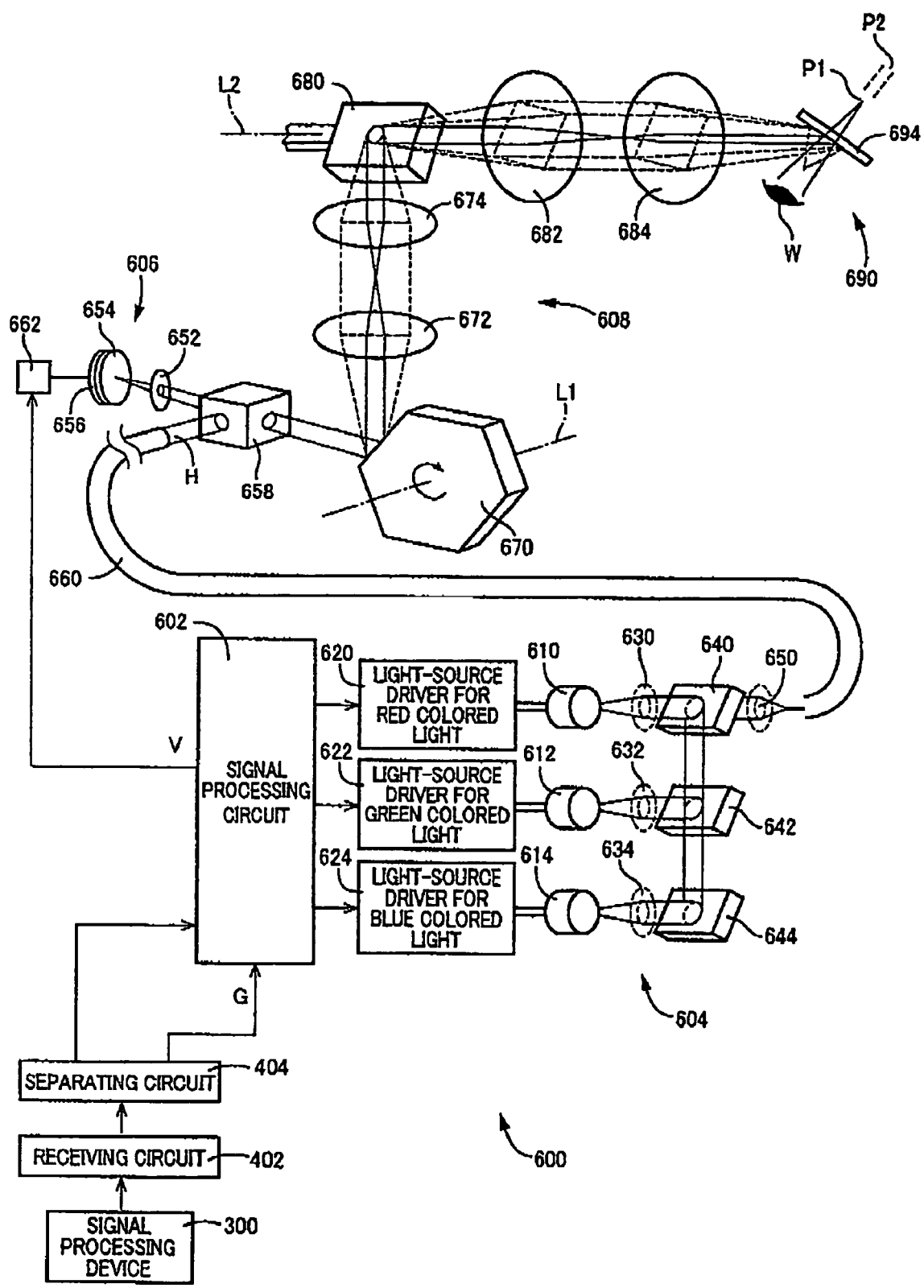
FIG. 25 is a schematic view conceptually illustrating a retinal scanning display 600 used in combination with a signal processing device 300 constructed according to an eleventh embodiment of the present invention.

As illustrated in FIG. 25, in the present embodiment, to the signal processing device 300, a retinal scanning display (hereinafter, abbreviated as "RSD") 600 is connected as an image display device. This RSD 600 modulates the intensity of image light of each color, based on color-by-color luminance signals, with the intensity-modulated image-light being treated as modulated light, and modulates the curvature of wavefront of the modulated light, based on a depth signal.

This RSD 600 projects image light directly onto a retina of a viewer's eye, and scans the image light on the retina, to thereby allow the viewer to stereoscopically perceive an image.

To this end, in the present embodiment, the signal processing device 300 transmits a composite signal formed by combining an image signal including color-by-color luminance signals, and a control signal including a depth signal, to the RSD 600. The RSD 600 receives at the receiving circuit 402, the composite signal. The received composite signal is subsequently supplied to the separating circuit 404, wherein the composite signal is separated into the image signal and the control signal, which is so say, the luminance signals and the depth signal.

As illustrated in FIG. 25, the RSD 600 further includes a signal processing circuit 602, a light source unit 604, a wavefront-curvature modulating unit 606, and a scanning unit 608. The signal processing circuit 602 controls intensity modulation by the light source unit 604, and wavefront-curvature modulation by the wavefront-curvature modulating unit 606, based on the image signal and the depth signal which have been received from the separating circuit 404 in parallel.

As illustrated in FIG. 25, the light source unit 604 includes a light source 610 for red colored light, a light source 612 for green colored light, and a light source 614 for blue colored light, each functioning as a light source. This light source unit 604 further includes a light-source driver 620 for red colored light, a light-source driver 622 for green colored light, and a light-source driver 624 for blue colored light, each functioning as a light-source driver.

This light source unit 604 still further includes collimator lenses 630, 632 and 634, and wavelength-selective mirrors 640, 642 and 644, and a focus lens 650.

The signal processing circuit 602 outputs color-by-color intensity-modulation signals to the light-source driver 620 for red colored light, the light-source driver 622 for green colored light, and the light-source driver 624 for blue colored light, which drive the light source 610 for red colored light, the light source 612 for green colored light, and the light source 614 for blue colored light, respectively, based on the image signal outputted from the separating circuit 404.

As illustrated in FIG. 25, the wavefront-curvature modulating unit 606 includes a convex lens 652, a movable mirror 654, a mirror actuator 656, and a semi-transparent mirror 658. Modulated light H leaving the focus lens 650 of the aforementioned light source unit 604 is relayed to the semi-transparent mirror 658 via an optical fiber 660. The semi-transparent mirror 658 is an entrance of the modulated light H to the wavefront-curvature modulating unit 606.

Figure 26:
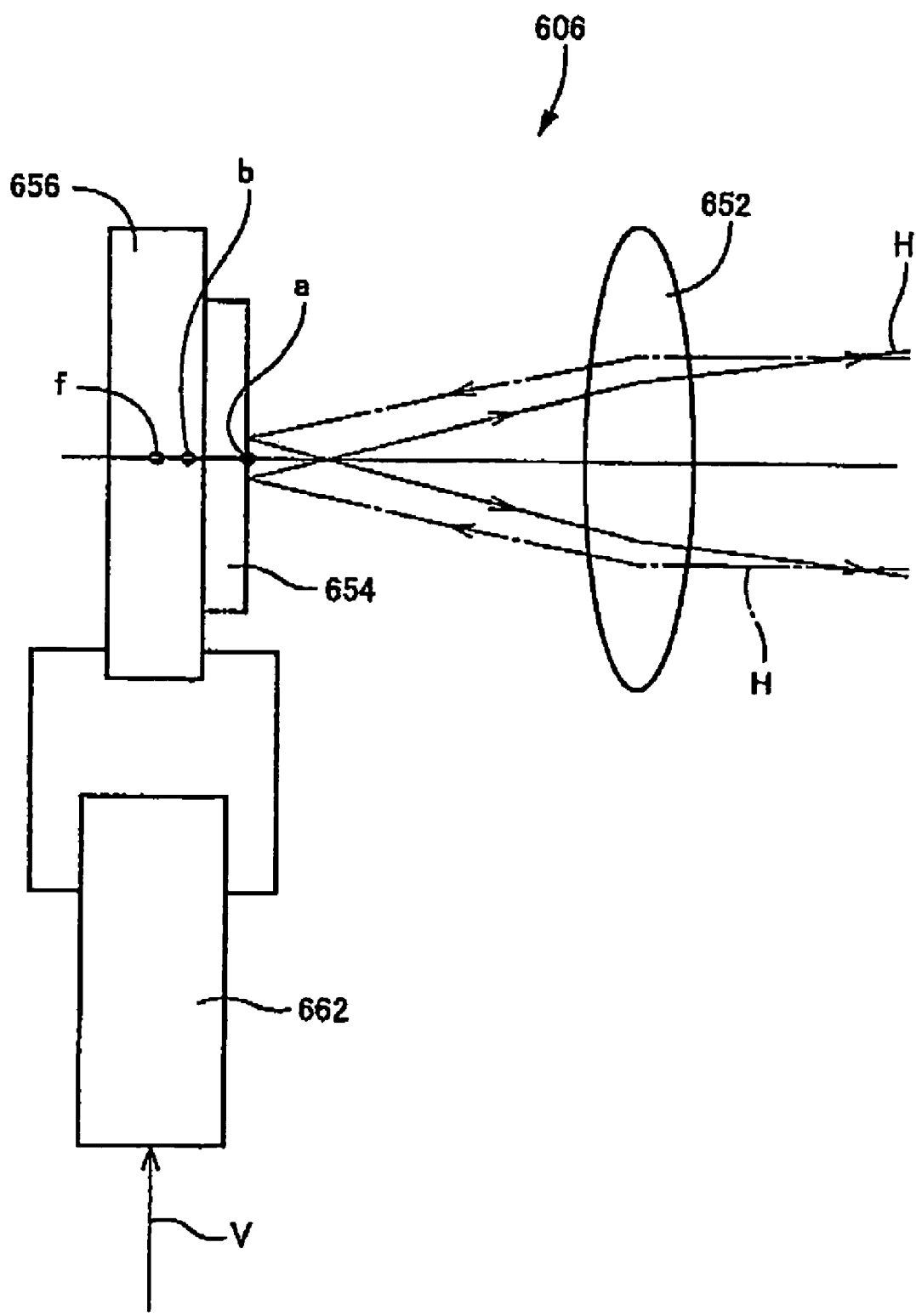
FIG. 26 is a side view illustrating a wavefront-curvature modulating unit 606 in FIG. 25 in enlargement.

As illustrated in FIG. 26, the movable mirror 654 is disposed on an optical axis of the convex lens 652. This movable mirror 654 is disposed to be movable between a focal position "f" of the convex lens 652, and a position "a" nearer to the convex lens 652 than the focal position "f." A position "b" in FIG. 26 is an intermediate position between the position "a" and the focal position "f." In FIG. 26, the movable mirror 654 is illustrated with its reflective surface being coincident with the position "a."

As illustrated in FIG. 26, when the movable mirror 654 is at the position "a," which is located nearer to the convex lens 652 than the focal position "f" of the convex lens 652, as illustrated in FIG. 25 in solid lines, the viewer perceives an image at a position P1 nearer to the viewer. The reasons are as follows.

In an example depicted in FIG. 26, the movable mirror 654 is inside the focal position "f" of the convex lens 652. Therefore, as illustrated in FIG. 26 in dot-dash lines, the modulated light H outputted from the side of the convex lens 652 toward the movable mirror 654 is reflected therefrom, into diverging light. When the modulated light H thus-converted into divergent light enters a viewer's eye W, the viewer perceive an image at the position P1 in FIG. 25.

In contrast, when the movable mirror 654 is at the focal position "f" of the convex lens 652, the modulated light H upon reflection from the movable mirror 654 enters the viewer's eye W in the form of parallel light. As a result, the viewer perceives an image at a distant position P2, as illustrated in FIG. 25 in broken lines.

The mirror actuator 656 illustrated in FIG. 26 is fabricated with, for example, a piezoelectric element. In the case of the mirror actuator 656 being fabricated with a piezoelectric element, the aforementioned movable mirror 654 may be attached to, for example, one of faces of the piezoelectric element, which crosses a direction in which an electrical field is applied to the piezoelectric element.

In this example, changes to a voltage or an electric field applied to the piezoelectric element induce changes in the thickness of the piezoelectric element. Changes in the thickness of the piezoelectric element induce the movement of the movable mirror 654 away from or toward the convex lens 652, resultantly allowing the movable mirror 654 to move to any desired one of the aforementioned position "a," position "b," and focal position "f."

The position of the movable mirror 654 is controlled based on a depth signal V. More specifically, the depth signal V is outputted from the signal processing circuit 602 to a driver 662, with the driver 662 controlling the mirror actuator 656 based on the depth signal V. The mirror actuator 656 controls the movable mirror 654 to be at a position reflecting the depth signal V. Therefore, alteration to the depth signal V allows the depth position of an image to be displayed, to move to any desired position, for example, between the positions P1 and P2 depicted in FIG. 25.

As illustrated in FIG. 25, the scanning unit 608 includes a horizontal scanning mirror 670, relay lenses (e.g., convex lenses) 672, 674, a vertical scanning mirror 680, and relay lenses (e.g., convex lenses) 682, 684.

As illustrated in FIG. 25, the horizontal scanning mirror 670 is disposed rotatable about a rotation axis L1. This horizontal scanning mirror 670 reflects the modulated light H leaving the semi-transparent mirror 658, into a direction in accordance with a rotational position of the horizontal scanning mirror 670. The rotation of this horizontal scanning mirror 670 is controlled based on the aforementioned horizontal sync signal.

The vertical scanning mirror 680 is disposed oscillatorily rotatable about a rotation axis L2. The rotation of this vertical scanning mirror 680 is controlled based on the aforementioned vertical sync signal.

The relay lenses 672, 674 relay the modulated light H reflected from the horizontal scanning mirror 670, to the vertical scanning mirror 680. The relay lenses 682, 684 relay the modulated light H reflected from the vertical scanning mirror 680 to the retina.

The RSD 600 includes a projecting device 690 allowing the modulated light H (image light) leaving the relay lenses 682, 684, to be projected onto the retina of the viewer's eye. The projecting device 690, which includes a mirror (a total-reflective mirror or a semi-transparent mirror) 694 positioned just in front of the eye, causes the mirror 694 to reflect the image light leaving the relay lenses 682, 684 toward the retina, with the image light being focused onto the retina.

Therefore, the present embodiment, in the signal processing device 300 of which, as described above, an image signal G and the depth signal V as a control signal both of which have been stored in the same frame-by-frame storage areas 330 are retrieved via the same interface 322 into the RSD 600, would offer a greater ease in synchronizing those image signal G and depth signal V relative to each other in the RSD 600.

It is added that a storage medium may be disposed in the RSD 600, and there may be provided to the storage medium, storage areas analogous to the frame-by-frame storage areas 330 of the RAM 314 of the signal processing device 300.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for displaying an image stereoscopically representing a three-dimensional object, in an image display region having a quadrilateral periphery surrounded by four edge sides, the apparatus comprising:
   an emitter configured to emit light, having an intensity modulator configured to modulate intensity values of the light emitted from the emitter, for a plurality of sub-areas into which the image is divided, respectively;
   a wavefront-curvature modulator configured to modulate curvature values of wavefront of the light emitted from the emitter, for the respective sub-areas of the image; and
   a controller configured to control the intensity modulator and the wavefront-curvature modulator, based on a luminance signal indicative of luminance values of the respective sub-areas of the image, and a depth signal indicative of depth values of the respective sub-areas of the image, wherein:
   the image signal contains a plurality of segments which are associated with a plurality of scan lines formed by the light on the image display region, respectively,
   the luminance signal contains a plurality of luminance-signal segments which correspond to the respective scan lines,
   the depth signal contains a plurality of depth-signal segments which correspond to the respective scan lines,
   the image signal contains, per each scan line, an effective portion which corresponds to the image display region, and which is used for image display, and a non-effective portion which corresponds to an image non-display region located outside the image display region, and which is not used for image display, whereby the entire image signal contains a plurality of effective portions and a plurality of non-effective portions,
   the image signal is formed, such that each of the depth-signal segments which corresponds to each scan line is embedded into a corresponding one of the effective portions, with each depth-signal segment located at only a predetermined one of both ends of the corresponding effective-portion, and
   the predetermined one end of the effective portions corresponds to a predetermined one of the four edge sides of the image display region.

2. The apparatus according to claim 1, wherein the depth signal is a signal corresponding to depth data which is produced during hidden surface elimination implemented in a rendering process.

3. The apparatus according to claim 2, wherein the depth data is Z-value data indicative of a Z-value which is temporarily stored in a Z-buffer when a Z-buffer technique is implemented for the hidden surface elimination in the rendering process.

4. The apparatus according to claim 1, wherein the controller includes:
- a synchronizer synchronizing the luminance signal and the depth signal relative to each other; and
- an output section outputting the synchronized luminance and depth signals to the intensity modulator and the wavefront-curvature modulator.

5. The apparatus according to claim 1, further comprising a scanner two-dimensionally scanning the light modulated by the wavefront-curvature modulator, wherein:

the scanner performs first scan for scanning the light in a first scan direction and second scan for scanning the light in a second scan direction intersecting with respect to the first scan direction, to thereby form the image in the plurality of scan lines, a scan region which is an overall region in which the light is two-dimensionally scanned by the scanner is configured to be larger than the image display region, to thereby allow the image non-display region to be located outside the image display region, and the image display region is formed with the plurality of scan lines.

* * * * *